(12) United States Patent
Katsuyama

(10) Patent No.: US 8,054,483 B2
(45) Date of Patent: Nov. 8, 2011

(54) IMAGE READING SYSTEM, ELECTRONIC PAPER USED IN THE IMAGE READING SYSTEM, AND IMAGE READING METHOD FOR HANDLING THE ELECTRONIC PAPER IN THE IMAGE READING SYSTEM

(75) Inventor: Goro Katsuyama, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 994 days.

(21) Appl. No.: 11/984,929

(22) Filed: Nov. 26, 2007

(65) Prior Publication Data

US 2008/0130071 A1 Jun. 5, 2008

(30) Foreign Application Priority Data

Dec. 4, 2006 (JP) ................................. 2006-327146

(51) Int. Cl.
*H04N 1/04* (2006.01)
*G06K 15/00* (2006.01)
(52) U.S. Cl. ........ 358/1.14; 358/1.1; 358/1.13; 358/1.9; 358/474
(58) Field of Classification Search ................. 358/1.14, 358/1.1, 1.13, 1.9, 474
See application file for complete search history.

(56) References Cited

U.S. PATENT DOCUMENTS

| | | | |
|---|---|---|---|
| 6,690,901 B2 | 2/2004 | Katsuyama et al. | |
| 6,785,488 B2 | 8/2004 | Katsuyama | |
| 6,848,685 B2 | 2/2005 | Katsuyama | |
| 7,108,338 B2 | 9/2006 | Katsuyama et al. | |
| 7,889,360 B2 * | 2/2011 | Kiwada | 358/1.12 |
| 2004/0012828 A1 | 1/2004 | Soda | |
| 2004/0114958 A1 | 6/2004 | Katsuyama et al. | |
| 2005/0141004 A1 * | 6/2005 | Kiwada | 358/1.12 |
| 2007/0028187 A1 | 2/2007 | Katsuyama | |

FOREIGN PATENT DOCUMENTS

| | | |
|---|---|---|
| CN | 1601557 A | 3/2005 |
| JP | 2000-069244 | 3/2000 |
| JP | 2000-151925 | 5/2000 |
| JP | 2004-056374 | 2/2004 |
| JP | 2006-030560 | 2/2006 |
| JP | 2006-219164 | 8/2006 |
| WO | WO 2004/050373 A1 | 6/2004 |

OTHER PUBLICATIONS

Chinese Office Action dated Oct. 16, 2009, for corresponding Chinese Patent Application No. 2007101970096.
Office Action dated Mar. 23, 2011, issued by the Japanese Patent Office for corresponding Japanese Patent Application No. 2006-437246 (without English translation).

* cited by examiner

*Primary Examiner* — Houshang Safaipour
(74) *Attorney, Agent, or Firm* — Harness, Dickey & Pierce, P.L.C.

(57) ABSTRACT

An image reading system, in which an image reading method is performed, includes a document feeder, a media determination unit, a transfer controller, an image reader, and a read controller. The document feeder feeds and transfers an original document consisting of at least one of a non-electronic medium and an electronic paper including a memory, a display unit, and a conductive member. The media determination unit determines whether the original document is the non-electronic medium or not. The transfer controller controls a transfer operation performed by the document feeder, based on results obtained by the media determination unit. The image reader optically reads either an image on the non-electronic medium or on the electronic paper. The read controller controls a reading operation performed by the image reader.

8 Claims, 43 Drawing Sheets

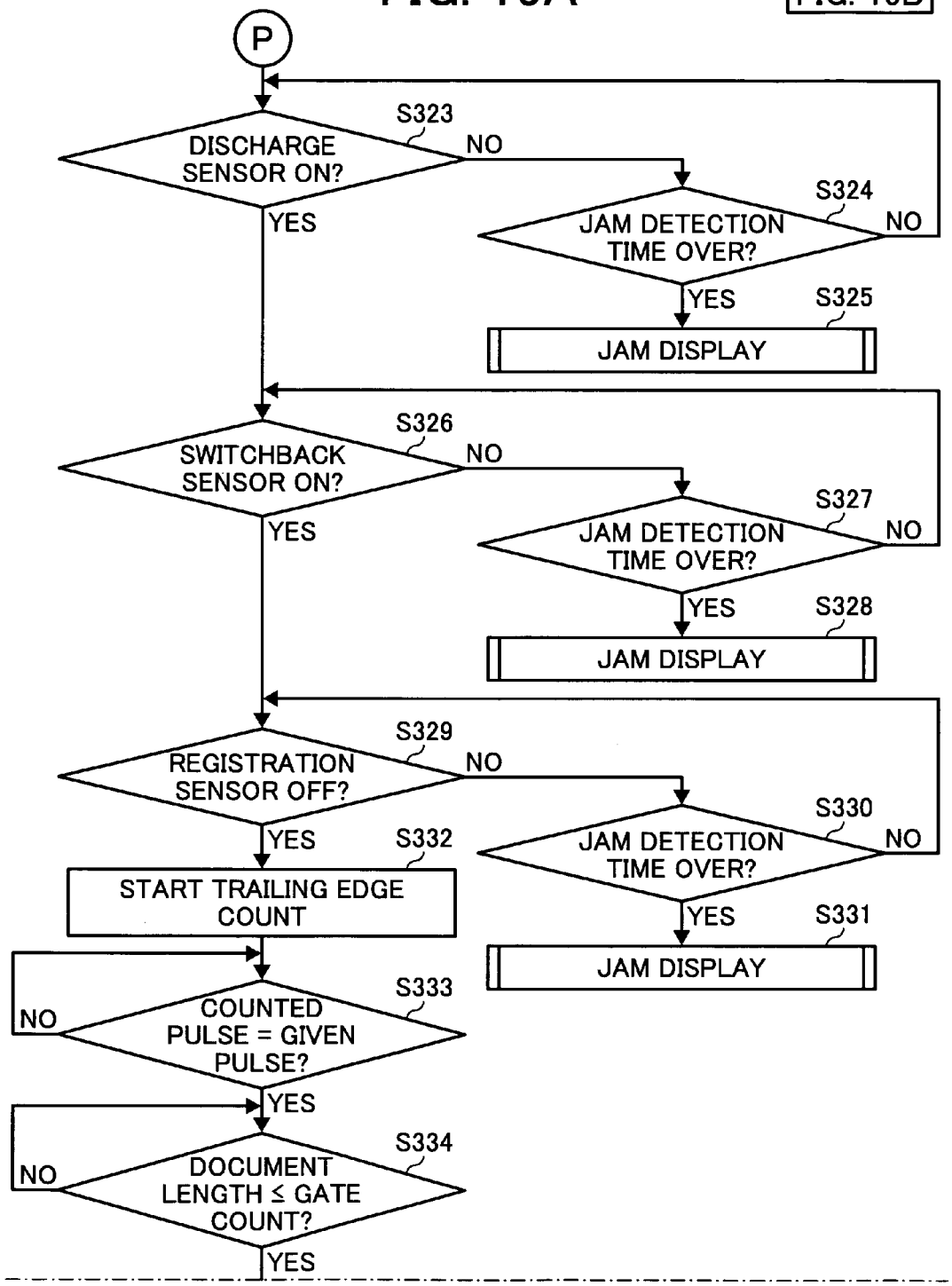

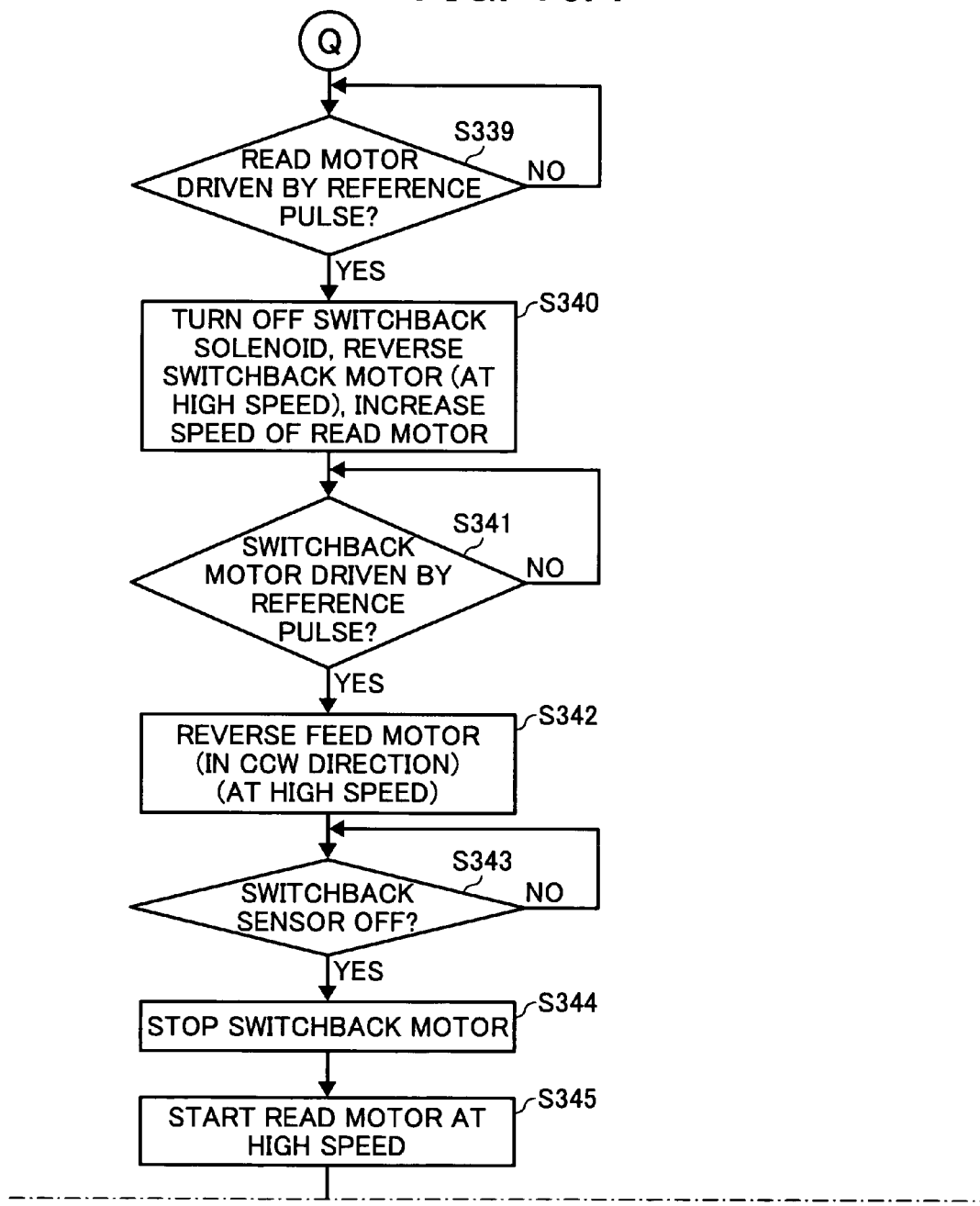

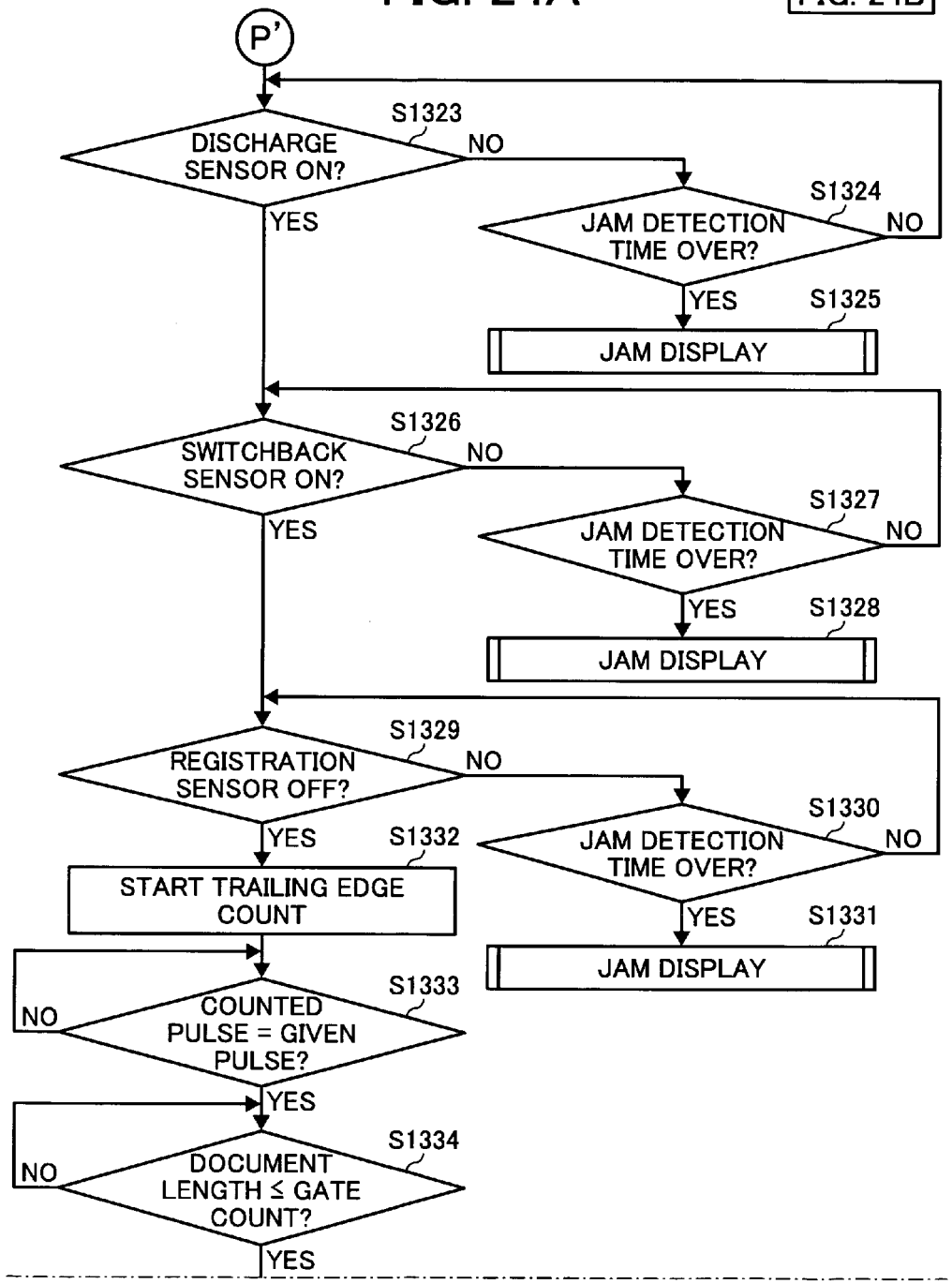

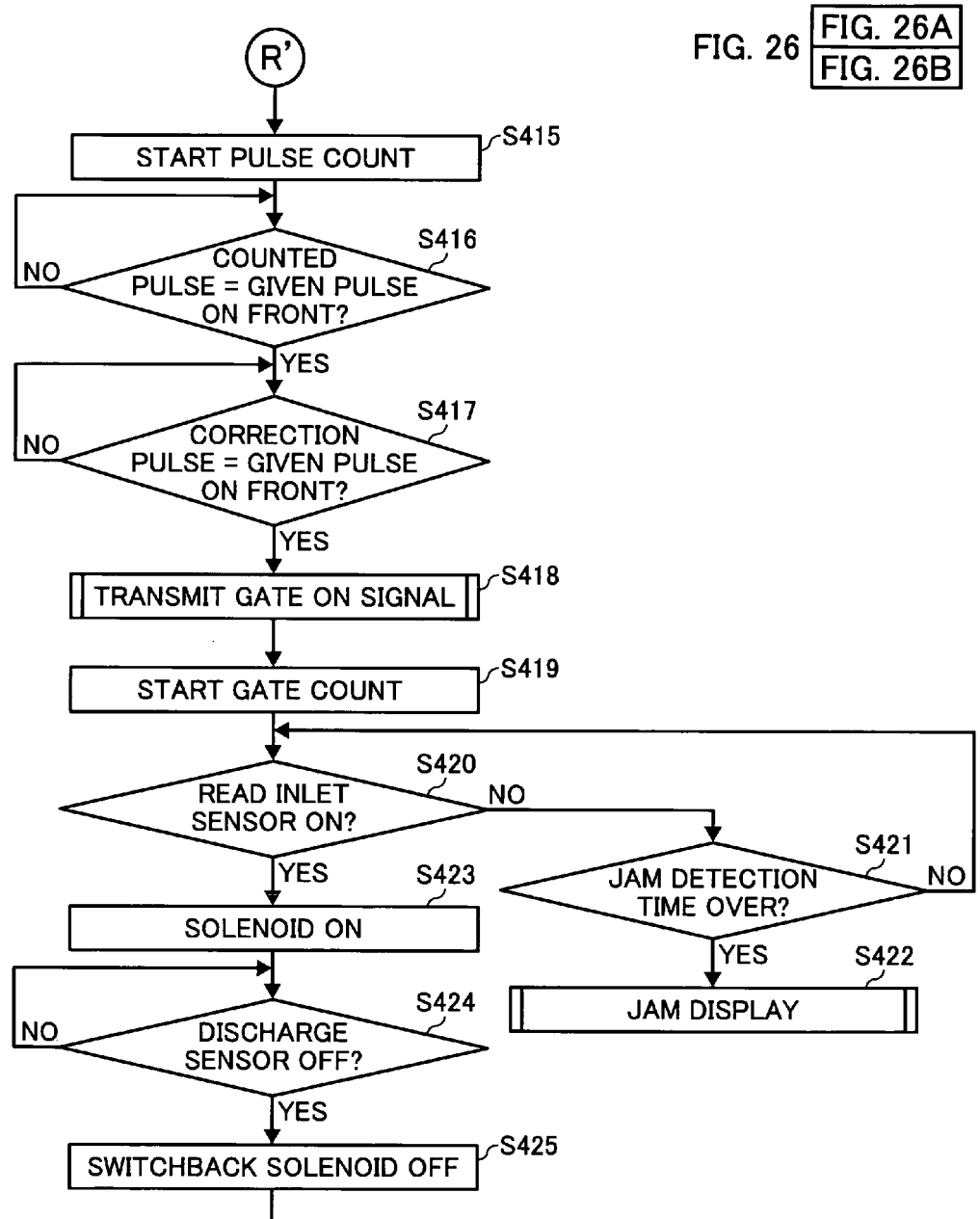

FIG. 39

| | |
|---|---|
| MESSAGE 1 | DOCUMENT SIZE NOT DETECTED. |
| MESSAGE 2 | DOCUMENT IS E-PAPER?  [YES] [NO] |
| MESSAGE 3 | SET DOCUMENT TO REGISTRATION SCALE. |
| MESSAGE 4 | CLOSE THE PANEL. |

# IMAGE READING SYSTEM, ELECTRONIC PAPER USED IN THE IMAGE READING SYSTEM, AND IMAGE READING METHOD FOR HANDLING THE ELECTRONIC PAPER IN THE IMAGE READING SYSTEM

CROSS-REFERENCE TO RELATED APPLICATION

The present patent application claims priority under 35 U.S.C. §119 from Japanese Patent Application No. 2006-327146 filed on Dec. 4, 2006, the contents and disclosure of which are hereby incorporated by reference herein in their entirety.

BACKGROUND

1. Field

Example embodiments of the present patent application generally relate to an image reading system, an electronic paper used in the image reading system, and an image reading method used for handling the electronic paper in the image reading system. More particularly, the present patent application relates to an image reading system that can feed and read various types of original documents in a mixed manner, an electronic paper used in the image reading system, and an image reading method used for handling the electronic paper in the image reading system in a mixed manner with non-electronic paper.

2. Discussion of the Related Art

Recently, widely used image reading apparatuses or systems are applicable to sheet-through-type operations, which is productive and cost-saving. A sheet-through-type image reading system feeds and transfers an original document at a given speed to a fixed image reading part or scanner part to obtain an image formed on the original document.

Such an image reading system can feed multiple sheet-type recording media, such as thin papers and thick papers. The image reading system specifies a speed of feed or transfer of papers according to types or reading magnifications of multiple sheet-type recording media placed on a document setting table so as to effectively read multiple original documents.

In addition, electronic media having favorable attributes of non-electronic media and of electronic display have been developed. (Hereinafter, such electronic media is referred to as an "electronic paper" or "e-paper".) Such electronic paper includes a display that shows images using electrophoresis. The display uses tiny microcapsules filled with electrically (negatively or positively) charged white particles (i.e., titanium oxide) and charged black particles (i.e., carbon black) suspended by clear liquid. These microcapsules are coated onto a surface of a base material. When an external voltage is applied, the particles are forced to the surface of the display, giving the pixel an appropriate appearance, such as a white appearance or a black appearance.

Such electronic paper can be connected to a personal computer or PC via a universal serial bus or USB so that the PC can update electronic data of images to be displayed on the display and/or read out the electronic data stored in a memory of the display.

Further, a technique to form the display in polymer film has been studied.

However, related-art image reading apparatuses or systems have not been designed to conduct a mixed feeding operation involving both electronic paper and non-electronic paper in a single job, and may need further efforts to achieve the above-described operation.

SUMMARY

In light of the foregoing, the inventors of the present patent application previously propose to provide an image reading system, an electronic paper used in the image reading system and an image reading method used in the image reading system for handling the electronic paper that can eliminate the drawbacks of the above-described techniques, specifically, by causing the electronic paper to be read in a mixed manner with non-electronic paper.

One or more embodiments of the present patent application has been made, taking the above-described circumstances into consideration.

An embodiment of the present patent application provides an image reading system that includes a document feeder, a media determination unit, a transfer controller, an image reader, and a read controller. The document feeder feeds and transfers an original document to a scanning position. The original document includes at least one of a non-electronic medium and an electronic paper including a memory to store electronic data in a page unit, a display unit to convert the electronic data to images per page and switch and display the images thereon, and a conductive member exposed thereon. The media determination unit determines whether the original document is the non-electronic medium or the electronic paper. The transfer controller controls a transfer operation performed by the document feeder, based on results obtained by the media determination unit. The image reader optically reads either an image formed on the non-electronic medium or on an image switchably displayed on the display unit of the electronic paper. The read controller controls a reading operation performed by the image reader.

The above-described image reading system may further include a page switcher to switch the image displayed on the display unit of the electronic paper to a next image when electronic data for multiple pages is stored in the memory of the electronic paper, and the read controller may causes the image reader to read the images per page switched by the page switcher.

The above-described image reading system may further include a first reverse path between a document setting member to set the original document, and the scanning position, a switchback path between the scanning position and a document sandwiching unit to sandwich a trailing edge in a document transfer direction of the original document, and a second reverse path between the document sandwiching unit and the scanning position. With the above-described configuration, the transfer controller may cause the document feeder to (1) to convey the electronic paper from the document setting member to the scanning position via the first reverse path, as a first transfer, (2) to convey the electronic paper from the scanning position via the switchback path and the second reverse path to the scanning position, as a second transfer, and (3) to convey the electronic paper from the scanning position via the switchback path and the second reverse path to the scanning position, as a third transfer. The page switcher may switch the image displayed on the electronic paper to the next image during the third transfer, at an upstream side from the scanning position along the document transfer direction. The read controller may cause the image reader to read the images of the electronic paper per page at the scanning position during the first and third transfers.

The above-described image reading system may further include a reverse path between a document setting member to set the original document, and the scanning position, a discharge path between the scanning position and a document discharging member to discharge and hold the original document thereon, and a retreat path between the scanning position and a document retreating member disposed upstream of the scanning position in the document transfer direction. With the above-described configuration, the transfer controller may cause the document feeder (1) to convey the electronic paper from the document setting member to the scanning position via the reverse path to read a first page of the electronic paper, (2) to convey the electronic paper from the scanning position to a given position in the vicinity of the document discharging member via the discharge path, (3) to switch back the electronic paper from the given position in the vicinity of the document discharging member to the scanning position via the discharge path to read a second page of the electronic paper, (4) to convey the electronic paper from the scanning position to the document retreating member via the retreat path, and (5) to switch back the electronic paper from the document retreating member to the scanning position via the retreat path. The page switcher may switch the images displayed on the electronic paper to the next page, at an upstream side from the scanning position along the document transfer direction and at the position in the vicinity of the document discharging member.

The read controller may cause the image reader to read the images of the electronic paper per page at the scanning position up to a given page number.

The image reader may include a moving mechanism, with image reading components mounted thereon, to move reciprocally along a horizontal direction along a lower side of a contact glass. The page switcher may switch the images displayed on the electronic paper placed on the contact glass each time the moving mechanism reciprocally moves along the lower side of the contact glass. The read controller may cause the image reader to read the images of the electronic paper up to a given page number while the moving mechanism reciprocally moves along the lower side of the contact glass.

The read controller may determine a completion of reading the images of the electronic paper is completed, based on a result of whether a given image is displayed on the display unit of the electronic paper.

The electronic paper may further include a first communication unit to communicate with the page switcher via the conductive member thereof, and the page switcher includes a second communication unit to contact with the conductive member to communicate with the electronic paper. The read controller may determine whether electronic data of images for multiple pages is stored in the memory of the electronic paper and whether an image currently displayed on the electronic paper is the last page or not, based on a signal of page data, including a total number of pages of the electronic paper, transmitted from the first communication unit to the second communication unit.

At least one embodiment of the present patent application provides a computer-readable storage device containing a set of instructions that causes an image reading system to perform an image reading method that includes the steps of controlling a media determination unit to determine whether an original document is a non-electronic medium or an electronic paper by applying electrical current, controlling a document feeder to feed and transfer the original document to a scanning position, and controlling an image reader to optically read either an image formed on the non-electronic medium or an image displayed on the display unit of the electronic paper at the scanning position. The electronic paper may include a memory to store electronic data in a page unit, a display unit to convert the electronic data to images per page and switch and display the images thereon, and a conductive member exposed thereon.

The image reading method may further include controlling a page switcher to switch the image displayed on the display unit of the electronic paper to a next page when electronic data of images for multiple pages is stored in the memory of the electronic paper, and controlling the image reader to read the images per page switched by the page switcher, at the scanning position.

At least one embodiment of the present patent application provides an electronic paper including a memory to store electronic data in a page unit, a display unit to convert the electronic data to images per page and switch and display the images thereon, a conductive member exposed thereon, and an external communication unit to communicate with an external device via the conductive member. With the above-described configuration, the electronic paper switches the image including a page number of the image and displays a next image thereon, in response to a signal transmitted from the external device.

BRIEF DESCRIPTION OF THE DRAWINGS

The accompanying drawings are intended to depict example embodiments of the present patent application and should not be interpreted to limit the scope thereof. The accompanying drawings are not to be considered as drawn to scale unless explicitly noted.

A more complete appreciation of the disclosure and many of the attendant advantages thereof will be readily obtained as the same becomes better understood by reference to the following detailed description when considered in connection with the accompanying drawings, wherein:

FIGS. 15A and 15B are flowcharts of the transfer control continued from FIG. 14;

FIGS. 16A and 16B are flowcharts of the transfer control continued from FIG. 15B;

FIGS. 24A and 24B are flowcharts of the transfer control continued from FIG. 23;

FIGS. 26A and 26B are flowcharts of the transfer control continued from FIG. 25B;

FIG. 39 shows a series of messages displayed on an operation panel provided to an image reading system according to a sixth example embodiment of the present patent application.

DETAILED DESCRIPTION OF EXAMPLE EMBODIMENTS

Figure 1:
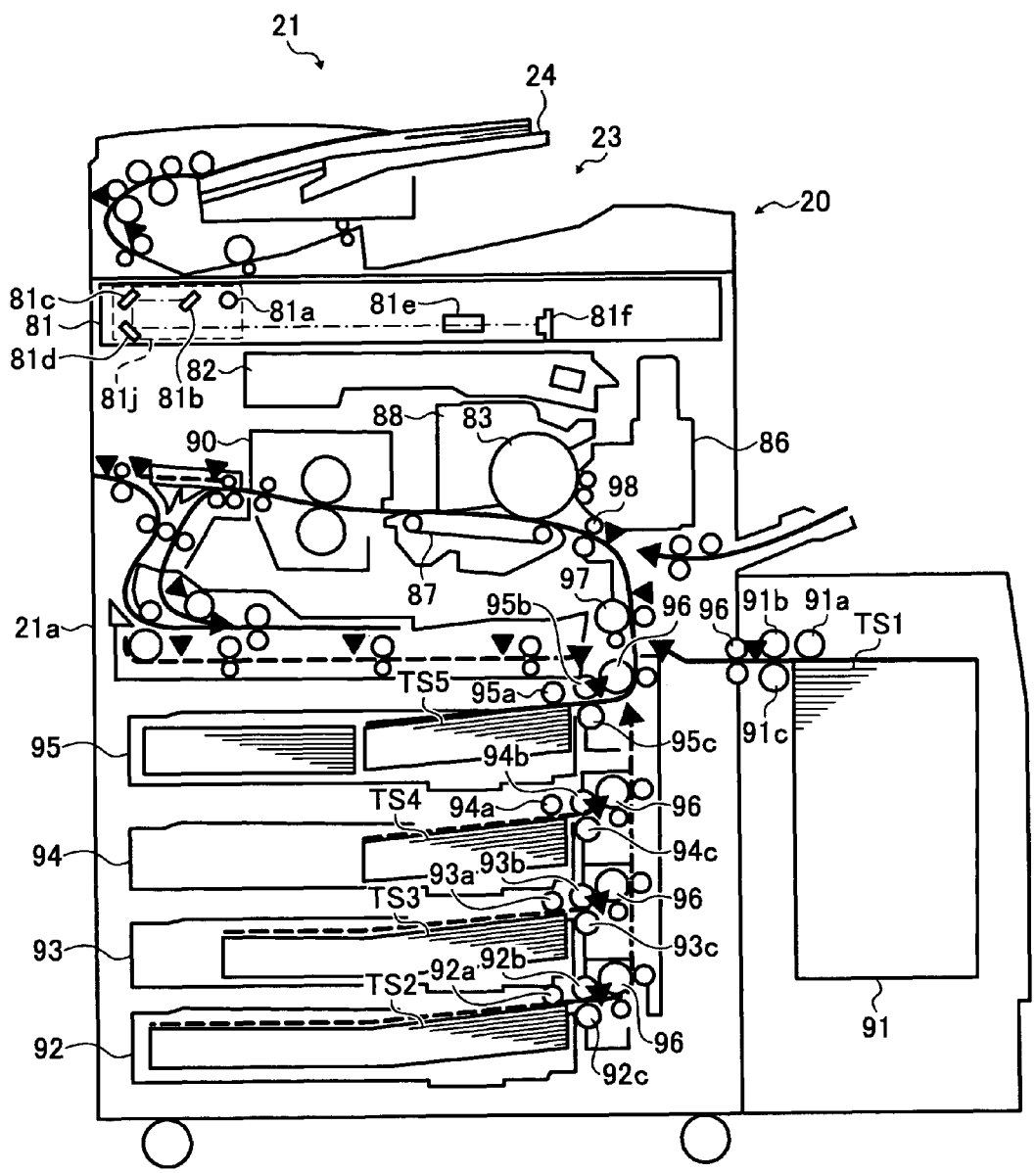
FIG. 1 is a cross-sectional view of a schematic configuration of an image forming apparatus including an image reading system according to an example embodiment of the present patent application.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would hen be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present patent application.

The terminology used herein is for the purpose of describing particular embodiments only and is not intended to be limiting of the present patent application. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views, example embodiments of the present patent application are described.

Now, example embodiments of the present patent application are described in detail below with reference to the accompanying drawings.

Descriptions are given, with reference to the accompanying drawings, of examples, example embodiments, modification of example embodiments, etc., of an image reading mechanism according to the present patent application, an electronic paper, according to the present patent application, used in the image reading mechanism, and an image reading method, according to the present patent application, used in the image reading mechanism for handling the electronic paper according to the present patent application. Elements having the same functions and shapes are denoted by the same reference numerals throughout the specification and redundant descriptions are omitted. Elements that do not require descriptions may be omitted from the drawings as a matter of convenience. Reference numerals of elements extracted from the patent publications are in parentheses so as to be distinguished from those of example embodiments of the present patent application.

The present patent application includes a technique applicable to any image reading system. For example, the technique of the present patent application is implemented in the most effective manner in an electrophotographic image forming apparatus including an image reading system.

FIGS. 1 through 20 show an image reading system, including an automatic document feeder or ADF and an image reader, according to a first example embodiment of the present patent application, and an image forming apparatus, according to the first example embodiment of the present patent application, including the image reading system.

In the first example embodiment, an image forming apparatus corresponds to a copier 21.

Alternative to the copier 21, an image forming apparatus can include a facsimile machine, printer, and multiple image forming apparatus including at least two functions of copier, facsimile machine, and so forth. In addition, an image reading system can be a scanner, facsimile machine, and multiple image forming apparatus having at least two functions of copier, facsimile machine, and so forth.

In FIG. 1, the copier 21 includes a copy main body 21a that includes a contact glass 22a (see FIG. 2), a slit glass 22b (see FIG. 2), and various image forming units and components of the copier 21 so as to form an image on a recording medium.

The contact glass 22a is translucent and mounted on the top of the copier main body 21a.

The slit glass 22b, which includes a scanning position 80, is also mounted on the top of the copier main body 21a and next to the contact glass 22a. The slit glass 22b (see FIG. 2) is also translucent and has a smaller area than the contact glass 22a.

Above the copier main body 21a, an automatic document feeder or ADF 23 is mounted.

The ADF 23 is hinged or attached via a hinging member, not shown, to the copier main body 21a so that the contact glass 22a can be selectively covered or uncovered.

The copier 21 includes other various image forming components and parts, such as an image reader 81, which will be described later. The image reader 81 and the ADF 23 form an image reading system 20 to feed and transfer original documents, including electronic papers and non-electronic media or papers to be read effectively. Hereinafter, the non-electronic media is referred to as a "non-electronic paper", for example, even though the materials of the non-electronic media are not limited to a paper sheet.

Next, details of the ADF 23 are described, in reference to FIGS. 2 through 8.

Figure 2:
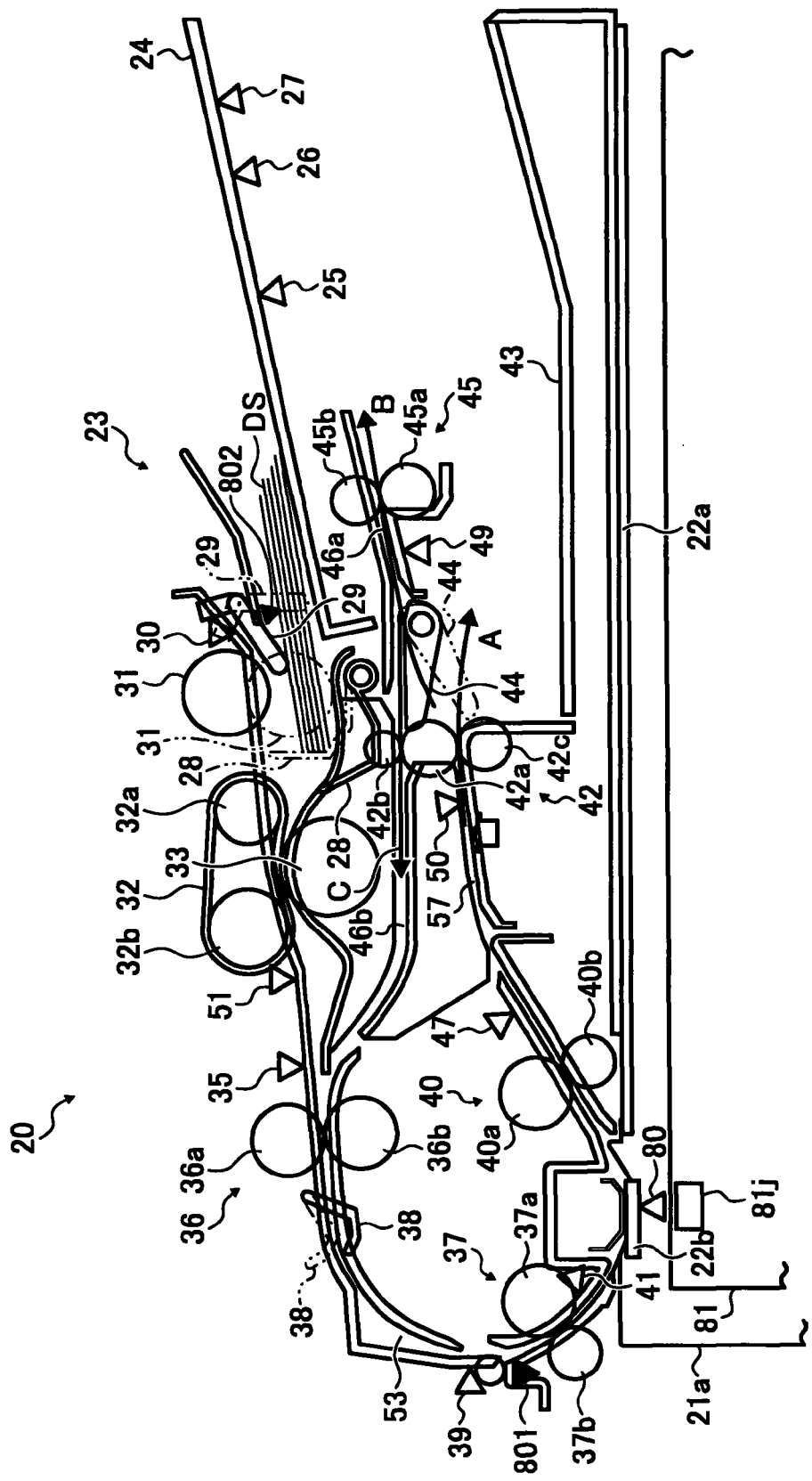
FIG. 2 is a cross-sectional view of a schematic configuration of the image reading system of FIG. 1, including a document feeder and an image reader, according to an example embodiment of the present patent application.
Figure 3:
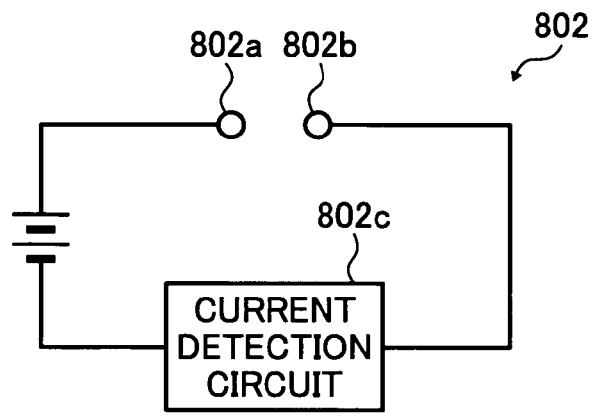
FIG. 3 is a block diagram of an electronic medium detection unit included in the image reading system of FIG. 1, according to an example embodiment of the present patent application.
Figure 4:
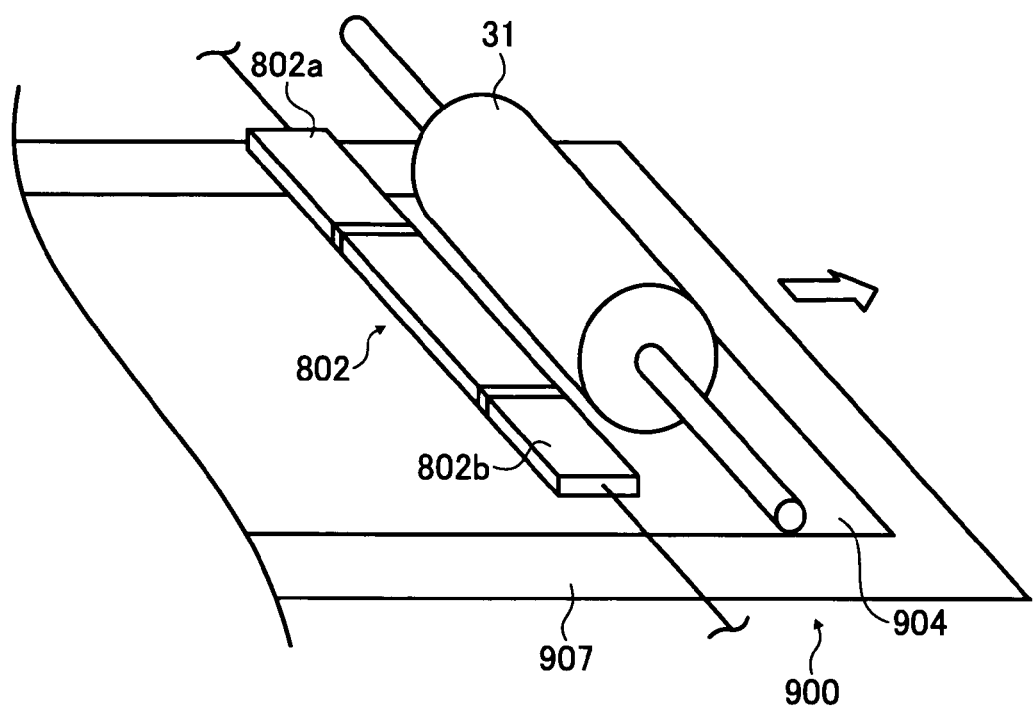
FIG. 4 is a perspective view of the electronic medium detection unit of FIG. 3.
Figure 5:
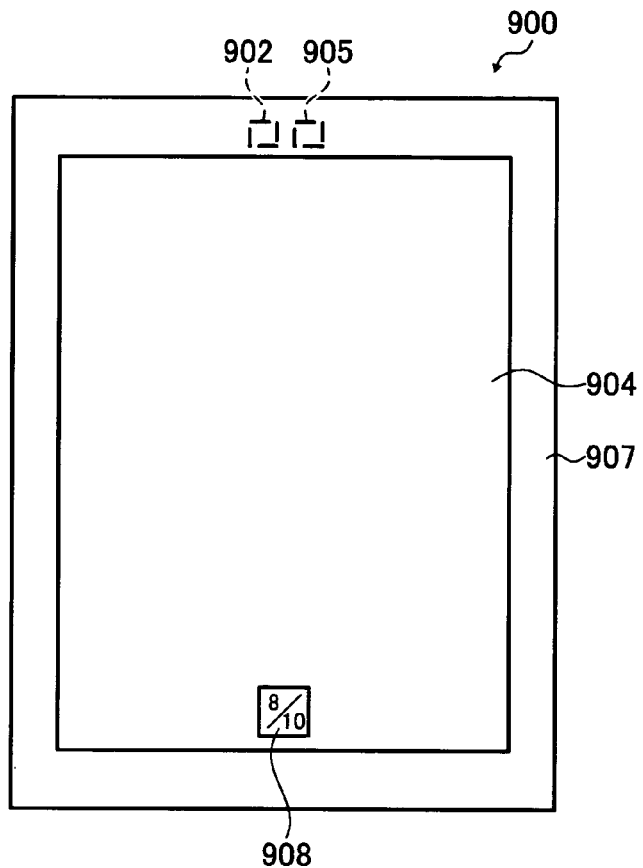
FIG. 5 is a plan view of an electronic paper fed in the image reading system of FIG. 1, according to an example embodiment of the present patent application.
Figure 6:
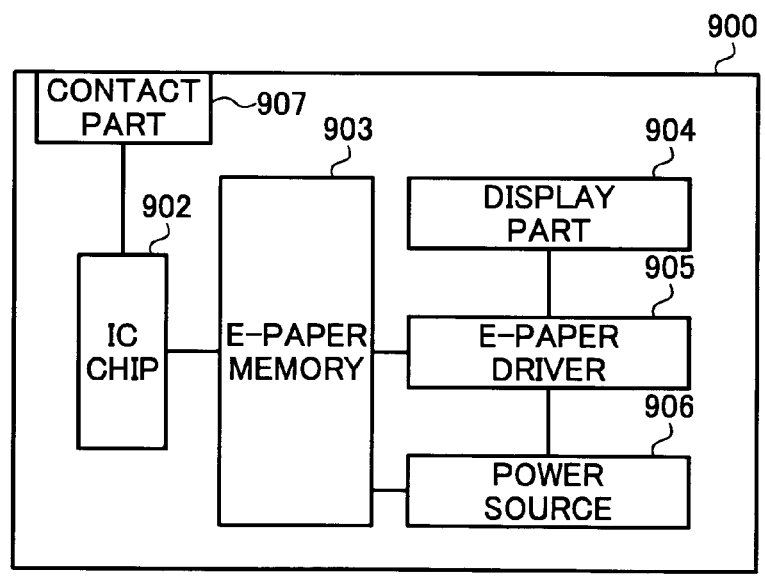
FIG. 6 is a block diagram of the electronic paper of FIG. 5, according to an example embodiment of the present patent application.
Figure 7:
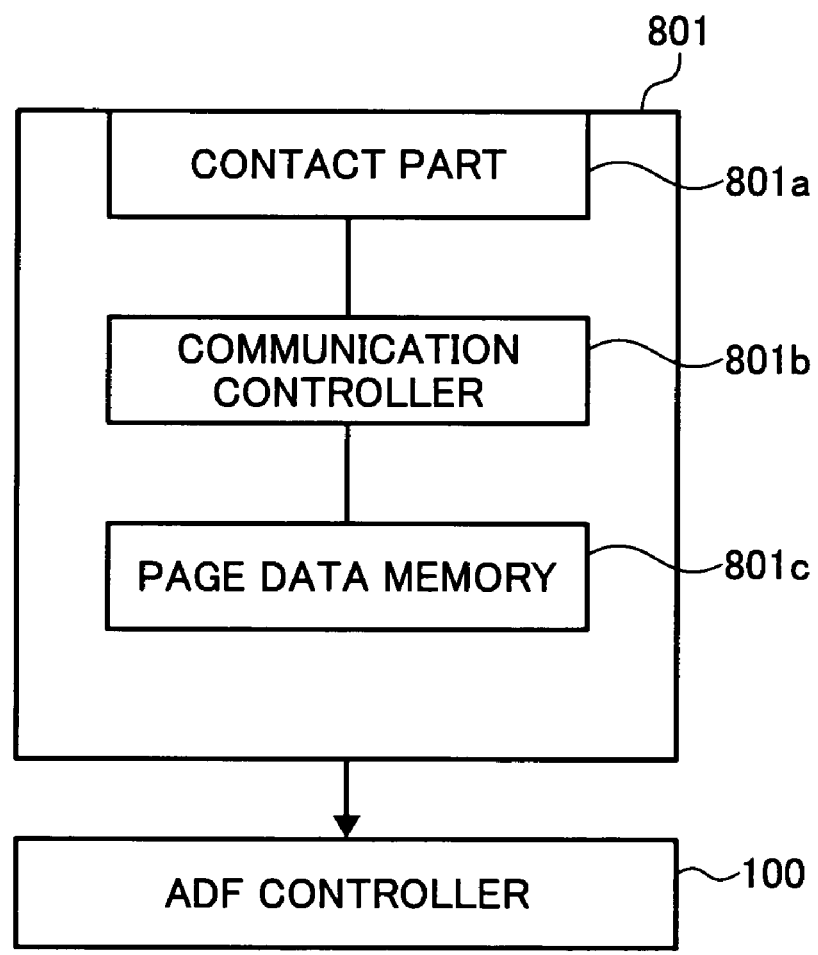
FIG. 7 is a block diagram of a page switching unit used in the image reading system of FIG. 1, according to an example embodiment of the present patent application.
Figure 8:
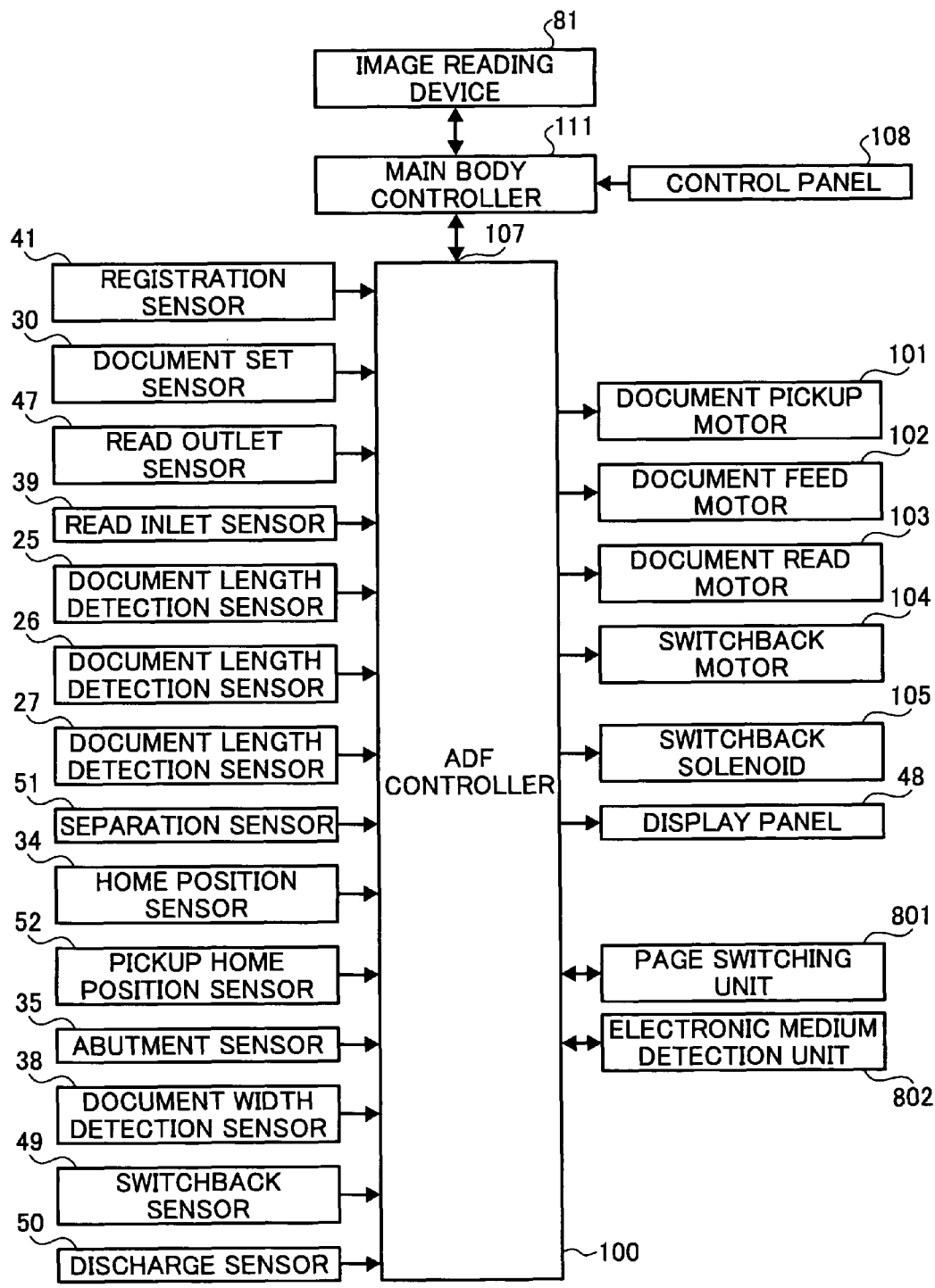
FIG. 8 is a block diagram of a control system of the image reading system of FIG. 1, according to a first example embodiment of the present patent application.

FIG. 2 is a schematic configuration of the image reading system 20 including the ADF 23 connected to the scanner 81 provided in the copier main body 21a. FIG. 3 is a block diagram of an electronic medium detection unit 802. FIG. 4 is a perspective view of the electronic medium detection unit 802. FIG. 5 is a schematic configuration of an electronic paper 900. FIG. 6 is a block diagram of the electronic paper 900. FIG. 7 is a block diagram of a page switching unit 801. FIG. 8 is a block diagram of the image reading system 20, focusing on an ADF controller 100 of the ADF 23 according to the first example embodiment of the present patent application.

In FIG. 2, the ADF 23 serves as a transfer controller and a read controller and includes a document setting table 24 that serves as an original document stacker. On the document setting table 24, an original document stack DS that is a stack of original documents are placed in a face-up manner. The original document stack DS holds either or both of paper sheets serving as non-electronic paper and/or electronic papers thereon.

In the ADF 23, document length detection sensors 25, 26, and 27 are mounted on a table part of the document setting table 24. The document length detection sensors 25, 25, and 27 serve as document length detecting member.

Each of the length detection sensors 25, 25, and 27 includes a combination of a light receiving element and a light emitting element.

Specifically, the length detection sensors 25, 25, and 27 are disposed on the document setting table 24 so as to determine at least the orientation (portrait or landscape) of the same size of the original documents.

The ADF controller 100 determines the length of the original document stack DS in a document travel direction of the original document stacker DS accumulated on the document setting table 24, based on information input from the light receiving elements of the length detection sensors 25, 25, and 27.

A document stopper 28 is disposed at a downstream side in the document travel direction with respect to the document setting table 24. The document stopper 28 serves as a stopping member to move between an abutment position, which is indicated by a chain double-dashed line in FIG. 2, to which a document pickup motor 101 may cause the leading edge of the original document stack DS to transfer and abut against, and a home position, which is indicated by a solid line in FIG. 2, to which the document pickup motor 101 may cause the document stopper 28 to retreat therefrom.

When the document stopper 28 is at the abutment position, the leading edge of the original document stack DS is abut to the document stopper 28, thereby the leading edge of the original document stack DS can be aligned.

In addition, by abutting the original document stack DS to side fences, not shown, mounted on the document setting table 24, the width direction of the original document stack DS can be positioned in a direction perpendicular to the document travel direction of the original document.

When the document stopper 28 moves in a downward direction toward its home position, a home position sensor 34

(see FIG. 8) may detect the movement of the document stopper 28 and output the detection result to the ADF controller 100.

On the original document setting table 24 at a side of the leading edge of the original document stack DS, a document set filler 29 and a document set sensor 30 are mounted.

When the original document stack DS is mounted on the document setting table 24, the leading edge of the original document stack DS pushes the document set filler 29, therefore, the document set filler 29 may move from a position that is indicated by a chain double-dashed line in FIG. 2 to a position that is indicated by a solid line in FIG. 2.

When the document set filler 29 changes its position from the undetected state of the original document stack DS to the detected state of the original document stack DS, the document set sensor 30 may output a signal to the ADF controller 100.

The ADF controller 100 is connected to a main body controller 111 via an interface or I/F 107 and outputs the signal to the I/F 107. The main body controller 111 is mounted on the main body 21a of the copier 21.

Based on the input signal, the main body controller 111 may shift to a standby condition for reading original documents in the copier main body 21a by the image reader 81 or the scanner 81. Hereinafter, the image reader 81 is referred to as a "scanner 81."

Above the document stopper 28, a document pickup roller 31 that serves as a document pickup member is disposed.

The document pickup roller 31 may transmit the driving force from the document pickup motor 101 via a document pickup cam, not shown. The document pickup motor 101 and the document pickup cam may cause the document pickup roller 31 to move in a vertical direction between a home position that is indicated by a solid line in FIG. 2 to retreat from the original document stack DS and a contact position that is indicated by a chain double-dashed line in FIG. 2 to contact with the top of the original document stack DS.

When the document pickup roller 31 moves in an upward direction toward its home position, a pickup roller home position sensor 52 (see FIG. 8) may detect the movement of the document pickup roller 31 and output the detection result to the ADF controller 100.

The electronic medium detection unit 802 serves as a media determination unit and is disposed in the vicinity and at an upstream side of the document pickup roller 31 in the document travel direction along a document transfer path.

As shown in FIG. 3, the electronic medium detection unit 802 includes terminals 802a and 802b, a battery, not shown, and a current detection circuit 802c.

The terminals 802a and 802b contact an original document picked up by the document pickup roller 31.

The battery causes electrical current to flow between the terminals 802a and 802b.

The current detection circuit 802c detects the electrical current flowing between the terminals 802a and 802b.

The electronic medium detection unit 802 is supported by a supporting member, not shown, so that the terminals 802a and 802b may contact the top of the original document stack DS placed on the document table 24, as shown in FIG. 4. Detection results of the current detection circuit 802c are transmitted to the ADF controller 100. According to the detection results, the ADF controller 100 determines whether the original document is an electronic paper 900 or a non-electronic paper such as a paper sheet. Specifically, the electronic paper 900 includes a metallic member corresponding to a contact part 907 (see FIG. 4) around edges thereof.

When the metallic member and the terminals 802a and 802b contact and electrical current is conducted between the terminals 802a and 802b, the ADF controller 100 determines that the original document passing under the current detection circuit 802c is the electronic paper 900.

By contrast, when electrical current is not conducted between the terminals 802a and 802b while the metallic member and the terminals 802a and 802b are held in contact with each other, the ADF controller 100 determines that the original document passing under the current detection circuit 802c is a non-electronic paper such as a paper sheet.

As shown in FIG. 5, the electronic paper 900 includes a display surface (a screen) of a display part 904 on one side thereof. A page display region 908 displays page data. For example, the 8th page of 10 pages in total is indicated as "8/10".

The display part 904 serves as a display unit and includes a polymer film liquid crystal display or PFLCD that is a liquid crystal display using polymer film. The PFLCD can change its form into an optional form. Therefore, the electronic paper 900 can be conveyed to the ADF 23 in a same manner as a paper sheet.

Further, a contact part 907, such as a metallic foil, is formed around the edges of the display surface of the display part 904. The electronic paper 900 is provided with a page switching button, not shown, for directing a page switching operation or a display updating operation to switch or change an image displayed on the display part 904 according to this instruction.

More specifically, as shown in FIG. 6, the electronic paper 900 includes an integrated circuit chip or IC chip 902, an electronic paper-memory 903, a display part 904, an electronic paper driver 905, a power source 906, the contact part 907, and the page display region 908.

The electronic paper memory 903 includes rewritable, non-volatile memory element such as electronically erasable and programmable read-only memory or EEPROM.

The display part 904 corresponds to a microcapsule-type electrophoretic display, for example. The display part 904 switches or changes images shown thereon according to specified pages. The image includes text, drawing, picture, and so forth.

The electronic paper driver 905 serves as a display unit and converts data or electronic data stored in the IC chip 902 into display data.

The power source 906 corresponds to solar battery or button battery.

The IC chip 902 serves as a memory or storing unit and includes an input terminal and an output terminal and is connected to the contact part 907. The IC chip 902 further includes an IC chip memory, not shown, and a communication control circuit, not shown. The IC chip memory stores various data, for example, electronic data serving as image data divided into pages or sections and page data including the number of pages of images. The communication control circuit transmits and receives data signal via the contact part 907 to and from the IC chip memory connected thereto.

The contact part 907 serves as a conductive member and is provided around the edges, i.e., three edges of the electronic paper 900, so that the contact part 907 can be located at a leading edge in a document travel direction of the electronic paper 900 regardless of a setting orientation of the electronic paper 900.

The communication control circuit of the IC chip 902 receives a signal transmitted from a page switching unit 801, which is described later, and instructs a page switching operation to the electronic paper driver 905, based on the page data stored in the IC chip memory of the IC chip 902. When the first page or the last page of the electronic paper 900 is displayed after the page switching operation has been performed, the communication control circuit transmits a specific signal, i.e., a signal indicating the page is the first page or a signal indicating the page is the last page, to the page switching unit 801 via the contact part 907.

Next, details of a reading operation performed by the ADF 23 and the scanner 81 forming the image reading system 20 are described.

When a print key that is displayed on a control panel 108 mounted on the copier main body 21a is pressed, the main body controller 111 may transmit a document pickup signal via the I/F 107 to the ADF controller 100. After receiving the document-pickup signal, the ADF controller 100 may drive the document pickup motor 101 to rotate in a normal direction so as to cause the document stopper 28 to retreat from the original document stack DS to move in a downward direction.

When the document stopper 28 moves to the home position, the home position sensor 34 may detect the movement of the document stopper 28, and the ADF controller 100 may drive the document pickup motor 101 in a reverse direction so as to cause the document pickup roller 31 to move down to a position to contact with the original document stack DS.

At this time, a document feed motor 102 (see FIG. 8) may rotate in a normal direction. This may cause the document pickup roller 31 to start feeding original documents, desirably one document sheet, from the original document stack DS accumulated on the document setting table 24.

The fed original document may be transferred to a document feeding belt 32 and a reverse roller 33 disposed at the downstream side of the document pickup roller 31. The document feeding belt 32 and the reverse roller 33 may form a separation and transfer mechanism together with some other components.

The electronic medium detection unit 802 applies current to the original document stack DS to detect whether the original document is an electronic paper or not. The detection results including media type data are transmitted to the ADF controller 100.

The document feeding belt 32 shown in FIG. 2 is extended by and spanned around a drive roller 32a and a driven roller 32b. When the driving force of the document feed motor 102 is transmitted to the drive roller 32a, the document feeding belt 32 in a shape of an endless loop may rotate.

When the document feed motor 102 is rotated in a normal direction, the document feeding belt 32 may rotate to move an original document in the document travel direction, which is a rotation in a clockwise direction in FIG. 2.

The reverse roller 33 includes a torque limiter, not shown. When the document feed motor 102 is rotated in a normal direction, the reverse roller 33 may be rotated in a direction opposite to the document travel direction, which is a rotation in a counterclockwise direction in FIG. 2.

With the above-described operations, an original document placed on the top of the original document stack DS and a next original document placed immediately below the top original document may be separated and only the top original document may be fed.

Specifically, the reverse roller 33 may be held in contact with the document feeding belt 32 with a sufficient pressure.

When being held in contact with the document feeding belt 32 directly or via one original document, the reverse roller 33 may be rotated with the document feeding belt 32 in a rotation in a counterclockwise direction.

When two or more original documents enter between the document feeding belt 32 and the reverse roller 33, the force of the reverse roller 33 being rotated with the document feeding belt 32 may be set to a value smaller than the torque of the torque limiter.

Accordingly, the reverse roller 33 can rotate in a clockwise direction to push back extra original document(s), so as to reduce, or prevent if possible, a chance of multi-feeding of original documents.

The separately fed original document may be detected by a separation sensor 51 disposed downstream of the document feeding belt 32. The separation sensor 51 may serve as a separated document detection unit.

The original document detected by the separation sensor 51 may be further transferred by the document feeding belt 32. When the original document proceeds by a reference amount of X mm after the leading edge of the original document is detected by an abutment sensor 35 that is disposed at the downstream side of the document feeding belt 32, the ADF controller 100 may stop the rotation of the document feed motor 102 in the normal direction.

The reference amount of X mm is set to a distance that is greater than the distance between the abutment sensor 35 and a nip contact of a pair of pull-out rollers 36. That is, the original document transferred thereto may be stopped while being bowed in a constant manner with the leading edge thereof abut against the nip contact formed between a pull-out drive roller 36a and a pull-out driven roller 36b that are in sliding contact with each other.

At this time, according to the instructions from the ADF controller 100, the document pickup motor 101 is rotated in a normal direction to retreat the document pickup roller 31 from the top surface of the original document and transfer the original document by the transfer force of the document feeding belt 32 only. Therefore, the leading edge of the original document abuts against the nip contact formed between the pull-out drive roller 36a and the pull-out driven roller 36b of the pair of pull-out rollers 36. This can correct the skew of the original document separated from the original document stack DS.

Further, after the skew of the original document is corrected by the reverse rotation of the document feed motor 102, the pull-out drive roller 36a and the pull-out driven roller 36b may transfer the original document toward a pair of read inlet rollers 37 disposed at the downstream side of the document transfer path via a reverse path 53. The pair of read inlet rollers 37 shown in FIG. 2 includes a read inlet drive roller 37a and a read inlet driven roller 37b.

Further, when the document feed motor 102 is rotated in a reverse direction, the pull-out drive roller 36a may be rotated but the driving force thereof may not be transmitted to the document pickup roller 31 and the document feeding belt 32 caused by the function of a later described one-way clutch.

Further, at the downstream side of the pull-out drive roller 36a and the pull-out driven roller 36b, multiple document width detection sensors 38 are mounted. The multiple document width detection sensors 38 are disposed or aligned along a direction perpendicular to the sheet of FIG. 2, so as to move between a position that is indicated by the solid line in FIG. 2 and a position that is indicated by the chain double-dashed line in FIG. 2.

When an original document is detected, the multiple document width detection sensors 38 may move to the position that is indicated by the chain double-dashed line. The document width detection sensors 38 may then obtain information of the width direction that runs perpendicular to the document travel direction of the original document transferred by the pull-out drive roller 36a and the pull-out driven roller 36b, and transmit the detection results to the ADF controller 100.

The ADF controller 100 may transmit, to the main body controller 111, information of the size of the original document stack DS accumulated on the document setting table 24, based on the detection results of the length of the original document obtained by the document length detection sensors 25, 26, and 27 and the detection results of the width of the original document obtained by the document width detection sensors 38.

Further, the ADF controller 100 may count the number of motor drive pulses that corresponds to a distance of the original document transferred while the abutment sensor 35 is detecting the leading edge and trailing edge of the original document. By counting the number of motor drive pulses, the correct length of an original document may be calculated.

Further, when the original document is transferred to the pair of read inlet rollers 37 by rotating the pull-out drive roller 36a, the transfer speed of the original document may be set to a high speed to reduce a time to transfer the original document to the scanning position 80 provided on the slit glass 22b. Specially, from a second original document and after, the high speed of document transfer can reduce a distance between two sequentially processed original documents. This can enhance the productivity in conveying or transferring original documents. In addition, when a read inlet sensor 39 detects the leading edge of the original document, the transfer speed may be decreased before the leading edge of the original document comes to the pair of read inlet rollers 37.

After the electronic medium detection unit 802 detects that the original document is an electronic paper 900, when the read inlet sensor 39 detects the leading edge of the original document, the ADF controller 100 instructs the page switching operation of the electronic paper 900 to the page switching unit 801, which serves as a page switcher, disposed in the vicinity of the read inlet sensor 39.

As shown in FIG. 7, the page switching unit 801 includes a contact part 801a, a communication controller 801b, and a page data memory 801c.

The contact part 801a contacts the contact part 907 of the electronic paper 900 to apply electrical current and transmit or receive a given signal to or from the electronic paper 900.

The communication controller 801b includes the above-described communication control circuit and so forth. The communication controller 801b transmits a specific signal, for example, a signal to instruct a page switching operation with respect to the electronic paper 900, and receives a specific page data signal from the electronic paper 900. The specific page data signal includes a signal indicating the page is the first page of the electronic paper 900 and a signal indicating the page is the last page of the electronic paper 900.

The page data memory 801c stores page data obtained by demodulating a page data signal transmitted by the electronic paper 900. The page data is transmitted to the ADF controller 100.

Based on the page data, the ADF controller 100 may determine parameter settings of a transfer operation including a conveying path, a conveying pressure, a conveying speed, etc.

Further, the main body controller 111 may obtain the page data via the ADF controller 100 and set an image reading operation of the scanner 81.

The communication controller 801b and the page data memory 801c can be mounted on an IC chip.

The ADF controller 100 may rotate and stop the document feed motor 102 so as to make the transfer distance longer by Y mm than the distance between the read inlet sensor 39 and the pair of read inlet rollers 37. The original document transferred to the nip contact of the pair of read inlet rollers 37 may be stopped while being bowed in a constant manner with the leading edge thereof abut against the nip contact of the pair of read inlet rollers 37 that is being stopped. This can correct skew occurred when the pair of pull-out rollers 36 is conveying the original document.

In the first example embodiment of the present patent application, the pair of read inlet rollers 37 may include a pair of rollers dedicated for correcting skew.

Further, when an original document is temporarily stopped at the nip contact of the pair of read inlet rollers 37 (which is referred to as a "registration stop"), the ADF controller 100 may transmit a registration stop signal to the main body controller 111 via the I/F 107.

When the registration stop signal is transmitted to the main body controller 111, the ADF controller 100 may receive a read start signal from the main body controller 111. The ADF controller 100 drives a document read motor 103 so that the original document stopped at the nip contact of the pair of read inlet rollers 37 can be transferred at a transfer speed according to a read scan magnification for paper sheet or a given communication period for electronic paper, and causes a pair of read outlet rollers 40 to transfer the original document. The pair of read outlet rollers 40 includes a read outlet drive roller 40a and a read outlet driven roller 40b.

When the read start signal is received before the leading edge of the original document reaches a registration sensor 41 that is mounted at an upstream side of the slit glass 22b, the ADF controller 100 may perform the reading operation without executing the registration stop.

In the reading operation without executing the registration stop, the original document may not be stopped at the nip contact of the pair of read inlet rollers 37 and is transferred while the scan transfer speed is maintained.

The registration sensor 41 detects the leading edge of an original document. When the registration sensor 41 detects the leading edge of the original document including a paper sheet or the electronic paper 900, the ADF controller 100 may start a pulse count or counting pulses of the document read motor 103. At the timing that the leading edge of the original document reaches the scanning position 80 on the slit glass 22b, the ADF controller 100 may transmit a gate signal that indicates an image area in a sub-scanning direction, to the main body controller 111. The ADF controller 100 generally keeps transmitting the gate signal until the trailing edge of the original document completely passes over the scanning position 80.

After passing over the scanning position 80 via the reverse path 53, the original document may be reversed from the front face to the reverse face and is transferred by the pair of read outlet rollers 40 and a document discharging roller set 42. After front face side or both faces of the original document are scanned or read, the original document may be discharged to a document discharging tray 43 that serves as a document discharging member.

In addition, the document discharging roller set 42 includes a discharge drive roller 42a, an upper discharge driven roller 42b, and a lower discharge driven roller 42c. At a downstream side of the document discharging roller set 42, a path switching member 44 is disposed.

When scanning the front face of a double face original document in transfer of the double face original document, before the leading edge of the double face original document passing over the scanning position 80 reaches the document discharging roller set 42, a switchback solenoid 105 (see FIG. 8) may drive the path switching member 44 to be switched to the position indicated by the chain double-dashed line in FIG. 2.

At this time, the discharge drive roller 42a and the lower discharge driven roller 42c driven by the document read motor 103 and a pair of switchback rollers 45 driven by a document switchback motor 104 (see FIG. 8) may transfer the original document to a switchback path 46a, which serves as a switchback path and/or a reverse path.

The pair of switchback rollers 45 includes a switchback drive roller 45a and a switchback driven roller 45b.

After a read outlet sensor 47 that is disposed at the downstream side of the pair of read outlet rollers 40 has detected the trailing edge of the original document and the drive pulses of the document read motor 103 has reached a reference number of pulses, the ADF controller 100 may determine that the trailing edge of the original document has passed the document discharging roller set 42 and turn off the switchback solenoid 105 to move the path switching member 44 to the position that is indicated by the solid line shown in FIG. 2.

Further, as previously described, after the number of drive pulses of the document read motor 103 has reached the reference number of pulses, the ADF controller 100 may drive the document switchback motor 104 to rotate in a reverse direction to rotate the pair of switchback rollers 45 in a reverse direction. This may switch back the original document toward the pair of pull-out rollers 36.

At this time, the rotation direction of the document read motor 103 is in the normal direction and the rotation direction of the document switchback motor 104 is the opposite or reverse direction of the document transfer direction. The document switchback motor 104 and the document read motor 103 may be driven at high speed, thereby reducing the processing time.

Further, after the switchback of the original document has been started, the number of drive pulses of the document switchback motor 104 may shortly reach the reference number of pulses. After that, the ADF controller 100 may drive the document feed motor 102 in a reverse direction at high speed, thereby transferring the original document to the pair of pull-out rollers 36 at high speed.

Further, when a switchback sensor 49 detects the trailing edge of the original document that is transferred to a re-entry path 46b, which serves as a reverse path, the ADF controller 100 may stop the reverse rotation of the pair of switchback rollers 45, based on the detection results obtained from the switchback sensor 49.

After the stop of the pair of switchback rollers 45, the pair of pull-out rollers 36 may correct the skew of the original document. As described above, one side or front face of the original document is scanned. Then, the original document may be switched back again into the switchback path 46a, and pass through the re-entry path 46b, and be transferred toward the scanning position 80.

Thus, the original document may be reversed without being scanned or read, be collated in a proper page order, and be discharged to the document discharging tray 43.

Further, a discharge sensor 50 is disposed at the upstream side of the document discharging roller set 42 along a discharge path 57.

The discharge sensor 50 may detect the trailing edge of the original document to output a signal to the ADF controller 100. The ADF controller 100 may determine, based on the detection results, that the original document is discharged.

Further, the copier main body 21a further includes a display panel 48.

The ADF controller 100 may determine whether a jam has occurred, based on the respective detection results from the abutment sensor 35, the read inlet sensor 39, the registration sensor 41, the read outlet sensor 47, the switchback sensor 49, the discharge sensor 50, the document length detection sensors 25, 26, and 27, and so forth. When it is determined that the jam has occurred, the ADF controller 100 may display a message on the display panel 48 to inform the occurrence of jam.

The copier main body 21a of the copier 21 shown in FIG. 1 further includes the scanner 81, a writing device 82, and a photoconductive drum 83. Image data that has been read by the scanner 81 may be exposed and written by the writing device 82 to the photoconductive drum 83.

The scanner 81 of FIG. 1 includes a light source 81a, a first mirror 81b, a second mirror 81c, a third mirror 81d, a lens 81e, and a charge-coupled device (CCD) image sensor 81f, which are image forming components.

The light source 81a may illuminate an original document placed on the contact glass 22a or the slit glass 22b.

The first mirror 81b, the second mirror 81c, and the third mirror 81d may respectively reflect light reflected by the original document.

The lens 81e may form the light reflected by the third mirror 81d to the CCD image sensor 81f.

The CCD image sensor 81f may convert the light formed as image by the lens 81e into an electrical signal.

The light source 81a and the first mirror 81b are mounted on a first moving member 81g, and the second mirror 81c and the third mirror 81d are mounted on a second moving member 81h.

The first moving member 81g and the second moving member 81h form a moving mechanism 81j may move along the contact glass 22a and the slit glass 22b in FIG. 1.

When reading or scanning an original document that is placed on the contact glass 22a, the moving mechanism 81j including the first moving member 81g and the second moving member 81h may be moved or slid under the contact glass 22a in the left and right directions or horizontal direction in FIG. 1.

When reading or scanning an original document that is passing over the slit glass 22b, the first moving member 81g and the second moving member 81h forming the moving mechanism 81j may be stopped under the slit glass 22b.

The scanner 81 can read or scan images, i.e., text, drawing, picture, and so forth, on a paper sheet and the electronic paper 900.

Electronic data of the read image may further be transmitted to the main body controller 111 so that the electronic data can be stored in a storage unit, not shown, then be transmitted to network via a communication unit, not shown.

The writing device 82 may emit a laser light beam that is modulated according to the image data read by the scanner 81, and expose the charged surface of the photoconductive drum 83 with the laser light beam.

Various image forming components and parts may be arranged around the photoconductive drum 83, which is one of the image forming components and parts. These image forming components and parts are, for example, a developing device 86, a transfer belt 87, a cleaning device 88, a charging device, not shown, and a discharging device, not shown.

The charging device may charge the surface of the photoconductive drum 83 to a constant potential, by a positive corona discharge in the dark that is controlled by a grid.

The writing device 82 may emit a laser diode including image data onto the uniformly charged surface of the photoconductive drum 83 and remove the negative charge on the surface of the photoconductive drum 83 to form an electrostatic latent image.

The developing device 86 may adhere negatively charged toner onto a charge discharged portion on the surface of the photoconductive drum 83 to form a visible toner image.

The transfer belt 87 that is applied with a positive bias may transfer the visible toner image that is negatively charged onto a transfer sheet serving as a recording medium and convey the transfer sheet having the visible toner image thereon.

The cleaning device 88 may include a cleaning blade, not shown, to scrape residual toner remaining on the surface of the photoconductive drum 83.

The discharging device may remove residual charge from the surface of the photoconductive drum 83 by illuminating light-emitting diodes (LEDs) to cause the photoconductive drum 83 to be ready for the next image forming onto a next transfer sheet.

The transfer sheet having the visible toner image formed as described above may be transferred to a fixing device 90, by which the visible toner image may be fixed onto the transfer sheet.

In addition, the copier main body 21a of the copier 21 of FIG. 1 includes a plurality of sheet cassettes 91, 92, 93, 94, and 95, in which respective transfer sheets S1, S2, S3, S4, and S5 having various sizes are accommodated.

The transfer sheets TS1, TS2, TS3, TS4, and TS5 accommodated in the plurality of sheet cassettes 91, 92, 93, 94, and 95, respectively, may be picked up and fed to a sheet transfer path by pickup rollers 91a, 92a, 93a, 94a, and 95a, respectively. The transfer sheets TS1, TS2, TS3, TS4, and TS5 may then be separated by sheet feeding rollers 91b, 92b, 93b, 94b, and 95b, rotating in a sheet travel direction, and reverse rollers 91c, 92c, 93c, 94c, and 95c, being held in sliding contact with the sheet feeding rollers 91b, 92b, 93b, 94b, and 95b, respectively, and rotating in a separating direction.

After the separation, the transfer sheets TS1, TS2, TS3, TS4, and TS5 may be transferred to a pair of registration rollers 98 via a pair of relay rollers 96 and 97. The transfer sheets TS1, TS2, TS3, TS4, and TS5 may be fed and stopped at the pair of registration rollers 98. After a reference time, the transfer sheets TS1, TS2, TS3, TS4, and TS5 may be conveyed to the sheet transfer path formed between the photoconductive drum 83 and the transfer belt 87.

Next, operations of transferring original documents are described, referring to flowcharts shown in FIGS. 9 through 20.

The flowcharts of FIGS. 9 through 20 show a document transfer control operation that is controlled by the ADF controller 100 communicating with the main body controller 111. This document transfer control operation is used to perform a one-side printing mode in which one side or a front side of an original document, i.e., a paper sheet or an electronic paper, can be scanned and conveyed.

Figure 9:
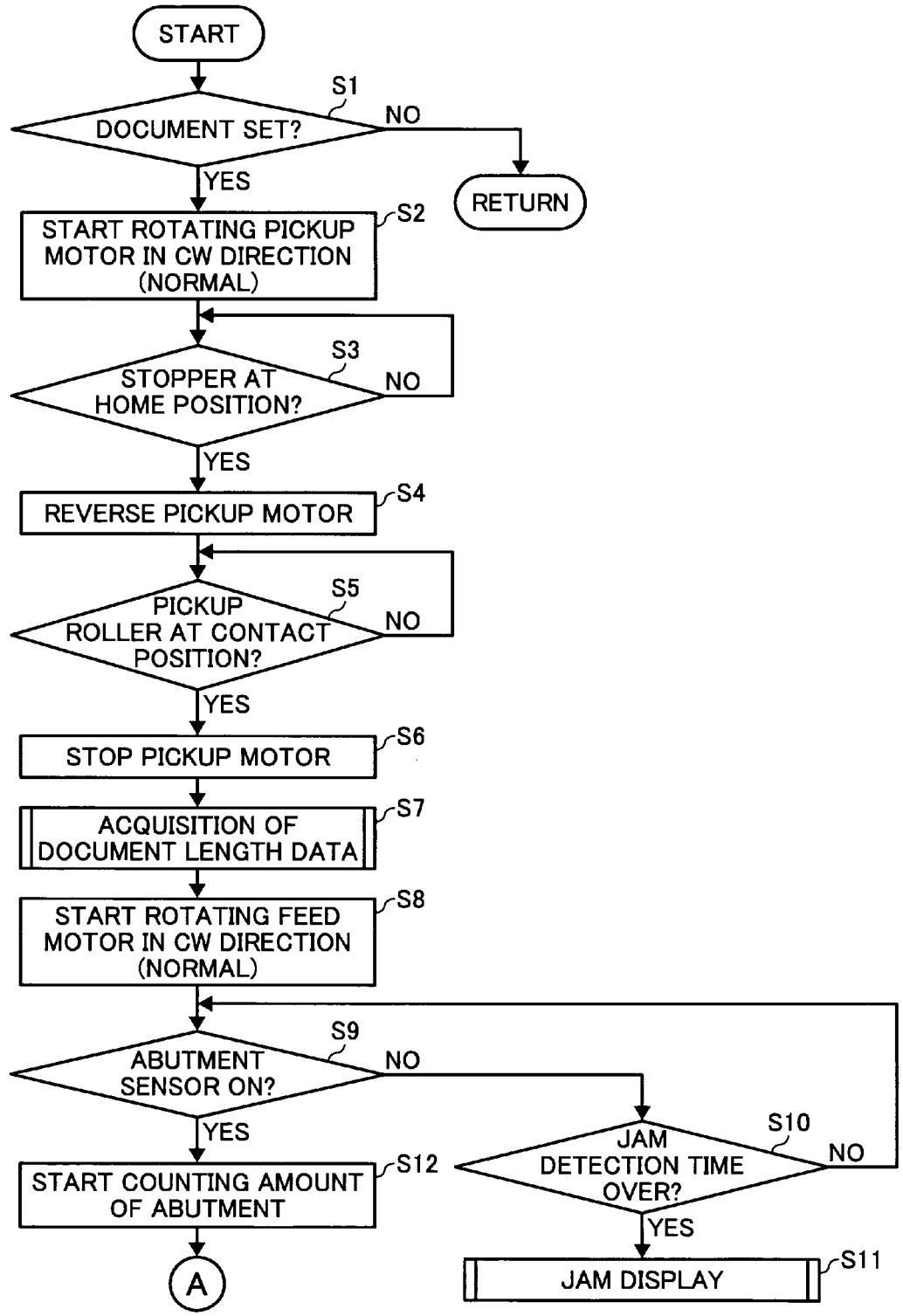
FIG. 9 is a flowchart of a transfer control executed in the image reading system of FIG. 1, according to the first example embodiment of the present patent application.

In step S1 in the flowchart of FIG. 9, the ADF controller 100 determines whether an original document stack DS is set on the document setting table 24, based on the detection results determined by the document length detection sensors 25, 26, and 27.

When the original document stack DS is not set on the document setting table 24, the result of step S1 is NO, and the procedure returns to the start of the operation.

When the original document stack DS is set on the document setting table 24, the result of step S1 is YES, and the terminals 802a and 802b of the electronic medium detection unit 802 contact the top surface of the original document stack DS and the electronic medium detection unit 802 detects whether the original document stack DS is conductive by applying electric current thereto. The detection results are transmitted to the ADF controller 100.

When the electronic medium detection unit 802 is coaxially supported with the document pickup roller 31 and is configured to contact with the top surface of the original document stack DS along with the movement of the document pickup roller 31, the process proceeds to step S5 to contact the top surface of the original document stack DS and check whether the original document stack DS is conductive by applying electric current thereto.

When a print key on the control panel 108 is pressed, the main body controller 111 transmits the document pickup signal to the ADF controller 100 via the I/F 107.

In step S2, the ADF controller 100 drives the document pickup motor 101 to rotate in a normal direction, which is in a clockwise direction. At this time, the document stopper 28 moves away from the leading edge of the original document stack DS.

Then, in step S3, the ADF controller 100 determines whether the document stopper 28 has moved to its home position, based on the detection results of the home position sensor 34.

When it is determined that the document stopper 28 has moved to its home position, the result of step S3 is YES, and the ADF controller 100 rotates the document pickup motor 101 in a reverse direction in step S4.

By contrast, when it is determined that the document stopper 28 has not moved to its home position, the result of step S3 is NO, and the ADF controller 100 repeats step S3 until the document stopper 28 moves to its home position.

After step S4, the ADF controller 100 determines whether the document pickup roller 31 has moved to its contact position in step S5.

When it is determined that the document pickup roller 31 has moved to its contact position, the result of step S5 is YES, and the process proceeds to step S6.

When it is determined that the document pickup roller 31 has not moved to its contact position, the result of step S5 is NO, and the ADF controller 100 repeats step S5 until the document pickup roller 31 moves to the contact position.

Then, the ADF control 100 stops the document pickup motor 101 in step S6, obtains the length of the original document, based on the result detected by the document length detection sensors 25, 26, and 27 in step S7, and rotates the document feed motor 102 in a normal direction, which is in a clockwise direction, in step S8.

With the above-described operation, after the document pickup roller 31 has separated an original document on top of the original document stack DS, the original document on top of the original document stack DS can be transferred by the document feeding belt 32 and the reverse roller 33.

After step S8, the ADF controller 100 determines whether the abutment sensor 35 has been turned on, in step S9.

When it is determined that the abutment sensor 35 has not been turned on, the result of step S9 is NO, and the ADF controller 100 determines whether the jam detection time is over or not, in step S10.

When it is determined that the jam detection time is not over, the result of step S10 is NO, and the ADF controller 100 repeats step S10 until the jam detection time is over.

When it is determined that the jam detection time is over, the result of step S10 is YES, and the abutment sensor 35 has been turned on, the result of step S9 is YES, and the ADF controller 100 determines that a jam indicating that the original document is not abut against the nip contact of the pair of pull-out rollers 36 has occurred and displays a message on the display panel 48 to inform the occurrence of jam in step S11.

When it is determined that the abutment sensor 35 has been turned on, the result of step S9 is YES, and the ADF controller 100 counts the amount or length of abutment of the leading edge of the original document, in step S12. Specifically, the ADF controller 100 starts counting the drive pulses of the document feed motor 102 that correspond to a reference amount or length of X mm, which is set greater than the distance between the abutment sensor 35 and the pair of pull-out rollers 36.

After step S12, the process proceeds to process A, where process A starts at step S13.

Figure 10:
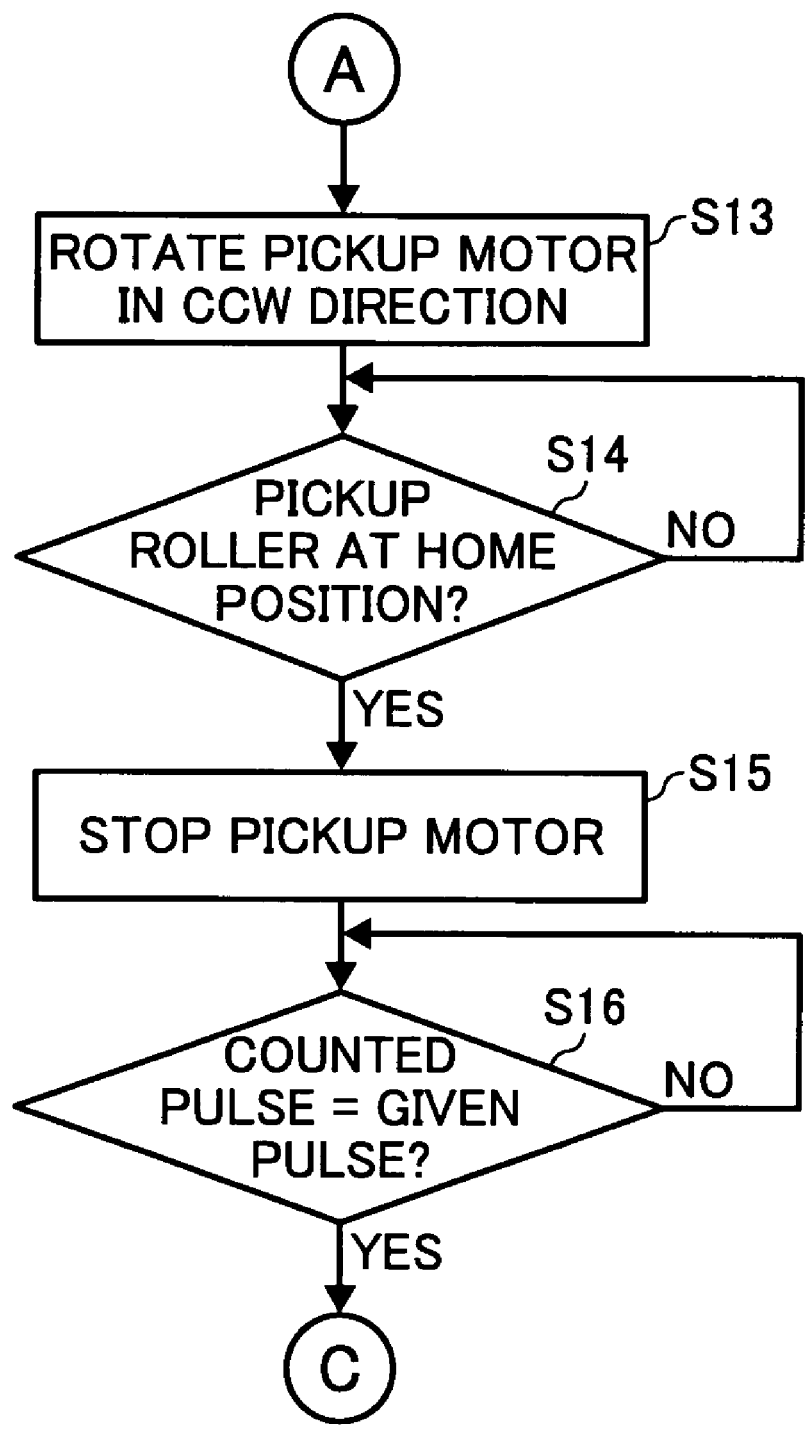
FIG. 10 is a flowchart of the transfer control continued from FIG. 9.

As shown in the flowchart of FIG. 10, the ADF controller 100 rotates the document pickup motor 101 in a reverse direction, which is a counterclockwise direction in step 813, and determines whether the document pickup roller 31 has moved to its home position in step S14.

When it is determined that the document pickup roller 31 has not moved to the home position, the result of step S14 is NO, and the ADF controller 100 repeats step S14 until the document pickup roller 31 moves to the home position.

When it is determined that the document pickup roller 31 has moved to the home position, the result of step S14 is YES, and the ADF controller stops the rotation of the document pickup motor 101 in step S15. After step S15, the process proceeds to step S16.

In step S16, the ADF controller 100 determines whether the number of counted pulses of the document feed motor 102 has reached the reference number of pulses that corresponds to the amount or length of abutment (X mm).

When it is determined that the number of counted pulses of the document feed motor 102 has not reached the reference number of pulses, the result of step S16 is NO, and the ADF controller 100 repeats step S16 until the number of counted pulses of the document feed motor 102 reaches the reference number of pulses.

Figure 11:
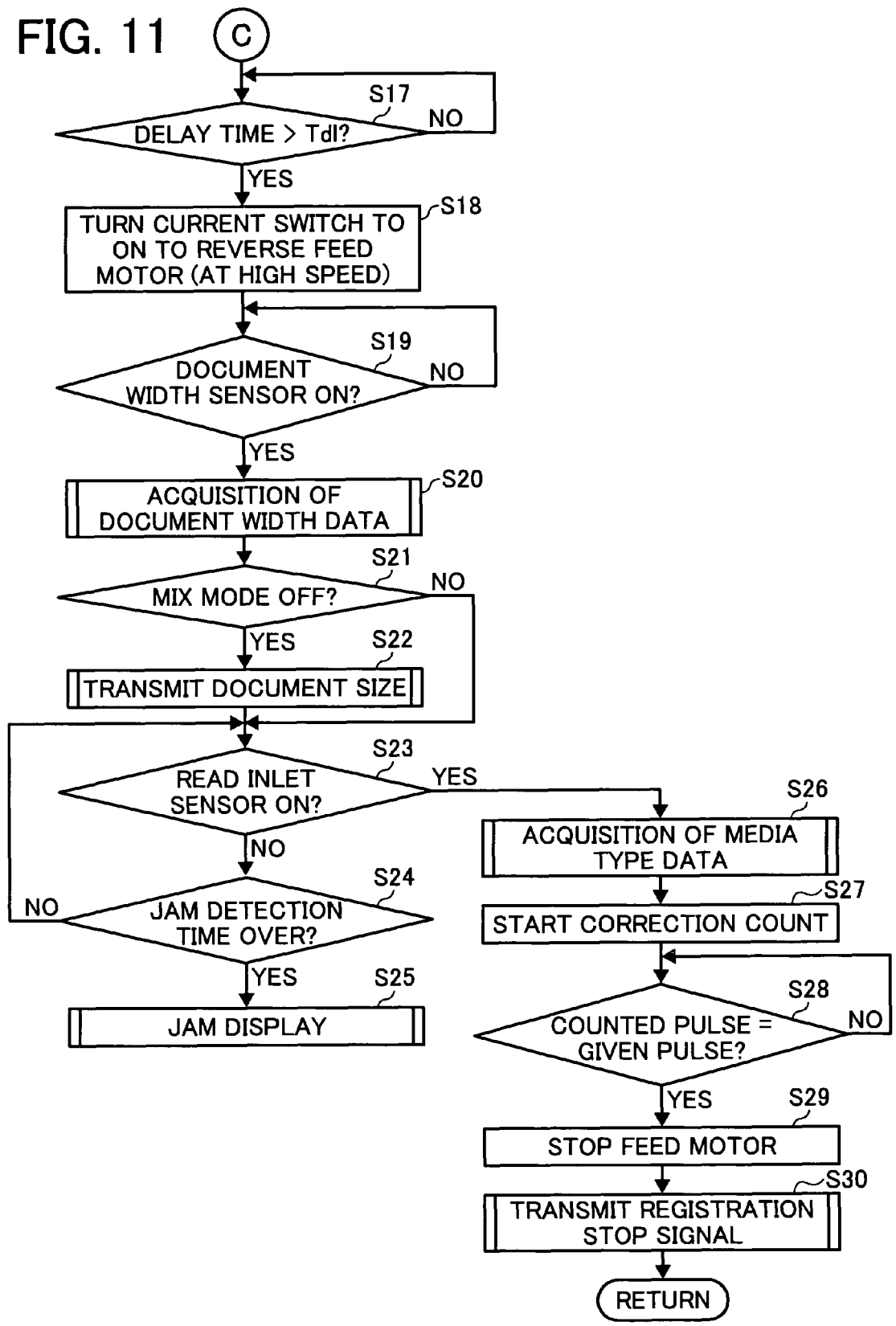
FIG. 11 is a flowchart of the transfer control continued from FIG. 10.

When it is determined that the number of counted pulses of the document feed motor 102 has reached the reference number of pulses, the result of step S16 is YES, and the process proceeds to process C, where process C starts at step S17 in FIG. 11.

In step S17 in the flowchart of FIG. 11, the ADF controller 100 determines whether the delay time is greater than the time Tdl.

When it is determined that the delay time is equal to or smaller than the time Tdl, the result of step S17 is NO, and the ADF controller 100 repeats step S17 until the delay time becomes greater than the time Tdl.

When it is determined that the delay time is greater than the time Tdl, the result of step S17 is YES, and the process proceeds to step S18.

At the timing that the number of counted pulses of the document feed motor 102 has reached the reference number of pulses, the original document is pressed against the pair of pull-out rollers 36 and bent while being bowed with a reference amount. Under such condition, the skew caused by the bow with the reference amount is corrected.

Now, in the first example embodiment of the present invention, a time required for the trailing edge of a preceding or first original document to pass from the scanning position 80 to the document discharging roller set 42 is represented as "Tyo", and a time required for the leading edge of a following or second original document to move from the pair of pull-out rollers 36 to the nip portion of the pair of read inlet rollers 37, which is the registration stop position (reading standby position) for the original document to stop temporarily is represented as "Tpo."

By providing a time "Tdl" that satisfies a relation of Tyo< (Tpo+Tdl), the ADF controller 100 may transfer the second original document from the pair of pull-out rollers 36.

In step S18, the ADF controller 100 turns on the switch of the current of the document feed motor 102 to drive the document feed motor 102 to rotate at high speed.

When the document feed motor 102 is rotated in a reverse direction, the pair of pull-out rollers 36 is driven whereas the one-way clutch of a pulley, not shown, prevents the transmission of the driving force to the document pickup roller 31 and the document feeding belt 32. Therefore, the original document is conveyed by the pair of pull-out rollers 36.

After step S18, the ADF controller 100 determines whether the document width detection sensors 38 have been turned on in step S19.

When it is determined that the document width detection sensors 38 have not been turned on, the result of step S19 is NO, and the ADF controller 100 repeats step S19 until the document width detection sensors 38 is turned on.

When it is determined that the document width detection sensors 38 have been turned on, the result of step S19 is YES, and the ADF controller 100 obtains information of the width of the original document based on the detection results determined by the document width detection sensors 38 in step S20.

According to the above-described result, the ADF controller 100 can obtain information of the size of the original document stack DS accumulated on the document setting table 24, based on the combination of the length information provided by the document length detection sensors 25, 26, and 27 and the width information provided by the document width detection sensors 38.

At this time, the original document is conveyed toward the scanning position 80 while being sandwiched between the pair of pull-out rollers 36 and the pair of read inlet rollers 37. The transfer speed of the original document is set to high speed. This can reduce the processing time to transfer the original document to the scanning position 80. Specially, when transferring the second original document or after, the document transfer in high speed can reduce the intervals between the preceding original document and the following document, which can enhance the productivity of print images.

After step S20, the ADF controller 100 determines whether the mix mode has been turned off in step S21.

When it is determined that the mix mode has not been turned off, the result of step S21 is NO, and the process goes to step S23.

When it is determined that the mix mode has been turned off, the result of step S21 is YES, and the ADF controller 100 transmits the size information of the original document stack DS accumulated on the document setting table 24, to the main body controller 111, in step S22.

After step S22, the ADF controller 100 determines whether the read inlet sensor 39 has been turned on to detect the leading edge of the original document in step S23.

When it is determined that the read inlet sensor 39 has been not been turned on to detect the leading edge of the original document, the result of step S23 is NO, and the ADF controller 100 determines whether the jam detection time has been over in step S24.

When it is determined that the jam detection time has not been over, the result of step S24 is NO, and the process returns to step S23.

When it is determined that the jam detection time has been over, the result of step S24 is YES, and the ADF controller 100 determines that a jam indicating that the leading edge of the original document has not reached the read inlet sensor 39 has occurred and displays a message on the display panel 48 to inform the occurrence of the jam, in step S25.

On the other hand, when it is determined that the read inlet sensor 39 has been turned on, the result of step S23 is YES, and the ADF controller 100 determines whether the original document is a paper sheet or an electronic paper, based on the detection results of the electronic medium detection unit 802, in step S26. According to this determination, the document transfer control may be different when scanning the original document. Details will be described later, in step S35 of FIG. 12.

The ADF controller 100 then starts the correction count of the amount or length of abutment of the leading edge of the original document, in step S27. Specifically, the ADF controller 100 starts counting the drive pulses of the document feed motor 102 that corresponds to a reference amount of Y mm, which is an amount greater than the distance between the read inlet sensor 39 and the pair of read inlet rollers 37.

After step S27, the ADF controller 100 determines whether the pulse count of the document feed motor 102 has reached the reference number of pulses that corresponds to the amount or length of abutment (Y mm) in step S28.

When it is determined that the pulse count of the document feed motor 102 has not reached the reference number of pulses, the result of step S28 is NO, and the ADF controller 100 repeats step S28 until the pulse count reaches the reference number of pulses.

When it is determined that the pulse count of the document feed motor 102 has reached the reference number of pulses, the result of step S28 is YES, and the ADF controller 100 causes the document feed motor 102 to stop in step S29.

After step S29, the ADF controller 100 transmits the registration stop signal to the main body controller 111 in step S30, and completes the transfer control of the original document to the scanning position 80 to return to the start of the operation for a next original document.

At the timing that the document feed motor 102 has reached the reference number of pulses, the original document is pressed against the pair of read inlet rollers 37 while being bowed by a reference amount. Under such condition, the skew caused by the bow with the reference amount is corrected.

Figure 12:
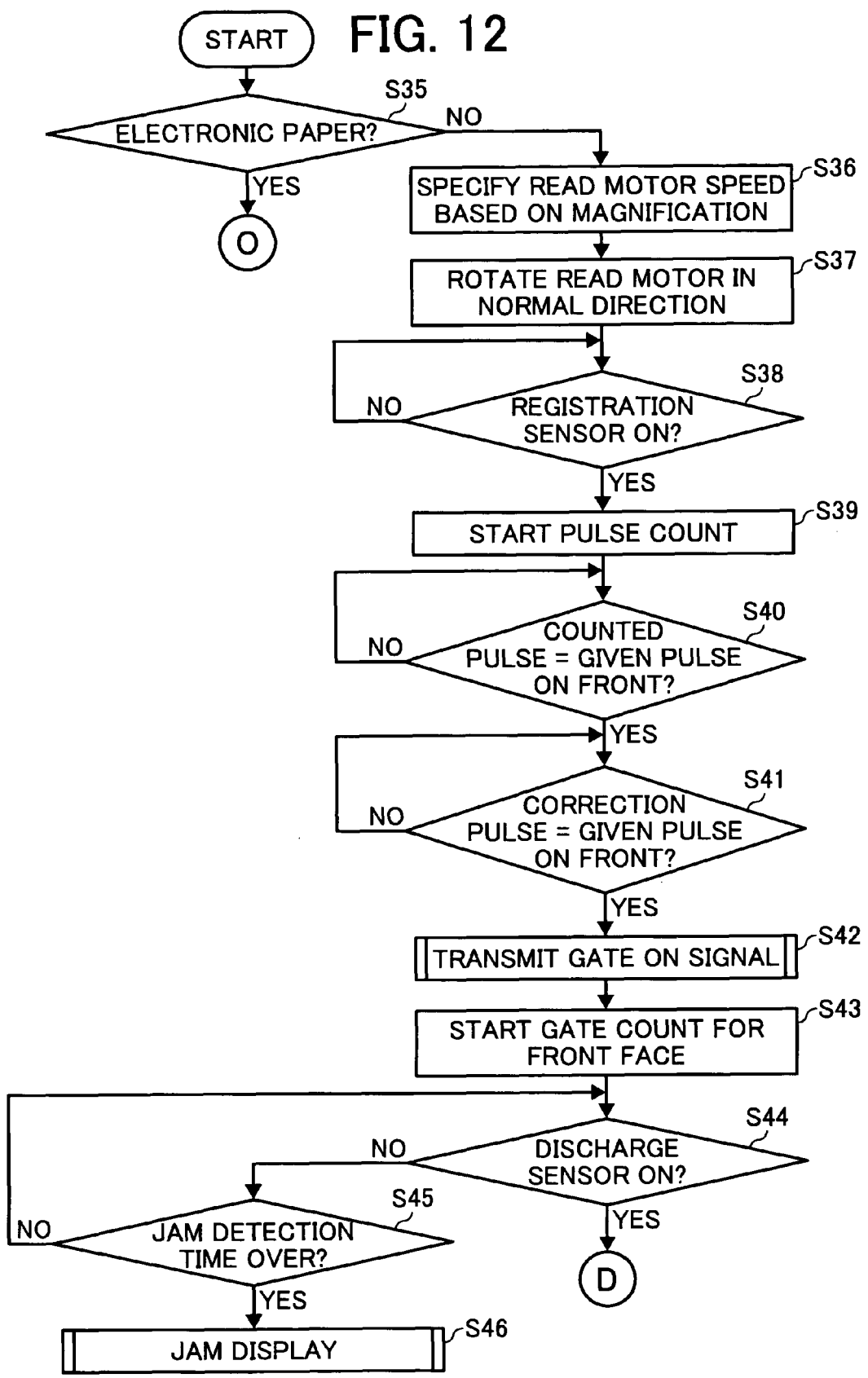
FIG. 12 is a flowchart of the transfer control when starting a reading of an original document.

The flowchart shown in FIG. 12 describes a flow of the transfer control operation of transferring an original document, continued from the flowchart shown in FIG. 11.

In the flowchart of FIG. 12, the ADF controller 100 determines whether the original document is an electronic paper or not in step S35.

When it is determined that the original document is an electronic paper, the result of step S35 is YES, and the process proceeds to process 0, where process 0 starts at step S311. Details of the operation of step S311 will be described later.

When it is determined that the original document is not an electronic paper but is a non-electronic paper such as a paper sheet, the result of step S35 is NO, and the ADF controller 100 specifies the speed of the document read motor 103 based on the read scan magnification, in step S36.

After step S36, the ADF controller 100 receives the read start signal from the main body controller 111, and starts to execute the scanning operation of the original document.

It is noted that an electronic paper displays images only on one side or front surface thereof. Therefore, the single face mode includes a case in which either one of a non-electronic paper is read and conveyed or an electronic paper or both of the a non-electronic paper and an electronic paper is read and conveyed in a mixed manner.

Specifically, the ADF controller 100 drives the document read motor 103 to rotate in a normal direction, in step S37, so as to rotate the pair of read inlet rollers 37 and the pair of read outlet rollers 40 at the transfer speed according to the read scan magnification.

After step S37, the ADF controller 100 determines whether the registration sensor 41 has been turned on to detect the leading edge of the original document in step S38.

When it is determined the registration sensor 41 has not been turned on to detect the leading edge of the original document, the result of step S38 is NO, and the ADF controller 100 repeats step S38 until the registration sensor 41 is turned on to detect the leading edge of the original document.

When it is determined that the registration sensor 41 has been turned on to detect the leading edge of the original document, the result of step S38 is YES, and ADF controller 100 starts counting the number of pulses of the document read motor 103 in step S39.

After step S39, the ADF controller 100 determines, in step S40, whether the number of counted pulses of the document read motor 103 has reached a reference number of pulses for the front face of the original document, which corresponds to the distance of the registration sensor 41 and the scanning position 80 on the slit glass 22b.

When it is determined that the number of counted pulses of the document read motor 103 has not reached a reference number of pulses for the front face of the original document, the result of step S40 is NO, and the ADF controller 100 repeats step S40 until the number of counted pulse counts of the document read motor 103 reaches a reference number of pulses for the front face of the original document.

When it is determined that the number of counted pulses of the document read motor 103 has reached a reference number of pulses for the front face of the original document, the result of step S40 is YES, and the ADF controller 100 determines, in step S41, whether the number of correction pulses that account for the slip ratio and so forth of the original document has reached a reference number of pulses for the front face of the original document.

When it is determined that the number of correction pulses has not reached a reference number of pulses for the front face of the original document, the result of step S41 is NO, and the ADF controller repeats step S41 until the number of correction pulses reaches a reference number of pulses for the front face of the original document.

When it is determined that the number of correction pulses has reached a reference number of pulses for the front face of the original document, the result of step S41 is YES, the ADF controller 100 transmits, in step S42, the gate on signal that indicates an image area in a sub-scanning direction, to the main body controller 111 at the timing that the leading edge of the original document reaches the scanning position 80.

After step S42, the ADF controller 100 starts counting the number of the gate counts for the front face of the original document in step S43.

Then, the ADF controller 100 determines, in step S44, whether the discharge sensor 50 has been turned on to detect the leading edge of the original document.

When it is determined that the discharge sensor 50 has not been turned on to detect the leading edge of the original document, the result of step S44 is NO, and the ADF controller 100 determines whether the jam detection time has been over or not in step S45.

When it is determined that the jam detection time has not been over, the result of step S45 is NO, and the process goes back to step S44.

When it is determined that the jam detection time has been over, the result of step S45 is YES, and the ADF controller 100 determines a jam indicating that the leading edge of the original document has not reached the discharge sensor 50 has occurred and displays a message on the display panel 48 to inform the occurrence of the jam in step S46.

Figure 13:
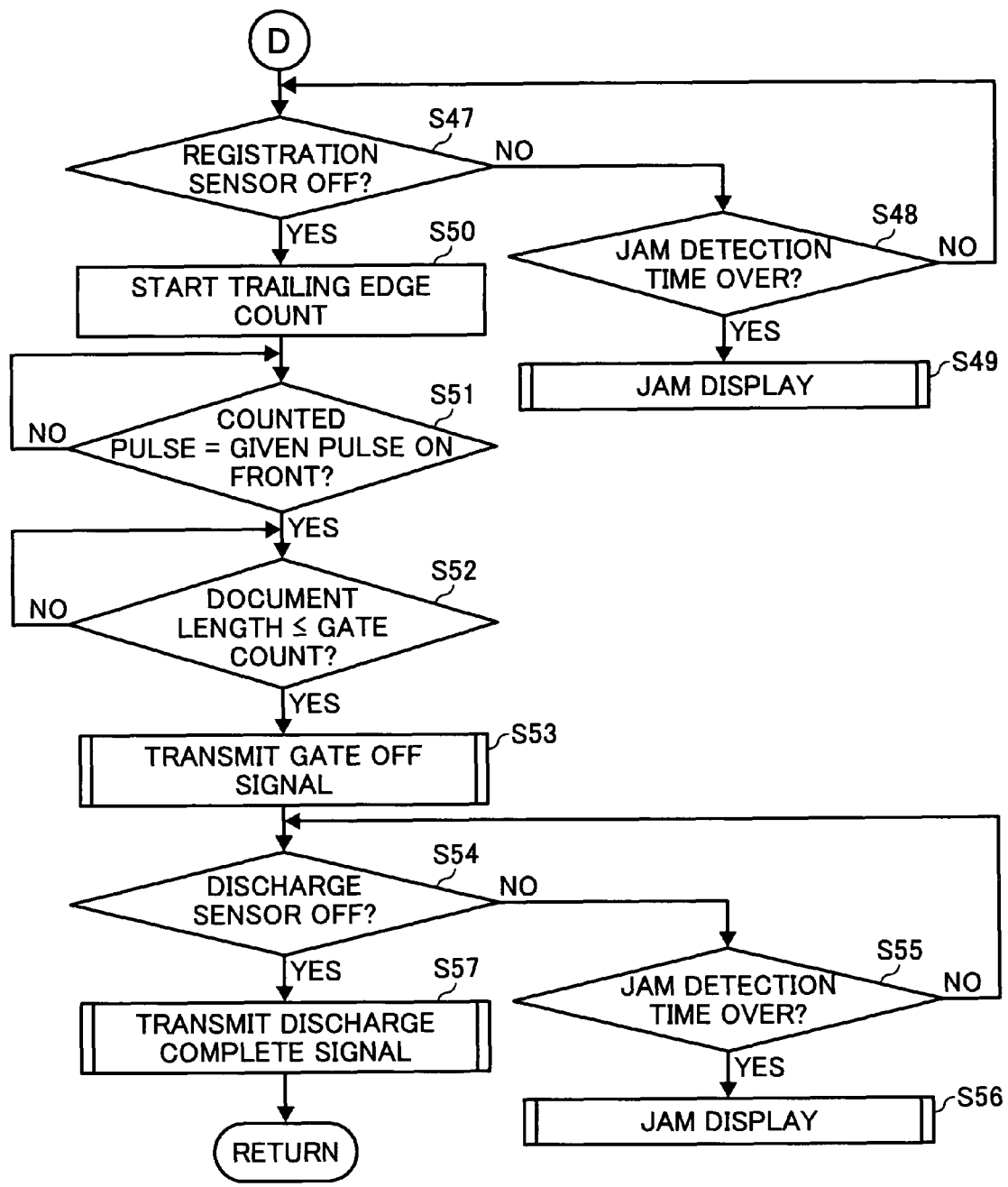
FIG. 13 is a flowchart of the transfer control continued from FIG. 12.

On the other hand, when it is determined that the discharge sensor 50 has been turned on to detect the leading edge of the original document, the result of step S44 is YES, the ADF controller 100 determines whether the registration sensor 41 has been turned off in process D starting at step S47, as shown in FIG. 13.

When it is determined that the registration sensor 41 has not been turned off, the result of step S47 is NO, and the ADF controller 100 determines whether the jam detection time has been over in step S48.

When it is determined that the jam detection time has not been over, the result of step S48 is NO, and the process returns to step S47.

When it is determined that the jam detection time has been over, the result of step S48 is YES, and the ADF controller 100 determines that a jam indicating that the original document has not completely passed the registration sensor 41 has occurred and displays a message on the display panel 48 to inform the occurrence of the jam in step S49.

On the other hand, when it is determined that the registration sensor 41 has been turned off, the result of step S47 is YES, and ADF controller 100 starts the trailing edge count for counting the number of pulses of the document read motor 103, in step S50.

After step S50, the ADF controller 100 determines, in step S51, whether the number of counted pulses of the document read motor 103 has reached a reference number of pulses for the front face of the original document.

When it is determined that the number of counted pulses of the document read motor 103 has not reached the reference number of pulses for the front face of the original document, the result of step S51 is NO, and the ADF controller 100 repeats step S51 until the number of counted pulses of the document read motor 103 reaches a reference number of pulses for the front face of the original document.

When it is determined that the number of counted pulses of the document read motor 103 has reached a reference number of pulses for the front face of the original document, the result of step S51 is YES, and the ADF controller 100 determines whether the number of counted gate pulses is equal to or greater than the length of the original document, in step S52.

When it is determined that the number of counted gate pulses is smaller than the length of the original document, the result of step S52 is NO, and the ADF controller 100 repeats step S52 until the number of counted gate pulses becomes equal to or greater than the length of the original document.

When it is determined that the number of counted gate pulses is equal to or greater than the length of the original document, the result of step S52 is YES, and the ADF controller 100 transmits the gate off signal that indicates the image area in the sub-scanning direction, in step S53.

After step S53, the ADF controller 100 determines whether the discharge sensor 50 has been turned off in step S54.

When it is determined that the discharge sensor 50 has not been turned off, the result of step S54 is NO, and the ADF controller 100 determines whether the jam detection time has been over in step S55.

When it is determined that the jam detection time has not been over, the result of step S55 is NO, and the process goes back to step S54.

When it is determined that the jam detection time has been over, the result of step S55 is YES, the ADF controller 100 determines that a jam indicating that the original document is not completely discharged has occurred and displays a message on the display panel 48 to inform the occurrence of the jam, in step S56.

When it is determined that the discharge sensor 50 has been turned off, the result of step S54 is YES, the ADF controller 100 transmits the discharge completion signal to the main body controller 111 in step S57, and completes the procedure to return to the start of the operation for a next original document.

Figure 14:
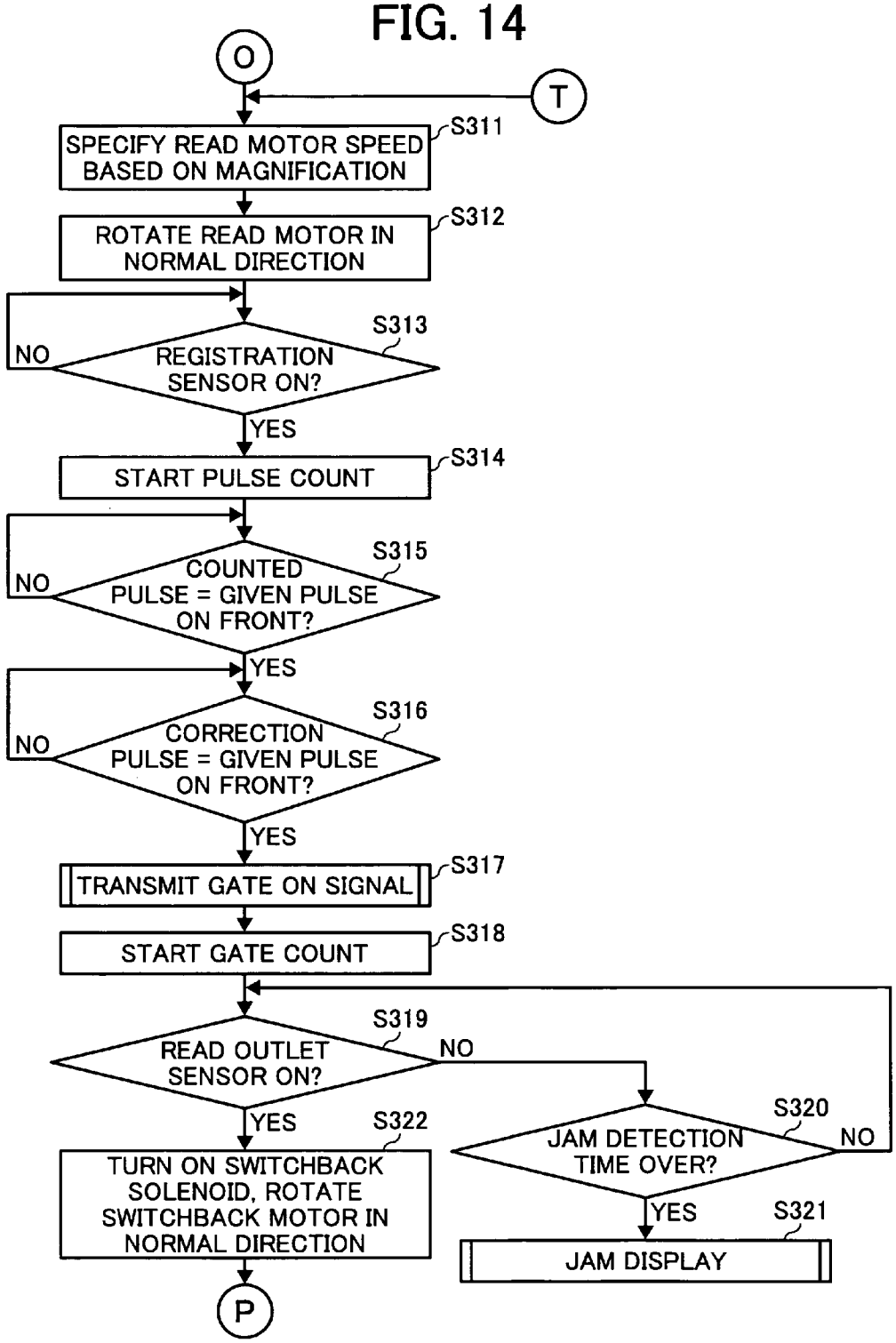
FIG. 14 is a flowchart of the transfer control continued from FIG. 13.

As previously described, when it is determined that the original document is an electronic paper in step S35, the process proceeds to process 0 as shown in FIG. 14, and the ADF controller 100 specifies the speed of the document read motor 103 based on the read scan magnification in step S311. The ADF controller 100 also specifies, in step S311, a transfer pressure between rollers used to transfer the original document when scanning.

After step S311, the ADF controller 100 receives the read start signal from the main body controller 111, and drives the document read motor 103 to rotate in a normal direction, in step S312, so as to rotate the pair of read-inlet rollers 37 and the pair of read outlet rollers 40 at the transfer speed according to the read scan magnification.

After step S312, the ADF controller 100 determines whether the registration sensor 41 has been turned on to detect the leading edge of the original document in step S313.

When it is determined the registration sensor 41 has not been turned on to detect the leading edge of the original document, the result of step S313 is NO, and the ADF controller 100 repeats step S313 until the registration sensor 41 is turned on to detect the leading edge of the original document.

When it is determined that the registration sensor 41 has been turned on to detect the leading edge of the original document, the result of step S313 is YES, and the ADF controller 100 starts counting the number of pulses of the document read motor 103 in step S314.

After step S314, the ADF controller 100 determines, in step S315, whether the number of counted pulses of the document read motor 103 has reached a reference number of pulses for the front face of the original document, which corresponds to the distance of the registration sensor 41 and the scanning position 80 on the slit glass 22*b*.

When it is determined that the number of counted pulses of the document read motor 103 has not reached a reference number of pulses for the front face of the original document, the result of step S315 is NO, and the ADF controller 100 repeats step S315 until the number of counted pulse counts of the document read motor 103 reaches a reference number of pulses for the front face of the original document.

When it is determined that the number of counted pulses of the document read motor 103 has reached a reference number of pulses for the front face of the original document, the result of step S315 is YES, and the ADF controller 100 determines, in step S316, whether the number of correction pulses that account for the slip ratio and so forth of the original document has reached a reference number of pulses for the front face of the original document.

When it is determined that the number of correction pulses has not reached a reference number of pulses for the front face of the original document, the result of step S316 is NO, and the ADF controller repeats step S316 until the number of correction pulses reaches a reference number of pulses for the front face of the original document.

When it is determined that the number of correction pulses has reached a reference number of pulses for the front face of the original document, the result of step S316 is YES, the ADF controller 100 transmits, in step S317, the gate on signal that indicates an image area in a sub-scanning direction, to the main body controller 111 at the timing that the leading edge of the original document reaches the scanning position 80.

After step S317, the ADF controller 100 starts counting the number of the gate counts for the front face of the original document in step S318.

After step S318, the ADF controller 100 determines, in step S319, whether the read outlet sensor 47 has been turned on to detect the leading edge of the original document.

When it is determined that the read outlet sensor 47 has not been turned on to detect the leading edge of the original document, the result of step S319 is NO, and the ADF controller 100 determines whether the jam detection time has been over or not in step S320.

When it is determined that the jam detection time has not been over, the result of step S320 is NO, and the process goes back to step S319.

When it is determined that the jam detection time has been over, the result of step S320 is YES, and the ADF controller 100 determines a jam indicating that the leading edge of the original document has not reached the read outlet sensor 47 has occurred and displays a message on the display panel 48 to inform the occurrence of the jam in step S321.

On the other hand, when it is determined that the read outlet sensor 47 has been turned on to detect the leading edge of the original document, the result of step S319 is YES, the ADF controller 100 turns on the switchback solenoid 105 so that the path switching member 44 can move to the position indicated by a dotted line shown in FIG. 2, and rotates the switchback motor 104 in a normal direction to drive the pair of switchback rollers 45 serving as a pair of switchback rollers, so that the original document can be conveyed to the switchback path 46a in step S322.

After step S322, the process proceeds to process P as shown in FIG. 15A, where process P starts at step S323.

In step S323, the ADF controller 100 determines whether the discharge sensor 50 has been turned on to detect the leading edge of the original document.

When it is determined that the discharge sensor 50 has not been turned on to detect the leading edge of the original document, the result of step S323 is NO, and the ADF controller 100 determines whether the jam detection time has been over or not in step S324.

When it is determined that the jam detection time has not been over, the result of step S324 is NO, and the process goes back to step S323.

When it is determined that the jam detection time has been over, the result of step S324 is YES, and the ADF controller 100 determines a jam indicating that the leading edge of the original document has not reached the discharge sensor 50 has occurred and displays a message on the display panel 48 to inform the occurrence of the jam in step S325.

When it is determined that the discharge sensor 50 has been turned on to detect the leading edge of the original document, the result of step S323 is YES, the ADF controller 100 determines whether the switchback sensor 49 has been turned on to detect the leading edge of the original document in step S326.

When it is determined that the switchback sensor 49 has not been turned on to detect the leading edge of the original document, the result of step S326 is NO, and the ADF controller 100 determines whether the jam detection time has been over or not in step S327.

When it is determined that the jam detection time has not been over, the result of step S327 is NO, and the process goes back to step S326.

When it is determined that the jam detection time has been over, the result of step S327 is YES, and the ADF controller 100 determines a jam indicating that the leading edge of the original document has not reached the switchback sensor 49 has occurred and displays a message on the display panel 48 to inform the occurrence of the jam in step S328.

On the other hand, when it is determined that the switchback sensor 49 has been turned on to detect the leading edge of the original document, the result of step S326 is YES, and the ADF controller 100 determines whether the registration sensor 41 has been turned off in step S329.

When it is determined that the registration sensor 41 has not been turned off, the result of step S329 is NO, and the ADF controller 100 determines whether the jam detection time has been over or not in step S330.

When it is determined that the jam detection time has not been over, the result of step S330 is NO, and the process goes back to step S329.

When it is determined that the jam detection time has been over, the result of step S330 is YES, and the ADF controller 100 determines a jam indicating that the original document has not completely passed the registration sensor 41 has occurred and displays a message on the display panel 48 to inform the occurrence of the jam in step S331.

When it is determined that the registration sensor 41 has been turned off, the result of step S329 is YES, and the ADF controller 100 starts, in step S332, the trailing edge count for counting the number of pulses of the document read motor 103.

After step S332, the ADF controller 100 determines whether the number of counted pulses of the document read motor 103 has reached a reference number of pulses for the front face of the original document in step S333.

When it is determined that the number of counted pulses of the document read motor 103 has not reached a reference number of pulses for the front face of the original document, the result of step S333 is NO, and the ADF controller 100 repeats step S333 until the number of counted pulses of the document read motor 103 reaches a reference number of pulses for the front face of the original document.

When it is determined that the number of counted pulses of the document read motor 103 has reached a reference number of pulses for the front face of the original document, the result of step S333 is YES, and the ADF controller 100 determines, in step S334, whether the number of counted gate pulses is equal to or greater than the length of the original document.

When it is determined that the number of counted gate pulses is smaller than the length of the original document, the result of step S334 is NO, and the ADF controller 100 repeats step S334 until the number of counted gate pulses becomes equal to or greater than the length of the original document.

Figure 15B:
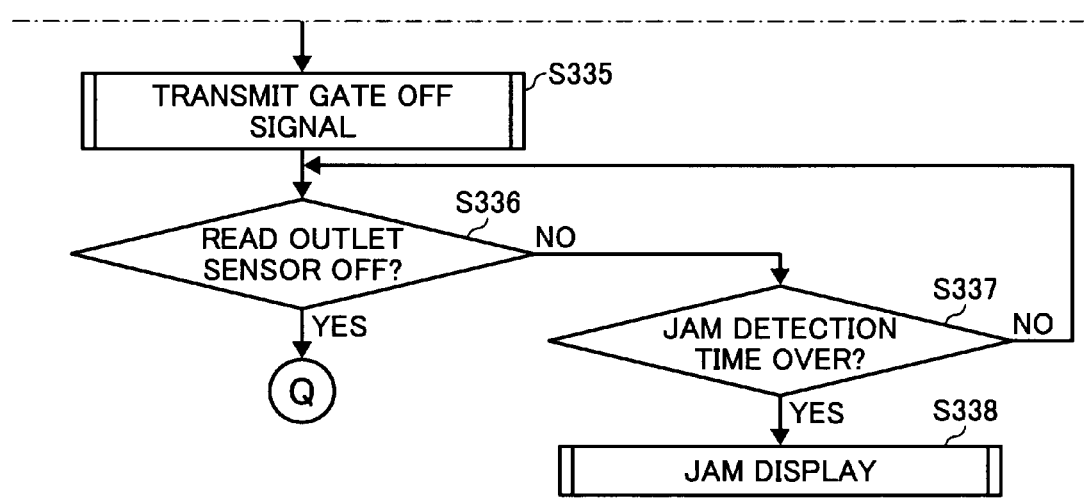

When it is determined that the number of counted gate pulses is equal to or greater than the length of the original document, the result of step S334 is YES, and the ADF controller 100 transmits the gate off signal that indicates the image area in the sub-scanning direction with respect to the main body controller 111, in step S335 shown in the flowchart of FIG. 15B.

After step S335, the ADF controller 100 determines whether the read outlet sensor 47 has been turned off in step S336.

When it is determined that the read outlet sensor 47 has not been turned off, the result of step S336 is NO, and the ADF controller 100 determines whether the jam detection time has been over in step S337.

When it is determined that the jam detection time has not been over, the result of step S337 is NO, and the process returns to step S336.

When it is determined that the jam detection time has been over, the result of step S337 is YES, and the ADF controller 100 determines that a jam indicating that the original document has not completely passed the read outlet sensor 47 has occurred and displays a message on the display panel 48 to inform of the occurrence of the jam in step S338.

When it is determined that the read outlet sensor 47 has been turned off, the result of step S336 is YES, and the process proceeds to process Q as shown in FIG. 16A, where process Q starts at step S339.

In step, S339 in the flowchart of FIG. 16A, the ADF controller 100 determines whether the document read motor 103 has been driven by a reference number of pulses after the read outlet sensor 47 has detected the trailing edge of the original document.

When it is determined that the document read motor 103 has not been driven by a reference number of pulses, the result of step S339 is NO, and the ADF controller 100 repeats step S339 until the document read motor 103 is driven by a reference number of pulses.

When it is determined that the document read motor 103 has been driven to rotate by the reference number of pulses, the result of step S339 is YES, and the process proceeds to step S340.

In step S340, the ADF controller 100 turns off the switchback solenoid 105, and returns the path switching member 44 to the position indicated by the solid line in FIG. 2. In addition, after the reference number of pulses has counted, the ADF controller 100 drives the document switchback motor 104 to rotate in a reverse direction at high speed to cause the pair of switchback rollers 45 to rotate in a reverse direction, and increases the speed of the document read motor 103. Therefore, the original document may be transferred on the re-entry path 46b toward the pair of pull-out rollers 36 as indicated by arrow C in FIG. 2, so as to start scanning the reverse face of the original document that has been stopped at the registration stop position.

After step S340, the ADF controller 100 determines whether the switchback motor 104 has been driven by a reference number of pulses in step S341.

When it is determined that the switchback motor 104 has not been driven by a reference number of pulses, the result of step S341 is NO, and the ADF controller 100 repeats step S341 until the document switchback motor 104 is driven by a reference number of pulses.

When it is determined that the switchback motor 104 has been driven to rotate by the reference number of pulses, the result of step S341 is YES, and the process proceeds to step S342.

In step S342, the ADF controller 100 drives the document feed motor 102 in the reverse direction at high speed, and the process proceeds to step S343.

When the document feed motor 102 is rotated in a reverse direction, the pair of pull-out rollers 36 is driven whereas the one-way clutch of the pulley 140 prevents the transmission of the driving force to the document pickup roller 31 and the document feeding belt 32. Therefore, the original document is conveyed by the pair of pull-out rollers 36.

In step S343, the ADF controller 100 determines whether the switchback sensor 49 has been turned off.

When it is determined that the switchback sensor 49 have not been turned on, the result of step S343 is NO, and the ADF controller 100 repeats step S343 until the switchback sensor 49 is turned on.

When it is determined that the switchback sensor 49 has been turned off, the result of step S343 is YES, and the ADF controller 100 stops the document switchback motor 104 in 344.

After step S344, the ADF controller 100 drives the document read motor 103 to rotate at high speed in step S345.

At this time, the original document is not conveyed toward the scanning position 80. The electronic paper 900 is reversed and the display surface is placed opposite to the top surface of the contact glass 22a.

Figure 16B:
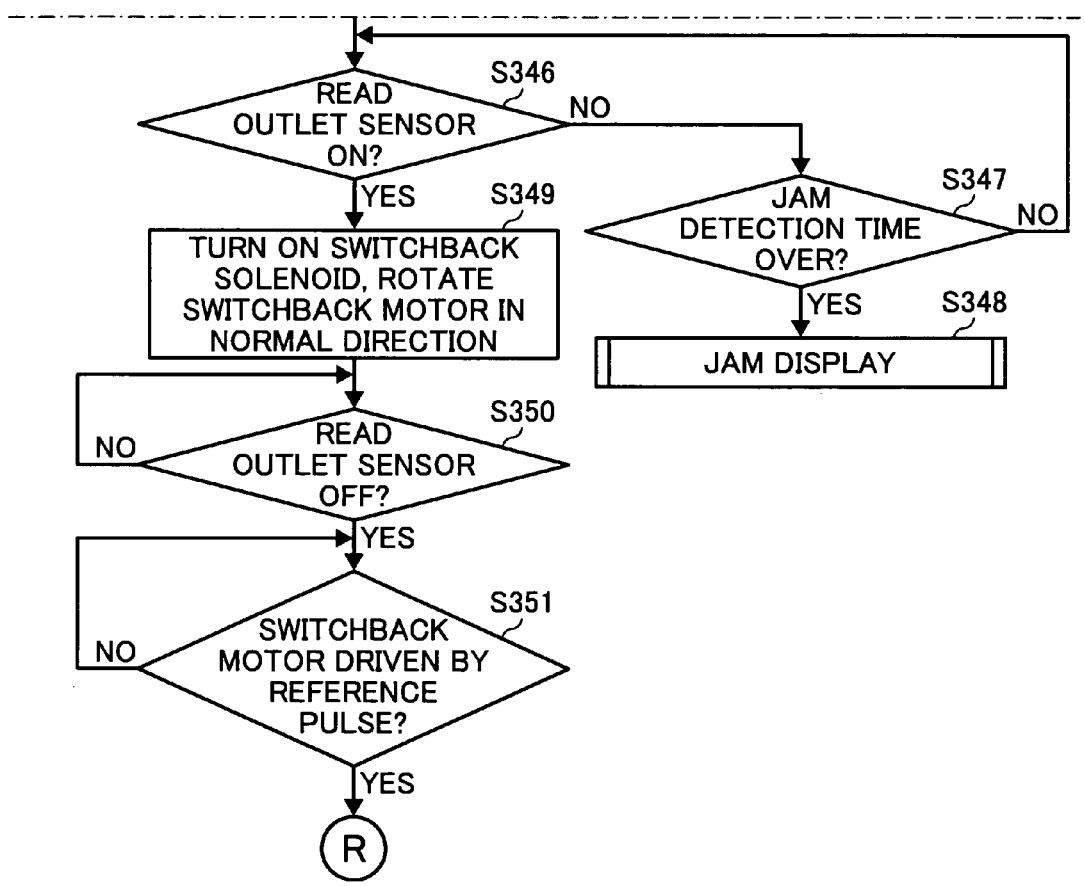

After step S345, the ADF controller 100 determines whether the read outlet sensor 47 has been turned on to detect the leading edge of the original document in step S346 in the flowchart of FIG. 16B.

When it is determined that the read outlet sensor 47 has not been turned on to detect the leading edge of the original document, the result of step S346 is NO, and the ADF controller 100 determines whether the jam detection time has been over or not in step S347.

When it is determined that the jam detection time has not been over, the result of step S347 is NO, and the process goes back to step S346.

When it is determined that the jam detection time has been over, the result of step S347 is YES, and the ADF controller 100 determines that a jam indicating that leading edge of the original document to be discharged has not reached the read outlet sensor 47 has occurred and displays a message on the display panel 48 to inform the occurrence of the jam in step S348.

When it is determined that the read outlet sensor 47 has been turned on to detect the leading edge of the original document, the result of step S346 is YES, the ADF controller 100 turns on the switchback solenoid 105 so that the path switching member 44 can move to the position indicated by a chain double-dashed line shown in FIG. 2, and further drives the document switchback motor 104 to rotate the pair of switchback rollers 45 in a normal direction in step S349. Therefore, the original document may be transferred toward the re-entry path 46b.

After step S349, the ADF controller 100 determined whether the read outlet sensor 47 has been turned off in step S350.

When it is determined that the read outlet sensor 47 has not been turned off, the result of step S350 is NO, and the ADF controller 100 repeats step S350 until the read outlet sensor 47 is turned off.

When it is determined that the read outlet sensor 47 has been turned off, the result of step S350 is YES, and the ADF controller 100 determines whether the document switchback motor 104 has been driven by a reference number of pulses in step S351.

When the document switchback motor 104 has not been driven by a reference number of pulses, the result of step S351 is NO, and the ADF controller 100 repeats step S351 until the document switchback motor 104 is driven by a reference number of pulses.

When it is determined that the document switchback motor 104 has been driven by a reference number of pulses, the result of step S351 is YES, and the process proceeds to process R, where process R starts at step S352.

Figure 17A:
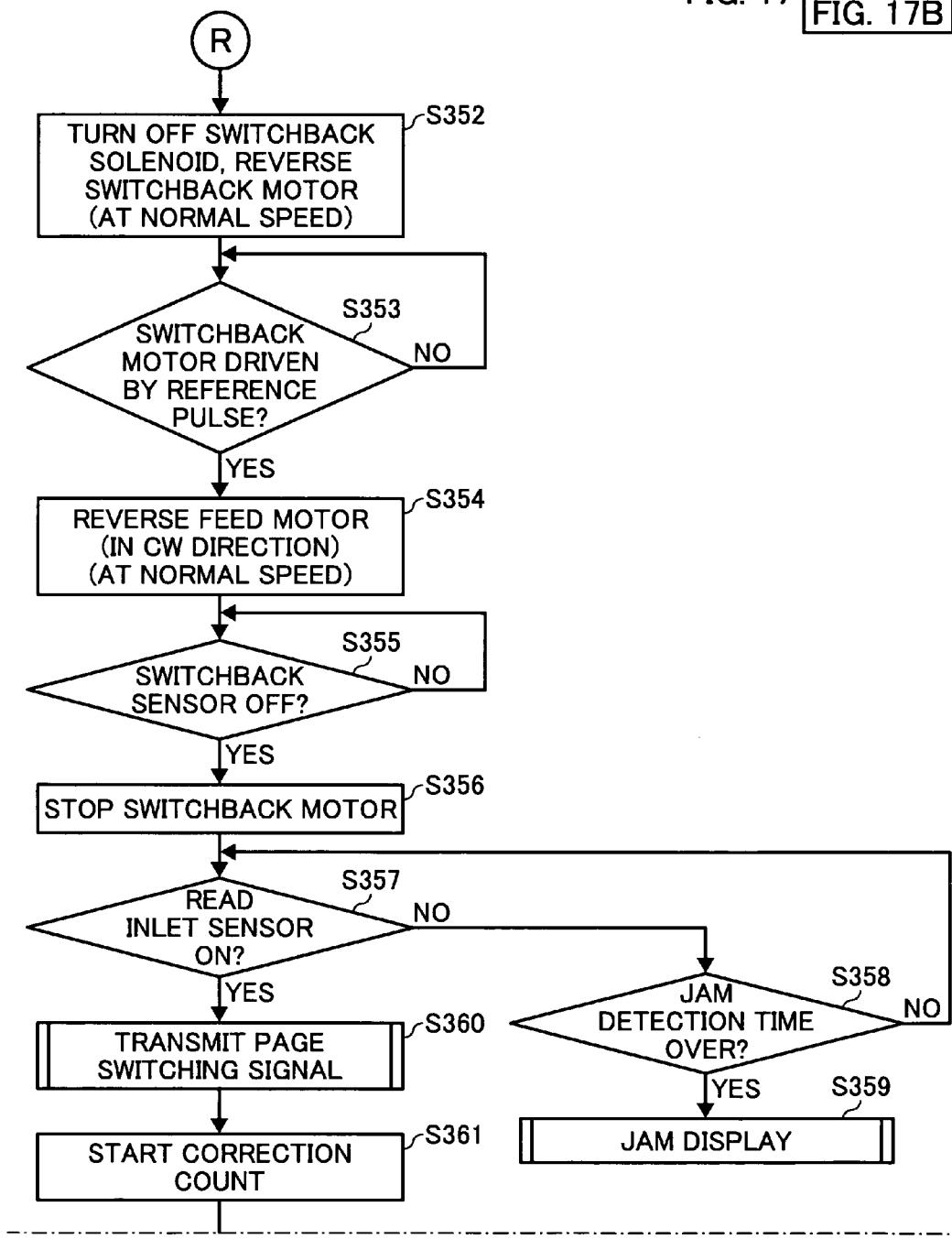
FIGS. 17A and 17B are flowcharts of the transfer control continued from FIG. 16B.

In step S352 in the flowchart of FIG. 17A, the ADF controller 100 turns off the switchback solenoid 105 so that the path switching member 44 can move to the position indicated by a solid line shown in FIG. 2, and rotates the switchback motor 104 in a reverse direction to drive the pair of switchback rollers 45 to rotate in a reverse direction, so that the original document can be conveyed to the pair of pull-out rollers 36 at a normal reading speed.

After step S352, the ADF controller 100 determines whether the number of counted pulses of the document switchback motor 104 has reached a reference number of pulses in step S353.

When it is determined that the number of counted pulses of the document switchback motor 104 has not reached a reference number of pulses, the result of step S353 is NO, and the ADF controller 100 repeats step S353 until the number of counted pulses of the document switchback motor 104 reaches a reference number of pulses.

When it is determined that the number of counted pulses of the document switchback motor 104 has reached a reference number of pulses, the result of step S353 is YES, and the ADF controller 100 drives the document feed motor 102 in a reverse direction at a speed corresponding to a normal reading scanning speed in step. S354.

After step S354, the ADF controller 100 determines whether the switchback sensor 49 has been turned off in step S355.

When it is determined that the switchback sensor 49 has not been turned off, the result of step S355 is NO, and the ADF controller 100 repeats step S355 until the switchback sensor 49 is turned off.

When it is determined that the switchback sensor 49 has been turned off, the result of step S355 is YES, and the ADF controller 100 stops the document switchback motor 104 in step S356, and determines whether the read inlet sensor 39 has been turned on to detect the leading edge of the original document in step S357.

When it is determined that the read inlet sensor 39 has been not been turned on to detect the leading edge of the original document, the result of step S357 is NO, and the ADF controller 100 determines whether the jam detection time has been over in step S358.

When it is determined that the jam detection time has not been over, the result of step S358 is NO, and the process returns to step S357.

When it is determined that the jam detection time has been over, the result of step S358 is YES, and the ADF controller 100 determines that a jam indicating that the leading edge of the original document has not reached the read inlet sensor 39 has occurred and displays a message on the display panel 48 to inform the occurrence of the jam, in step S359.

On the other hand, when it is determined that the read inlet sensor 39 has been turned on, the result of step S357 is YES, and the ADF controller 100 instructs the main body controller 111 to cause the page switching unit 801 to conduct a page switching operation with respect to the electronic paper 900, in step S360. Based on the instruction, the page switching unit 801 transmits a signal to the electronic paper 900 to update or change the image of the page displayed on the display part 904 of the electronic paper 900.

After step S360, the ADF controller 100 starts the correction count of the amount or length of abutment of the leading edge of the original document, in step S361. Specifically, the ADF controller 100 starts counting the drive pulses of the document feed motor 102 that corresponds to a reference amount of Y mm, which is an amount greater than the distance between the read inlet sensor 39 and the pair of read inlet rollers 37.

Figure 17B:
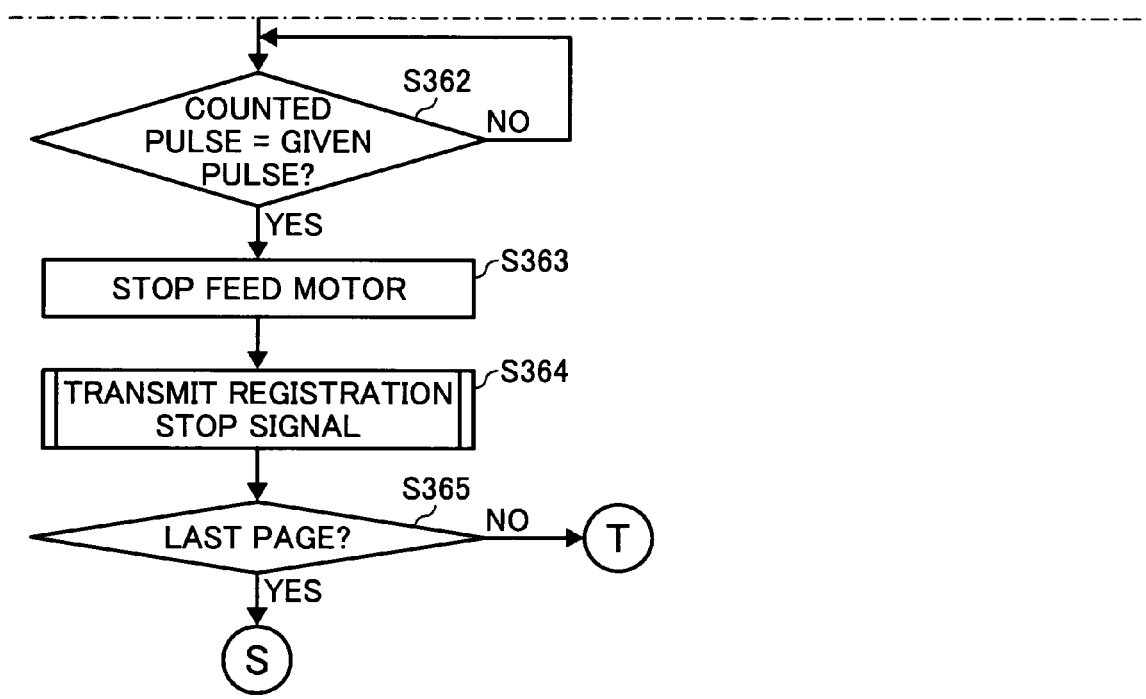

After step S361, the ADF controller 100 determines, in step S362 in the flowchart of FIG. 17B, whether the number of counted pulses of the document feed motor 102 has reached a reference number of pulses corresponding to the reference amount of abutment of the leading edge of the original document.

When it is determined that the number of counted pulses of the document feed motor 102 has not reached the reference number of pulses, the result of step S362 is NO, and the ADF controller 100 repeats step S362 until the number of counted pulses of the document feed motor 102 reaches the reference number of pulses.

When it is determined that the number of counted pulses of the document feed motor 102 has reached the reference number of pulses, the result of step S362 is YES, and the ADF controller 100 causes the document feed motor 102 to stop in step S363, transmits the registration stop signal to the main body controller 111 in step S364, and completes the transfer control of the original document to convey the original document to the scanning position 80.

After step S364, the ADF controller 100 determines, in step S365, whether the switched or updated page is the last page or not, based on the page data obtained by the page switching unit 801 in step S361. That is, the ADF controller 100 determines whether a signal indicating the updated page is the last page has been transmitted, in response to the instruction to conduct the page switching operation directed from the page switching unit 801 to the electronic paper 900.

When it is determined that the switched or updated page is not the last page, the result of step S365 is NO, and the process goes back to process T starting at step S311 in the flowchart of FIG. 14.

Figure 18:
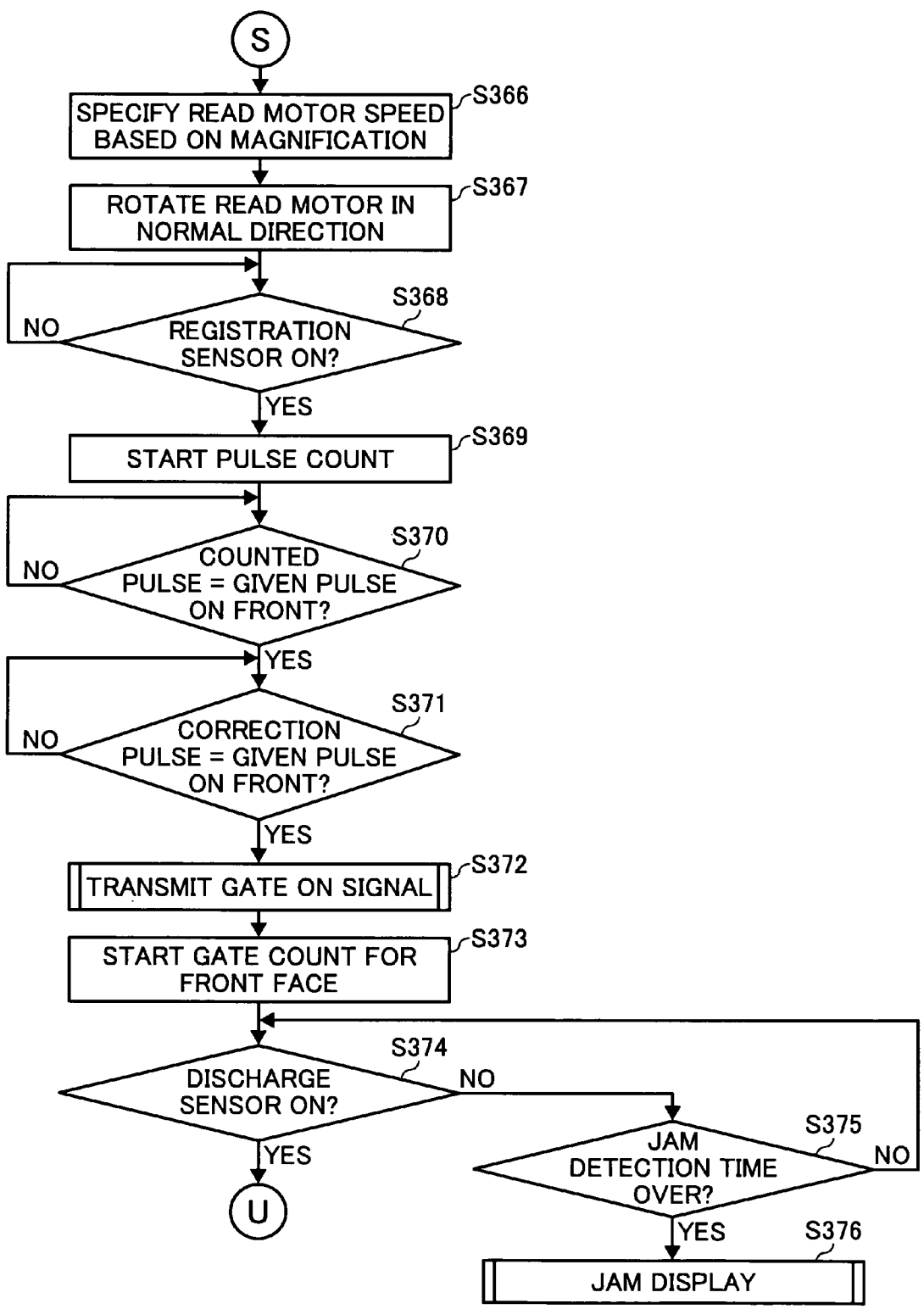
FIG. 18 is a flowchart of the transfer control continued from FIG. 17B.

When it is determined that the switched or updated page is the last page, the result of step S365 is YES, and the process proceeds to process S, where process S starts at step S366 in a flowchart of FIG. 18.

In FIG. 18, the speed of the document read motor 103 is specified according to the read scan magnification in step S366, and the ADF controller 100 receives a read start signal from the main body controller 111. Then, the ADF controller 100 drives the document read motor 103 in a normal direction to scan the image of the electronic paper 900 in step S367.

Figure 19:
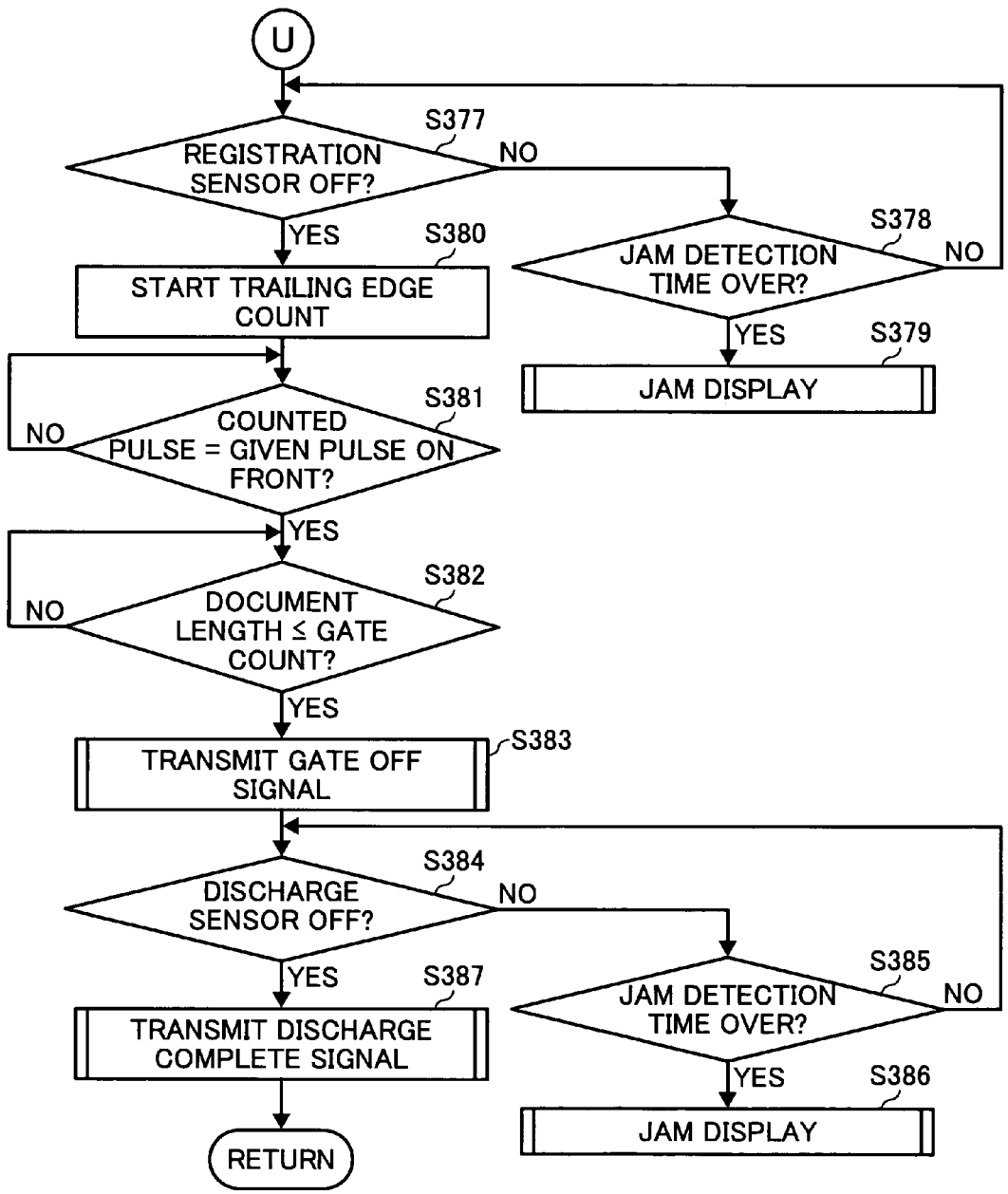
FIG. 19 is a flowchart of the transfer control continued from FIG. 18.

Steps S366 through S376 of the flowchart shown in FIG. 18 correspond to steps S36 through S46 of the flowchart shown in FIG. 12, and steps S377 through S387 of the flowchart shown in FIG. 19 correspond to steps S47 through S57 of the flowchart shown in FIG. 13. Therefore, the detailed description of the procedures of the above-described steps S366 through S387 are omitted here.

In a double face mode, the ADF controller 100 turns on the switchback solenoid 105 before the leading edge of the original document that has passed through the scanning position 80 reaches the document discharging roller set 42 after reading the front face of the original document, so that the path switching member 44 can move to the position indicated by a chain double-dashed line shown in FIG. 2, and further drives the document switchback motor 104 to rotate in a normal direction.

With the above-described operations, the original document can be conveyed or transferred onto the switchback path 46a as indicated by arrow B in FIG. 2.

Then, the ADF controller 100 causes the path switching member 44 to move to the position indicated by a solid line shown in FIG. 2, and further drives the document switchback motor 104 to rotate in a reverse direction so that the original document can be conveyed to the reentry path 46b as indicated by arrow C in FIG. 2. Thus, the original document with the front face thereof having been read is transferred to the scanning position 80 again, so that the rear face of the original document can be read. Further, for aligning the page order, the original document, both the front and rear faces of which having been read, is transferred onto the switchback path 46a, reversed via the reentry path 46b, and discharged to the document discharge tray 43 as indicated by arrow A in FIG. 2 without being read at the scanning position 80. Accordingly, for the double face mode, the original document passes on the scanning position 80 for three times before being discharged.

Figure 20:
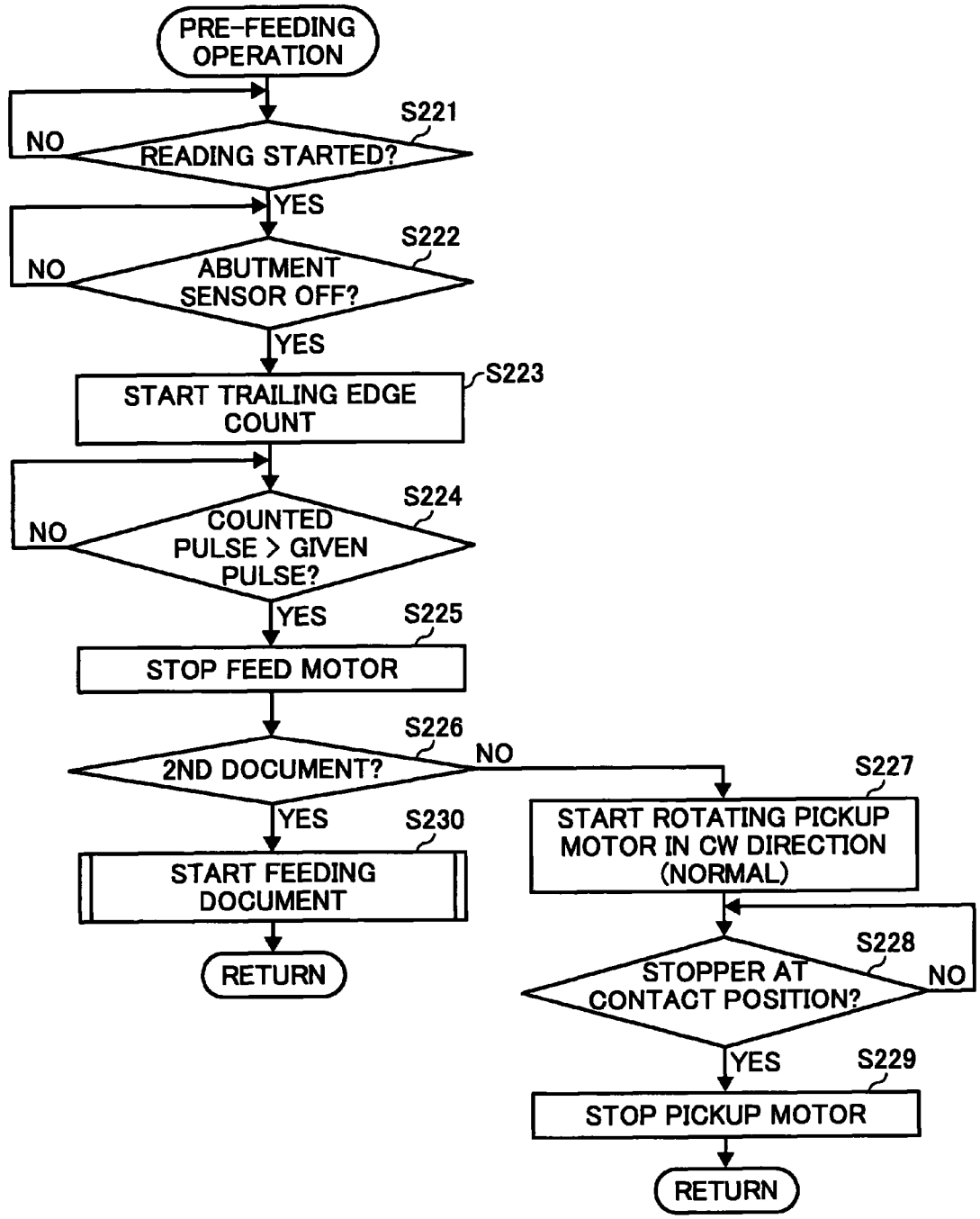
FIG. 20 is a flowchart of a pre-feeding operation of a next original document, according to an example embodiment of the present patent application.

Next, a pre-feeding operation in a single face mode is described, in reference to a flowchart shown in FIG. 20 is described.

In the first example embodiment of the present invention, a preceding original document is referred to as a "first original document D1", and a next original document following the preceding or first original document is referred to as a "second original document D2."

In step S221 of the flowchart shown in FIG. 20, the ADF controller 100 receives the read start signal from the main body controller 111, and determines whether the reading of the first original document D1 has been started. As previously described, the single face mode may be applied to a transfer or conveyance of at least one of a paper sheet and an electronic paper.

When it is determined that the reading of the first original document D1 has not been started, the result of step S221 is NO, and the ADF controller 100 repeats step S221 until the reading of the first original document D1 is started.

When it is determined that the reading of the first original document D1 has been started, the result of step S221 is YES, the ADF-controller 100 determines whether the abutment sensor 35 has been turned off in step S222.

When it is determined that the abutment sensor 35 has not been turned off, the result of step S222 is NO, the ADF controller 100 repeats step S222 until the abutment sensor 35 is turned off.

When it is determined that the abutment sensor 35 has been turned off, the result of step S222 is YES, the ADF controller 100 starts the trailing edge count for counting the number of drive pulses of the document feed motor 102 after the abutment sensor 35 has detected the trailing edge of the first original document D1, in step S223.

After step S223, the ADF controller 100 determines whether the trailing edge count is greater than the reference number of pulses, in step S224.

The reference number of pulses is set to the number of drive pulses of the document feed motor 102, counting from when the abutment sensor 35 detected the trailing edge of the original document to when the original document passed the pair of pull-out rollers 36.

When it is determined that the trailing edge count is equal to or smaller than the reference number of pulses, the result of step S224 is NO, and the ADF controller 100 repeats step S224 until the trailing edge count becomes greater than the reference number of pulses.

When it is determined that the trailing edge count is greater than the reference number of pulses, the result of step S224 is YES, the ADF controller 100 stops the rotations of the document feed motor 102 rotating in the reverse direction in step S225, and determines whether the second original document D2 is set on the document setting table 24, in step S226.

When it is determined that the second original document is set on the document setting table 24, the result of step S226 is YES, and the ADF controller 100 starts feeding the second original document D2 in step S230 so as to execute the procedure in the flowcharts shown in FIGS. 9 through 11.

When it is determined that the second original document D2 is not set on the document setting table 24, the result of step S226 is NO, the ADF controller 100 drives the document pickup motor 101 to rotate in a clockwise direction, which is a normal direction, in step S227.

After step S227, the ADF controller 100 determines whether the document stopper 28 has moved to the position indicated by the chain double-dashed line in FIG. 2, in step S228.

When it is determined that the document stopper 28 has not moved to the contact position, the result of step S228 is NO, the ADF controller 100 repeats step S228 until the document stopper 28 moves to the contact position.

When it is determined that the document stopper 28 has moved to the contact position, the result of step S228 is YES, and the ADF controller 100 stops the document pickup motor 101, in step S229 and completes to return to the start of the transfer operation.

As described above, the copier 21 according to the first example embodiment of the present patent application includes the ADF 23, the electronic medium detection unit 802, and the scanner 81.

In the ADF 23, at least one of a non-electronic paper such as a paper sheet and the electronic paper 900 including the IC chip 902, the display part 904, the electronic paper driver 905, the contact part 90 and so forth serves as an original document and is conveyed or transferred to the scanning position 80.

In the electronic medium detection unit 802, the terminals 802a and 802b contact the original document to apply electrical current to determine whether the original document is conductive or not so that the media type of the original document can be decided.

In the scanner 81, an image formed on a non-electronic paper at the scanning position 80 or an image switchably displayed on the electronic paper 900 is optically scanned or read.

The copier 21 including the above-described units may cause the ADF controller 100 to work as a transfer controller that controls the transfer operation of the ADF 23, based on the determination results of the electronic medium detection unit 802 and as a read controller to control the reading performed by the scanner 81. When reading the original document with the scanner 81, the main body controller 111 also works as a read controller.

With the above-described configuration, the copier 21 can read images on both a non-electronic paper and an electronic paper.

The copier 21 according to the first example embodiment of the present patent application further includes the page switching unit 801 to switch images displayed on the display part 904 in a page unit. When electronic data for multiple pages is stored in the IC chip 902 or the electronic paper memory 903, the ADF controller 100 instructs the page switching unit 801 to perform the page switching operation of the electronic paper 900 to cause the scanner 81 to read the image switched by the page switching operation.

With the above-described configuration, the copier 21 can convert electronic data for multiple pages stored in an electronic paper to images, and read the images optically.

Further, the copier 21 includes the reverse path 53 connecting the document table 24 and the scanning position 80, the discharge path 57 and the re-entry path 46a connecting the scanning position 80 and the pair of switchback rollers 45, and the reentry paths 46a and 46b and the reverse path 53 connecting the pair of switchback rollers 45 and the scanning position 80.

Before reading images displayed on the electronic paper 900, the ADF controller 100 causes the electronic paper 900 placed on the document table 24 to be reversed and conveyed via the reverse path 53 to the scanning position 80, which is a first reverse transfer. After the first page of the electronic paper 900 is read, the ADF controller 100 causes the electronic paper 900 to be reversed again and conveyed via the discharge path 57 and the re-entry paths 46a and 46b to the scanning position 80, which is a second reverse transfer. Then, for the third time, the ADF controller 100 causes the electronic paper to be reversed and conveyed to the scanning position 80 via the discharge path 57 and the re-entry paths 46a and 46b, which is a third reverse transfer. The page switching unit 801 is disposed upstream of the scanning position 80 in the document travel direction to change images per page unit of the electronic paper during the third reverse transfer. In addition, the ADF controller 100 controls the scanner 81 via the main body controller 111 to read the image of the electronic paper at the scanning position 80 during the first and third reverse transfers.

With the above-described configuration, different transfer operations may be conducted according to types of media, i.e., electronic paper or non-electronic paper. By so doing, the ADF 23 can read both images formed on a non-electronic paper and images displayed on an electronic paper.

Further, the copier 21 according to the first example embodiment of the present patent application includes the electronic medium detection unit 802 disposed in the vicinity of the document pickup roller 31 at an upstream side in the document travel direction.

By disposing the electronic medium detection unit 802 in the vicinity of the conveying path at an upstream side in the document travel direction, with respect to the scanning position 80, different transfer controls can be selected based on media types to secure a time period to execute a necessary calculating operation. Specially, when the electronic medium detection unit 802 is disposed in the vicinity of the document pickup roller 31, the electronic medium detection unit 802 can detect the electronic paper 900 placed on the document table 24 while the electronic paper 900 is substantially stopped. Accordingly, detection errors can be reduced or prevented, if any.

Further, in the first example embodiment of the present patent application, the electronic paper 900 includes the contact part 907 and the IC chip 902, and the page switching unit 801 includes the contact part 801a and the communication controller 801b. When conducting the page switching operation, a signal of page data, i.e., a signal informing the original document is the first page or the last page, can be transmitted from the electronic paper 900 via the contact part 907 to the page switching unit 801. The ADF controller 100 determines whether images for multiple pages are stored in the IC chip 902 or the electronic paper memory 903 and whether the page displayed is the first page or the last page original document, based on the signal of page data received by the page switching unit 801 via the contact part 801a.

With the above-described configuration, when the current page displayed after the reading of the first page and the page switching operation is the first page, the ADF controller 100 determines that data of images for multiple pages is stored in the electronic paper and discharges the electronic paper without performing the reading operation.

When the current page displayed after the page switching operation is the last page, the ADF controller 100 can change the procedure of the transfer control so that the image can be read.

Accordingly, both a paper sheet and an electronic paper can effectively be read in the configuration of the ADF 23.

Further, in the copier 21 according to the first example embodiment of the present patent application, the procedures in step S27 in the flowchart of FIG. 11 and step S35 in the flowchart of FIG. 12 correspond to a determination control method, the procedures in steps S36 through S57 in the flowcharts of FIGS. 12 and 13 and steps S311 through S387 in the flowcharts of FIGS. 14 through 19 correspond to a transfer control method, and the procedures in steps S36 through S57 in the flowcharts of FIGS. 12 and 13 and steps S311 through S387 in the flowcharts of FIGS. 14 through 19 corresponding to a read control method.

With the above-described configuration of the methods, the copier 21 can invert electronic data for multiple pages stored in the electronic paper to images to optically read the images.

Further, in the copier 21 according to the first example embodiment of the present patent application, the procedure in step S360 in the flowchart of FIG. 17 corresponds to a page switching control method, and the procedures in steps S366 through S387 in the flowcharts of FIGS. 18 and 19 correspond to a read control method.

With the above-described configuration, when the original document is an electronic paper storing electronic data of images for multiple pages, a transfer control different from a non-electronic paper is executed while conducting the page switching operation. Accordingly, the ADF 23 can read both images formed on the paper sheet and images displayed on the electronic paper.

Further, the electronic paper 900 according to the first example embodiment of the present patent application includes the IC chip memory of the IC chip 902 that stores electronic data of images separated per page unit, the display part 904 and the electronic paper driver 905 that convert the electronic data to images by page and switchably display the images, and the communication control circuit of the IC chip 902 that communicates with the external devices via the contact part 907. The electronic paper 900 switches the images per page unit including the page number and displays the image according to a signal transmitted to instruct the page switching operation from the page switching unit 801 via the main body controller 111.

With the above-described configuration, by providing the page switching unit 801 to the ADF 23 using a non-electronic paper as an original document, both non-electronic paper and electronic paper can be read.

Further, the electronic paper 900 according to the first example embodiment of the present patent application may return a signal indicating a page after the page switching operation is either the first page or the last page, according to a signal instructing the page switching operation transmitted from the page switching unit 801.

With the above-described configuration, the ADF controller 100 can effectively execute the transfer control of the original document while conducting the page switching operation, not only when an electronic paper stores electronic data for one page but also for multiple pages, based on page data obtained via the page switching unit 801.

Next, FIGS. 21 through 30 show an image reading system, including an automatic document feeder or ADF and an image reader, according to a second example embodiment of the present patent application, an image forming apparatus including the ADF and the image reader, an electronic paper used in the image forming apparatus, and an image reading method used in the image forming apparatus, according to the second example embodiment of the present patent application. The image forming apparatus according to the second example embodiment of the present patent application corresponds to the copier 21, for example.

A configuration of an image reading system 20a according to the second example embodiment of the present patent application is similar to the configuration of the image reading system 20 according to the first example embodiment of the present invention. Except that an ADF 23a of the image reading system 20a according to the second example embodiment further includes a retreat table 810, a path switching member 124, a solenoid, not shown, and a page switching unit 801'. According to the above-described added units, a transfer control when reading an electronic paper 900 may be different from the procedure described in the first example embodiment of the present patent application. For example, by adding the retreat table 810, a retreat path 55 has also been added to the ADF 23a. The other units and mechanisms of the ADF 23a are identical to the corresponding units and mechanisms of the ADF 23, and therefore, the same reference numerals as the corresponding units and mechanisms of the ADF 23 are used.

Figure 21:
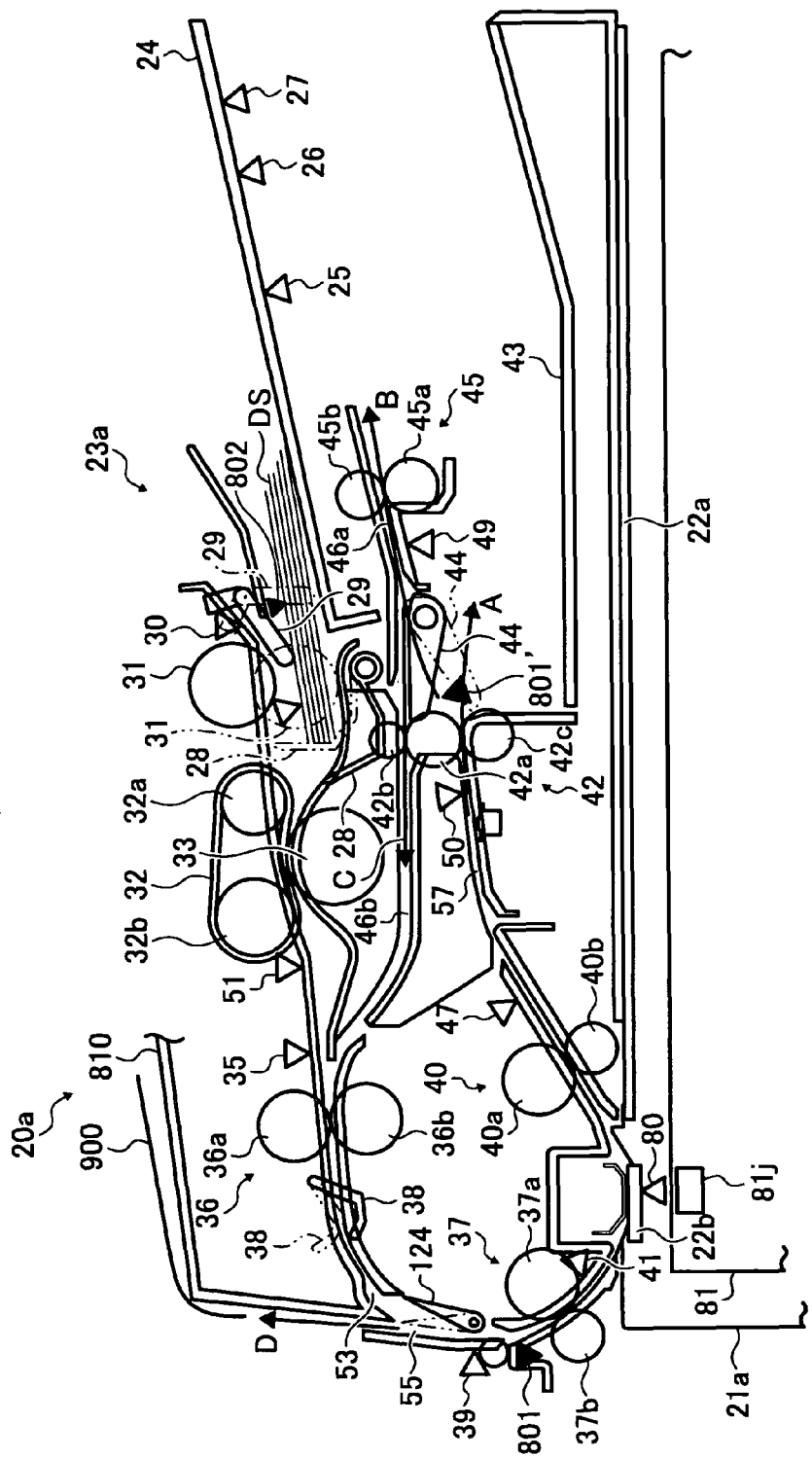
FIG. 21 is a cross-sectional view of a schematic configuration of an image reading system, including a document feeder and an image reader, according to a second example embodiment of the present patent application.
Figure 22:
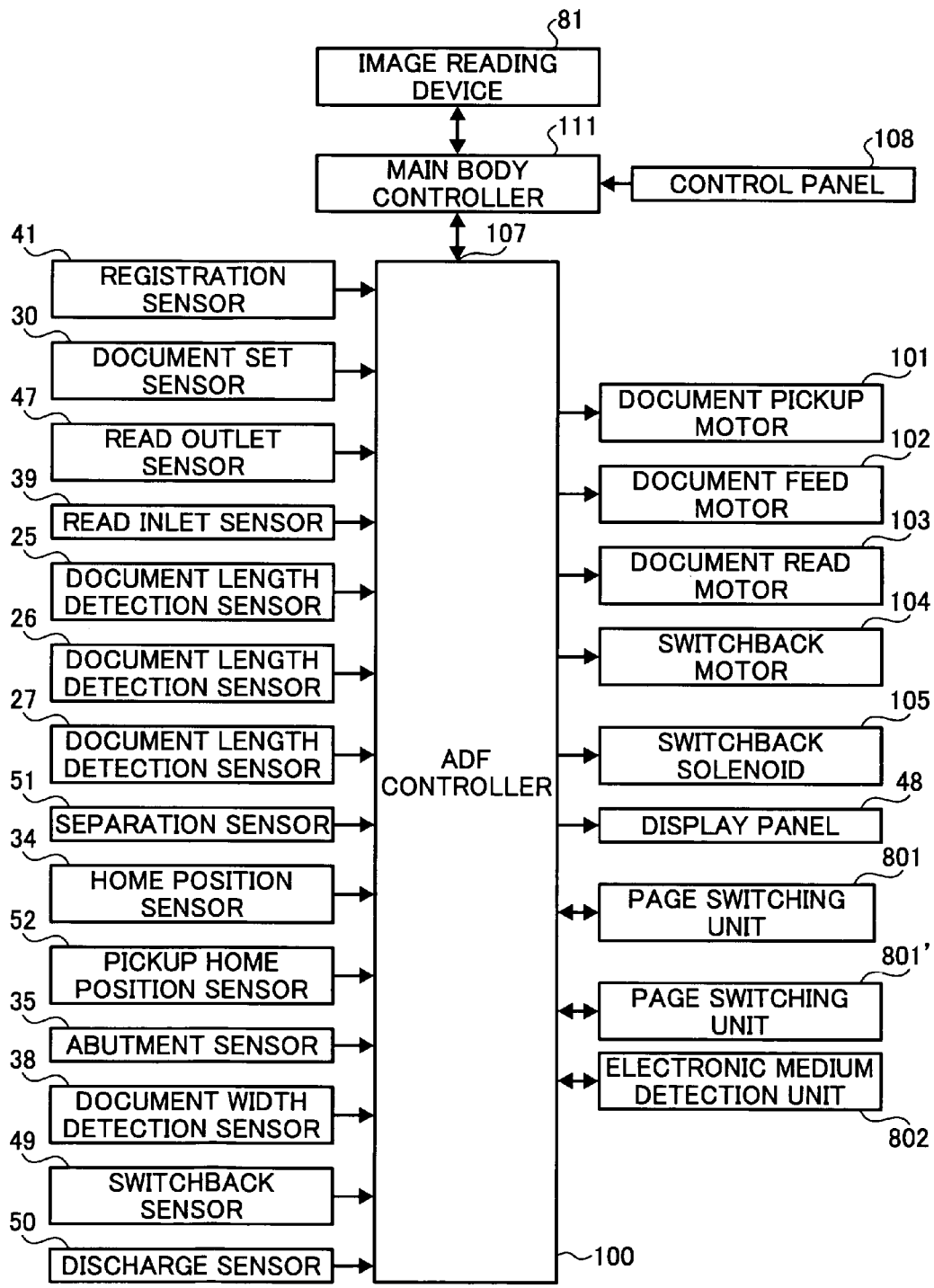
FIG. 22 is a block diagram of a control system of the image reading system of FIG. 21, according to the second example embodiment of the present patent application.

Details of the configuration of the image reading system 20a including the ADF 23a and the scanner 81 are described in reference to FIGS. 21 and 22.

FIG. 21 is a schematic configuration of the image reading system 20a, and FIG. 22 is a block diagram showing a control system of the image reading system 20a, focusing on the ADF controller 100 of the ADF 23a according to the second example embodiment of the present patent application.

In FIGS. 21 and 22, the page switching unit 801' is disposed in the vicinity of the document discharging roller set 42 at an upstream side along the document travel direction. The page switching unit 801' includes the same structure and functions as the page switching unit 801 and is connected to the ADF controller 100.

The path switching member 124 is disposed upstream of the pair of read inlet rollers 37 in the document travel direction (when feeding the original documents). When reading the electronic paper 900 while conducting the page switching operation, the ADF controller 100 turns on a solenoid, not shown, to drive the path switching member 124 to move to the position indicated by a chain double-dashed line, before the electronic paper 900 switched back to the scanning position 80 via the document discharging roller set 42 reaches the pair of pull-out rollers 36. Thus, the electronic paper 900 may be conveyed via the retreat path 55 to a direction indicated by arrow D to move to the retreat table 810.

After the electronic paper 900 on the retreat table 810 has been conveyed to the scanning position 80 again and the read inlet sensor 39 has been turned off, the ADF controller 100 determines that the trailing edge of the electronic paper 900 has passed through the path switching member 124. Then, the ADF controller 100 turns off the solenoid, not shown, to move the path switching member 124 to the position indicated by the solid line.

Next, details of the transfer operation of the original document performed in an image reading system 20a including the ADF 23a and the scanner 81 are described in reference to FIGS. 23 through 30. The flowcharts of FIGS. 23 through 30 show procedures of a transfer control operation controlled by the ADF controller 100 communicating with the main body controller 111.

The following procedure shows the transfer operation to convey an electronic paper 900, which is one of the transfer operations in a single face mode for reading one face of an original document (non-electronic paper or electronic paper).

After the transfer operation has performed through the procedure in the flowcharts of FIGS. 9 through 11, the ADF controller 100 determines whether the original document is an electronic paper 900 or not, which corresponds to step S35 of FIG. 12. In this case, the ADF controller 100 specifies the speed of the document read motor 103 based on the read scan magnification in step S1311, which corresponds to step S311 in the flowchart of FIG. 14.

Figure 23:
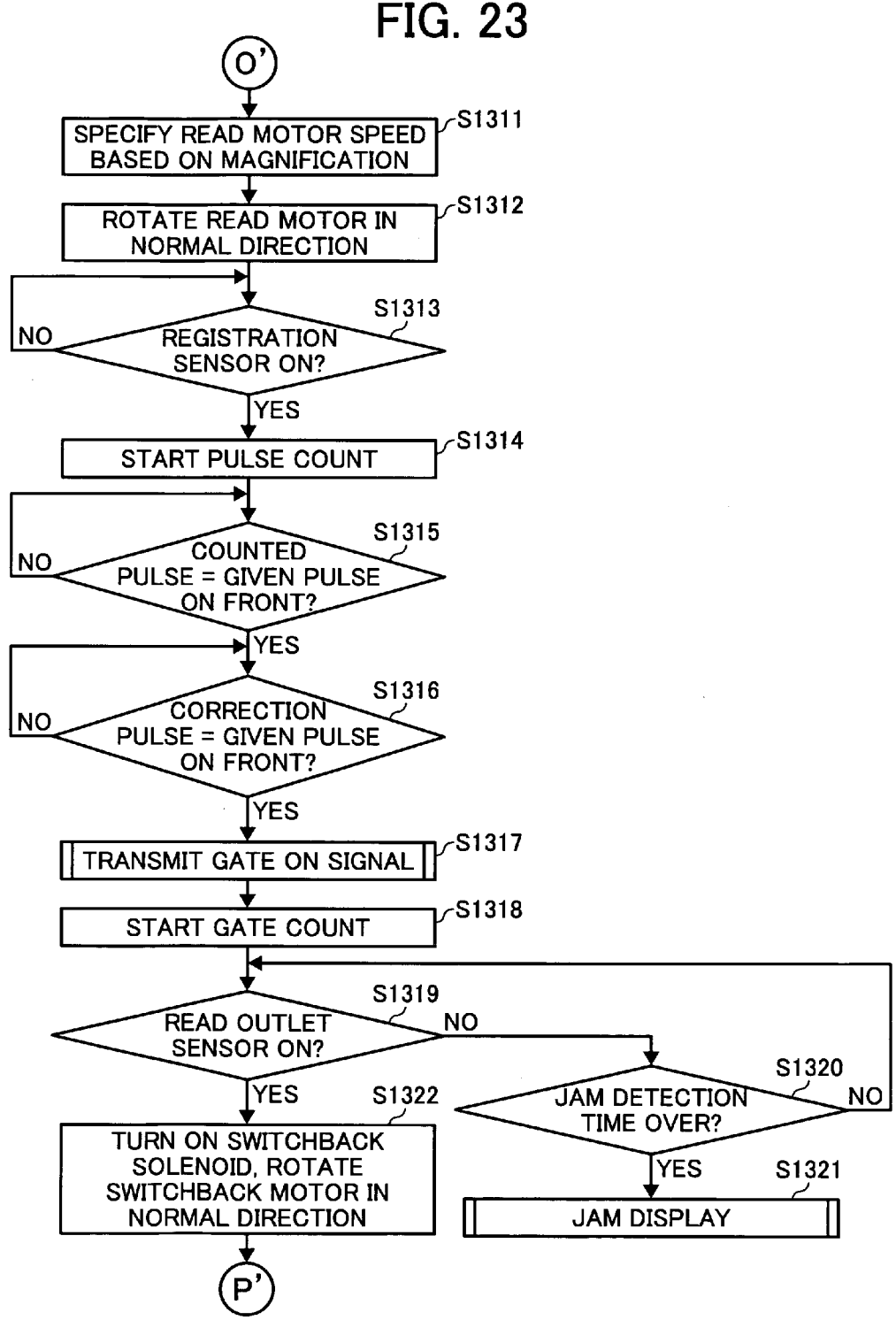
FIG. 23 is a flowchart of a transfer control executed in the image reading system of FIG. 21, according to the second example embodiment of the present patent application.

After step S1311, the ADF controller 100 receives the read start signal from the main body controller 111, and drives the document read motor 103 to rotate in a normal direction so as to rotate the pair of read inlet rollers 37 and the pair of read outlet rollers 40 at the transfer speed according to the read scan magnification, then reads or scans the first page or a page displayed on the electronic paper 900 set in the ADF 23a in steps S1312 through S1322 in the flowchart of FIG. 23, which corresponds to steps S312 through S322 in the flowchart of FIG. 14, and steps S1323 through S1334 in the flowchart of FIG. 24A, which corresponds to steps S323 through S334 in the flowchart of FIG. 15A.

Figure 24B:
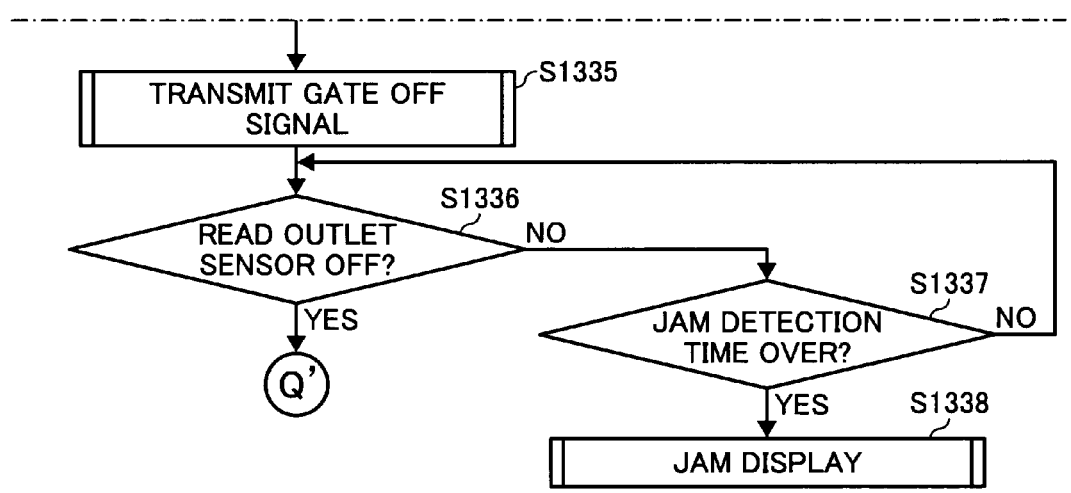

Then, in step S1335 in a flowchart of FIG. 24B corresponding to step S335 of the flowchart of FIG. 15B, the ADF controller 100 transmits the gate off signal that indicates the image area in the sub-scanning direction with respect to the main body controller 111.

After step S1335, the ADF controller 100 determines whether the read outlet sensor 47 has been turned off in step S1336, which corresponds to step S336 in the flowchart of FIG. 15B.

When it is determined that the read outlet sensor 47 has not been turned off, the result of step S1336 is NO, and the ADF controller 100 determines whether the jam detection time has been over in step S1337, which corresponds to step S337 in the flowchart of FIG. 15B.

When it is determined that the jam detection time has not been over, the result of step S1337 is NO, and the process returns to step S1336.

When it is determined that the jam detection time has been over, the result of step S1337 is YES, and the ADF controller 100 determines that a jam indicating that the original document has not yet completely been discharged has occurred and displays a message on the display panel 48 to inform of the occurrence of the jam in step S1338, which corresponds to step S338 in the flowchart of FIG. 15B.

When it is determined that the read outlet sensor 47 has been turned off, the result of step S1336 is YES, and the process proceeds to process Q' as shown in FIG. 25, where process Q' starts at step S401.

In step S401 of FIG. 25, the ADF controller 100 instructs the page switching unit 801' to perform the page switching operation with respect to the electronic paper 900, and the process proceeds to step S402.

Based on the above-described instruction, the page switching unit 801' transmits a signal to cause the electronic paper 900 to perform the page switching operation. When the updated page after the page switching operation is either the first page or the last page, the electronic paper 900 transmits a signal to the page switching unit 801' to inform that the updated page is either the first page or the last page. On receiving the signal, the page switching unit 801' transmits a signal of the page data of the updated page to the ADF controller 100.

In step S402, the ADF controller 100 determines whether the page currently displayed on the electronic paper 900 is the first page or not. Specifically, the ADF controller 100 makes the determination whether the page switching unit 801 has received a signal indicting the page is the first page.

Figure 30:
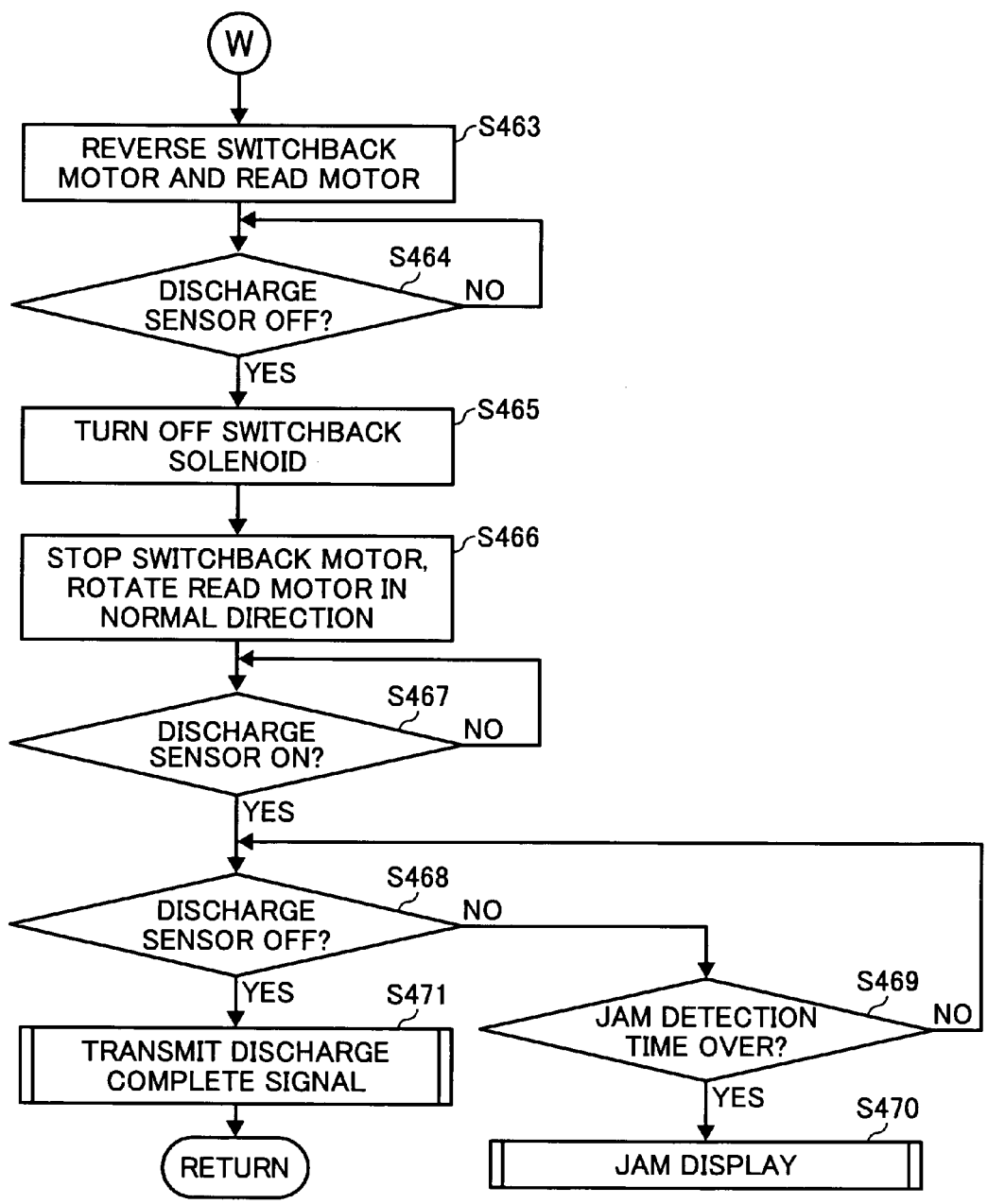
FIG. 30 is a flowchart of the transfer control continued from FIG. 29.

When it is determined that the page is the first page, the result of step S402 is YES, and the process proceeds to process W, where process W starts at step S463 in a flowchart of FIG. 30.

When it is determined that the page is not the first page, the result of step S402 is NO, and the ADF controller 100 determines whether the document switchback motor 104 has been driven by a reference number of pulses, in step S403.

When the document switchback motor 104 has not been driven by a reference number of pulses, the result of step S403 is NO, and the ADF controller 100 repeats step S403 until the document switchback motor 104 is driven by a reference number of pulses.

When it is determined that the document switchback motor 104 has been driven by a reference number of pulses, the result of step S403 is YES, and the process proceeds to step S404.

In step S404, the ADF controller 100 drives the document switchback motor 104 to rotate in a reverse direction at high speed and the document read motor 103 to rotate in a reverse direction to cause the electronic paper to be conveyed to the scanning position 80.

After step S404, the ADF controller 100 determines whether the read outlet sensor 47 has been turned on to detect the leading edge of the electronic paper in step S405.

When it is determined that the read outlet sensor 47 has not been turned on to detect the leading edge of the original document, the result of step S405 is NO, and the ADF controller 100 determines whether the jam detection time has been over or not in step S406.

When it is determined that the jam detection time has not been over, the result of step S406 is NO, and the process goes back to step S405.

When it is determined that the jam detection time has been over, the result of step S406 is YES, and the ADF controller 100 determines that a jam indicating that leading edge of the original document to be discharged has not reached the read outlet sensor 47 has occurred and displays a message on the display panel 48 to inform the occurrence of the jam in step S407.

When it is determined that the read outlet sensor 47 has been turned on to detect the leading edge of the original document, the result of step S405 is YES, the ADF controller 100 starts the correction count of the amount or length of abutment of the leading edge of the original document to the pair of read outlet rollers 40, in step S408.

After step S408, the ADF controller 100 determines, in step S409, whether the number of counted pulses of the document read motor 103 has reached a reference number of pulses corresponding to the reference amount of abutment of the leading edge of the original document.

When it is determined that the number of counted pulses of the document read motor 103 has not reached the reference number of pulses, the result of step S409 is NO, and the ADF controller 100 repeats step S409 until the number of counted pulses of the document read motor 103 reaches the reference number of pulses.

Figure 25A:
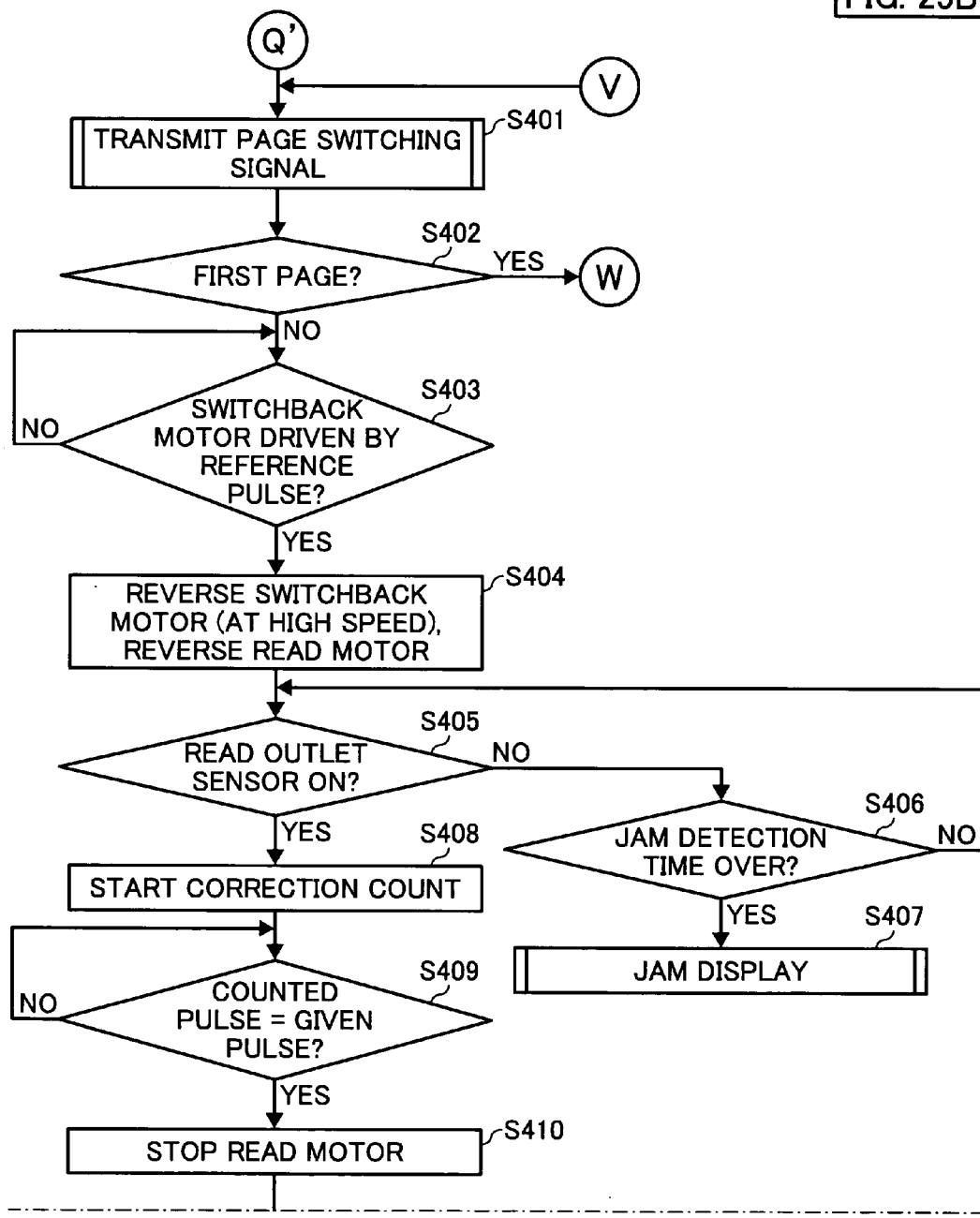
FIGS. 25A and 25B are flowcharts of the transfer control continued from FIG. 24B.
Figure 25B:
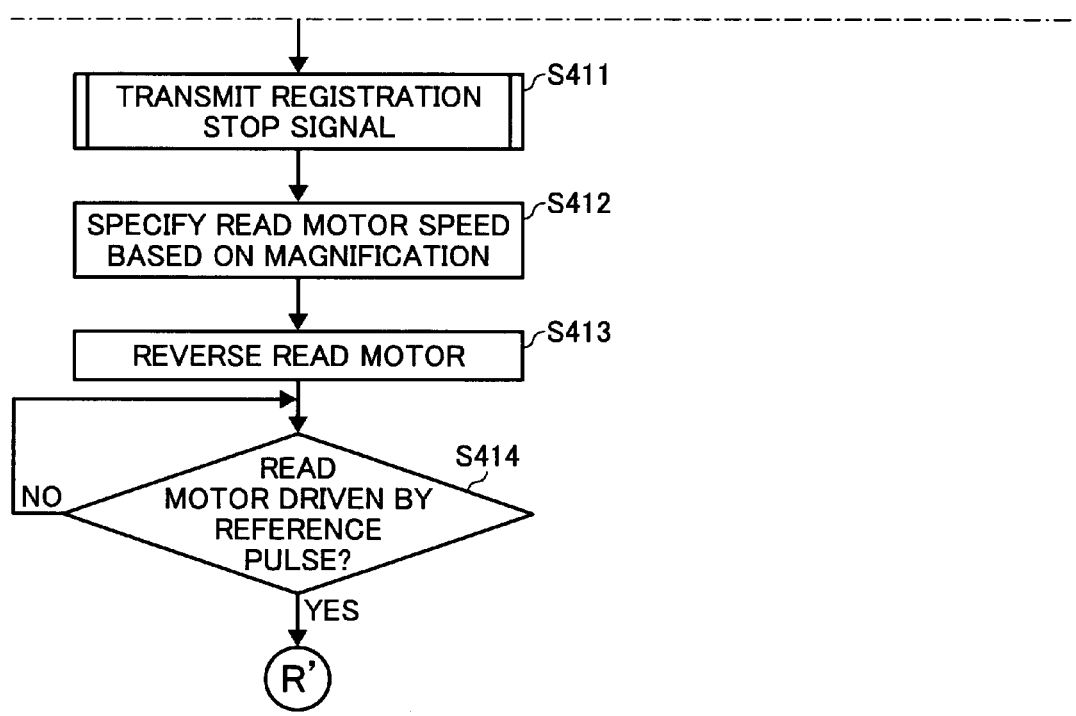

When it is determined that the number of counted pulses of the document read motor 103 has reached the reference number of pulses, the result of step S409 is YES, and the ADF controller 100 causes the document read motor 103 to stop in step S410, then transmits the registration stop signal to the main body controller 111 in step S411 in a flowchart of FIG. 25B.

After step S411, the ADF controller 100 specifies the speed of the document read motor 103 based on the read scan magnification in step S412. On receiving the read start signal from the main body controller 111, the reading operation of the original document starts.

After step S412, the ADF controller 100 receives the read start signal from the main body controller 111, and drives the document read motor 103 to rotate in a reverse direction, in step S413, so as to rotate the pair of read inlet rollers 37 and the pair of read outlet rollers 40 at the transfer speed according to the read scan magnification.

In step S414, the ADF controller 100 determines whether the document read motor 103 has been driven by a reference number of pulses.

When the document read motor 103 has not been driven by a reference number of pulses, the result of step S414 is NO, and the ADF controller 100 repeats step S414 until the document read motor 103 is driven by a reference number of pulses.

When it is determined that the document read motor 103 has been driven by a reference number of pulses, the result of step S414 is YES, and the process proceeds to process R', where process R' starts at step S415 in a flowchart of FIG. 26A.

In step S415 of the flowchart of FIG. 26A, the ADF controller 100 starts counting the number of pulses of the document read motor 103.

After step S415, the ADF controller 100 determines, in step S416, whether the number of counted pulses of the document read motor 103 has reached a reference number of pulses for the front face of the original document, which corresponds to the distance of the registration sensor 41 and the scanning position 80 on the slit glass 22b.

When it is determined that the number of counted pulses of the document read motor 103 has not reached a reference number of pulses for the front face of the original document, the result of step S416 is NO, and the ADF controller 100 repeats step S416 until the number of counted pulse counts of the document read motor 103 reaches a reference number of pulses for the front face of the original document.

When it is determined that the number of counted pulses of the document read motor 103 has reached a reference number of pulses for the front face of the original document, the result of step S416 is YES, and the ADF controller 100 determines, in step S417, whether the number of correction pulses that account for the slip ratio and so forth of the original document has reached a reference number of pulses for the front face of the original document.

When it is determined that the number of correction pulses has not reached a reference number of pulses for the front face of the original document, the result of step S417 is NO, and the ADF controller repeats step S417 until the number of correction pulses reaches a reference number of pulses for the front face of the original document.

When it is determined that the number of correction pulses has reached a reference number of pulses for the front face of the original document, the result of step S417 is YES, the ADF controller 100 transmits, in step S418, the gate on signal that indicates an image area in a sub-scanning direction, to the main body controller 111 at the timing that the leading edge of the original document reaches the scanning position 80.

After step S418, the ADF controller 100 starts counting the number of the gate counts for the front face of the original document in step S419, and determines, in step S420, whether the read inlet sensor 39 has been turned on to detect the leading edge of the original document.

When it is determined that the read inlet sensor 39 has not been turned on to detect the leading edge of the electronic paper, the result of step S420 is NO, and the ADF controller 100 determines whether the jam detection time has been over or not in step S421.

When it is determined that the jam detection time has not been over, the result of step S421 is NO, and the process goes back to step S420.

When it is determined that the jam detection time has been over, the result of step S421 is YES, and the ADF controller 100 determines a jam indicating that the leading edge of the original document has not reached the read inlet sensor 39 has occurred and displays a message on the display panel 48 to inform the occurrence of the jam in step S422.

On the other hand, when it is determined that the read inlet sensor 39 has been turned on to detect the leading edge of the original document, the result of step S420 is YES, and the ADF controller 100 turns on a solenoid, not shown, in step S423, so that the path switching member 124 can move to the position indicated by a chain double-dashed line shown in FIG. 21, thereby conveying the electronic paper 900 to the retreat table 810 via the retreat path 55.

After step S423, the ADF controller 100 determines whether the discharge sensor 50 has been turned off to detect the trailing edge of the electronic paper in step S424.

When it is determined that the discharge sensor 50 has not been turned off to detect the trailing edge of the electronic paper, the result of step S424 is NO, and the ADF controller 100 repeats step S424 until the discharge sensor 50 is turned on.

When it is determined that the discharge sensor 50 has been turned off to detect the trailing edge of the electronic paper, the result of step S424 is YES, and the ADF controller 100 turns off the switchback solenoid 105 and causes the path switching member 124 to move to the position indicated by the solid line in FIG. 21, in step S425.

Figure 26B:
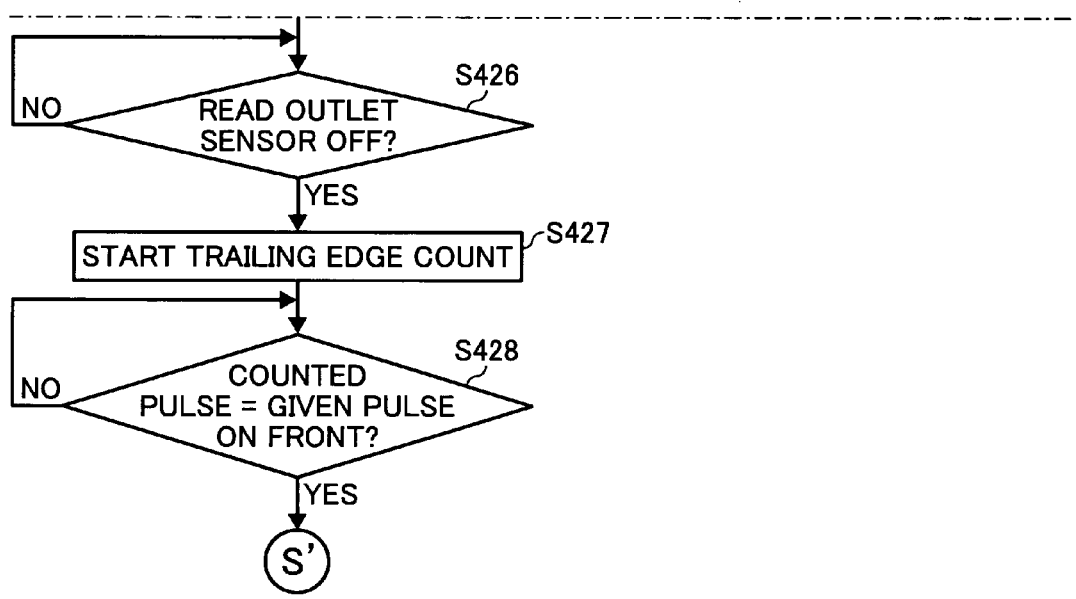

After step S425, the ADF controller 100 determines whether the read outlet sensor 47 has been turned off in step S426 in a flowchart of FIG. 26B.

When it is determined that the read outlet sensor 47 has not been turned off, the result of step S426 is NO, and the ADF controller 100 repeats step S426 until the read outlet sensor 47 is turned off.

When it is determined that the read outlet sensor 47 has been turned off, the result of step S426 is YES, and the ADF controller 100 starts, in step S427, the trailing edge count for counting the number of pulses of the document read motor 103.

After step S427, the ADF controller 100 determines whether the number of counted pulses of the document read motor 103 has reached a reference number of pulses for the front face of the original document in step S428.

When it is determined that the number of counted pulses of the document read motor 103 has not reached a reference number of pulses for the front face of the original document, the result of step S428 is NO, and the ADF controller 100 repeats step S428 until the number of counted pulses of the document read motor 103 reaches a reference number of pulses for the front face of the original document.

Figure 27:
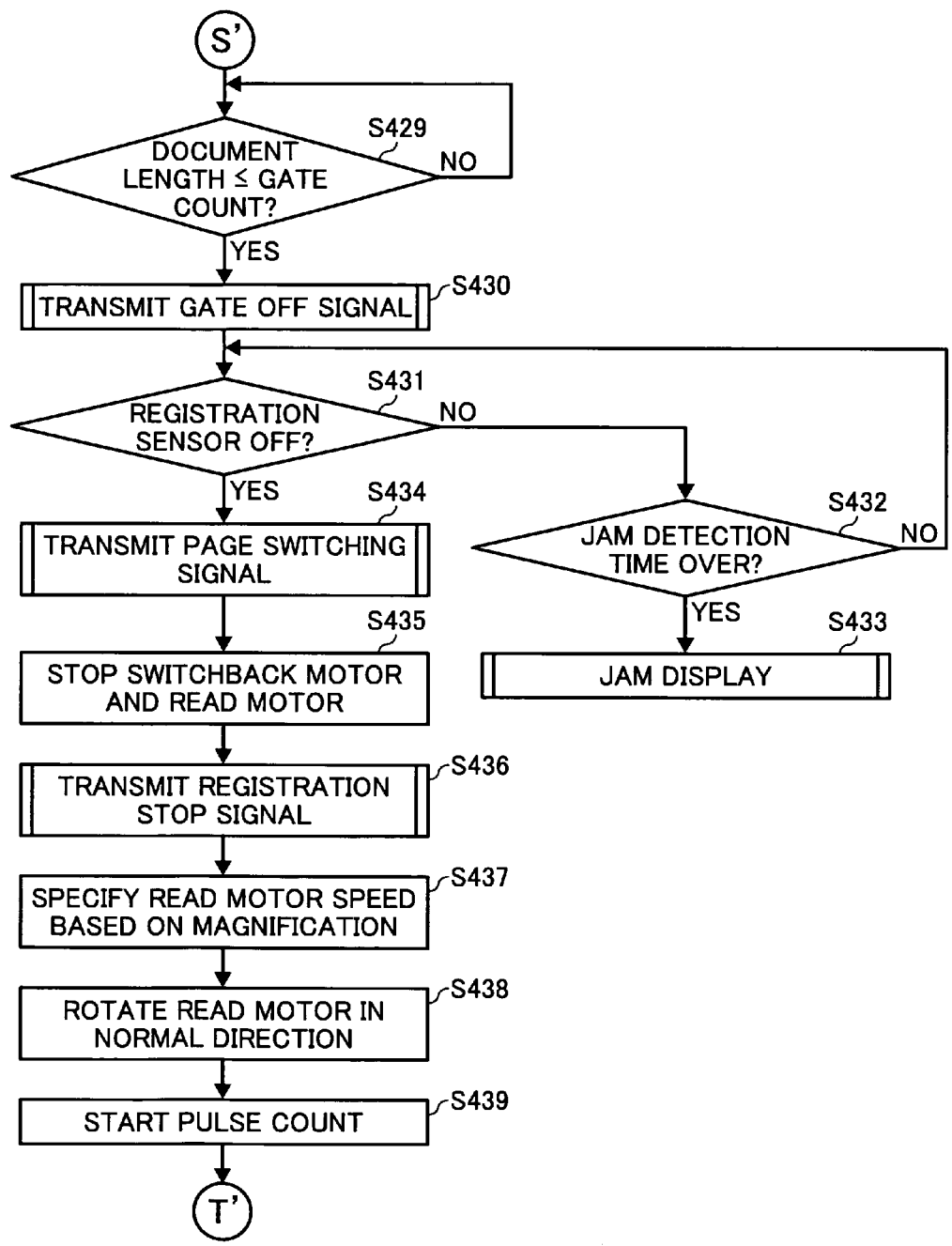
FIG. 27 is a flowchart of the transfer control continued from FIG. 26.

When it is determined that the number of counted pulses of the document read motor 103 has reached a reference number of pulses for the front face of the original document, the result of step S428 is YES, and the process proceeds to process S', where process S' starts at step S429 in FIG. 27.

In step S429 in a flowchart of FIG. 27, the ADF controller 100 determines whether the number of counted gate pulses is equal to or greater than the length of the original document.

When it is determined that the number of counted gate pulses is smaller than the length of the original document, the result of step S429 is NO, and the ADF controller 100 repeats step S429 until the number of counted gate pulses becomes equal to or greater than the length of the original document.

When it is determined that the number of counted gate pulses is equal to or greater than the length of the original document, the result of step S429 is YES, and the ADF controller 100 transmits the gate off signal that indicates the image area in the sub-scanning direction with respect to the main body controller 111, in step S430.

After step S430, the ADF controller 100 determines whether the registration sensor 41 has been turned off in step S431.

When it is determined that the registration sensor 41 has not been turned off, the result of step S431 is NO, and the ADF controller 100 determines whether the jam detection time has been over or not in step S432.

When it is determined that the jam detection time has not been over, the result of step S432 is NO, and the process goes back to step S431.

When it is determined that the jam detection time has been over, the result of step S432 is YES, and the ADF controller 100 determines a jam indicating that the original document has not completely passed the registration sensor 41 has occurred and displays a message on the display panel 48 to inform the occurrence of the jam in step S433.

When it is determined that the registration sensor 41 has been turned off, the result of step S431 is YES, and the ADF controller 100 instructs the page switching unit 801 to conduct a page switching operation with respect to the electronic paper 900, in step S434.

Based on the instruction, the page switching unit 801 transmits a signal to the electronic paper 900 to update or change the page displayed on the display part 904 thereof. When the updated page after the page switching operation is either the first page or the last page, the electronic paper 900 transmits a signal to inform that the updated page is either the first page or the last page, to the page switching unit 801'. On receiving the above-described signal, the page switching unit 801' transmits a signal of the page data to the ADF controller 100.

After step S434, the ADF controller 100 causes the switchback motor 104 and the document read motor 103 to stop in step S435, and transmits the registration stop signal to the main body controller 111 in step S436.

After step S436, the ADF controller 100 specifies the speed of the document read motor 103 based on the read scan magnification in step S437, receives the read start signal from the main body controller 111, and starts to execute the scanning operation of the original document.

Then, the ADF controller 100 drives the document read motor 103 to rotate in a normal direction, in step S438, so as to rotate the pair of read inlet rollers 37 and the pair of read outlet rollers 40 at the transfer speed according to the read scan magnification.

After step S438, the ADF controller 100 starts counting the number of pulses of the document read motor 103 in step S439.

Figure 28:
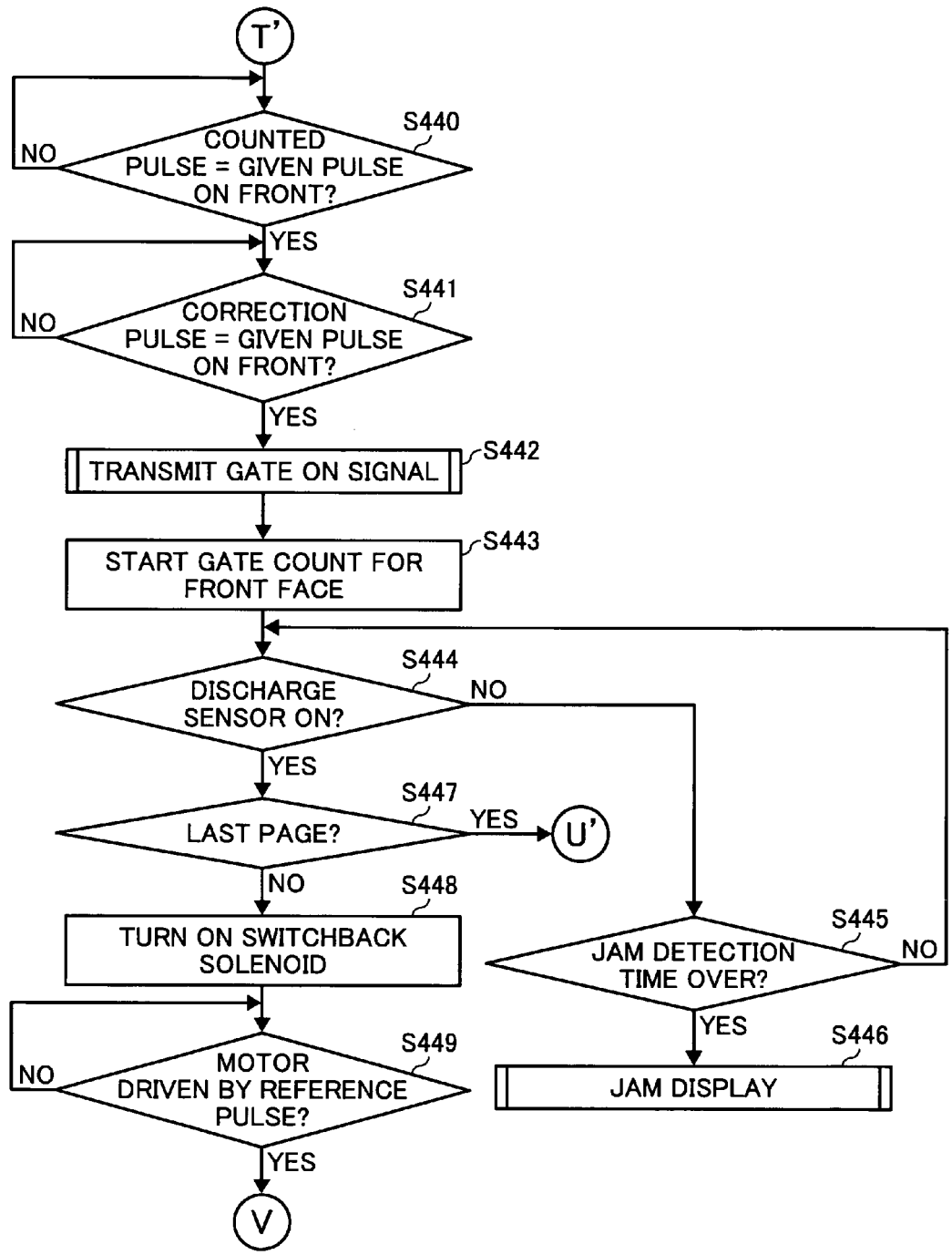
FIG. 28 is a flowchart of the transfer control continued from FIG. 27.

After step S439, the process proceeds to process T', where process T' starts at step S440 in FIG. 28.

In step S440, the ADF controller 100 determines whether the number of counted pulses of the document read motor 103 has reached a reference number of pulses for the front face of the original document, which corresponds to the distance of the registration sensor 41 and the scanning position 80 on the slit glass 22b.

When it is determined that the number of counted pulses of the document read motor 103 has not reached a reference number of pulses for the front face of the original document, the result of step S440 is NO, and the ADF controller 100 repeats step S440 until the number of counted pulse counts of the document read motor 103 reaches a reference number of pulses for the front face of the original document.

When it is determined that the number of counted pulses of the document read motor 103 has reached a reference number of pulses for the front face of the original document, the result of step S440 is YES, and the ADF controller 100 determines, in step S441, whether the number of correction pulses that account for the slip ratio and so forth of the electronic paper has reached a reference number of pulses for the front face of the original document.

When it is determined that the number of correction pulses has not reached the reference number of pulses, the result of step S441 is NO, and the ADF controller repeats step S441 until the number of correction pulses reaches the reference number of pulses.

When it is determined that the number of correction pulses has reached a reference number of pulses for the front face of the original document, the result of step S441 is YES, the ADF controller 100 transmits, in step S442, the gate on signal that indicates an image area in a sub-scanning direction, to the main body controller 111 at the timing that the leading edge of the electronic paper reaches the scanning position 80.

After step S442, the ADF controller 100 starts counting the number of the gate counts for the front face of the original document in step S443, and determines whether the discharge sensor 50 has been turned on to detect the leading edge of the electronic paper in step S444.

When it is determined that the discharge sensor 50 has not been turned on to detect the leading edge of the original document, the result of step S444 is NO, and the ADF controller 100 determines whether the jam detection time has been over or not in step S445.

When it is determined that the jam detection time has not been over, the result of step S445 is NO, and the process goes back to step S444.

When it is determined that the jam detection time has been over, the result of step S445 is YES, and the ADF controller 100 determines a jam indicating that the leading edge of the electronic paper 900 has not reached the discharge sensor 50 has occurred and displays a message on the display panel 48 to inform the occurrence of the jam in step S446.

On the other hand, when it is determined that the discharge sensor 50 has been turned on to detect the leading edge of the electronic paper, the result of step S444 is YES, the ADF controller 100 determines whether the page updated after the page switching operation is the last page or not, in step S447.

Figure 29:
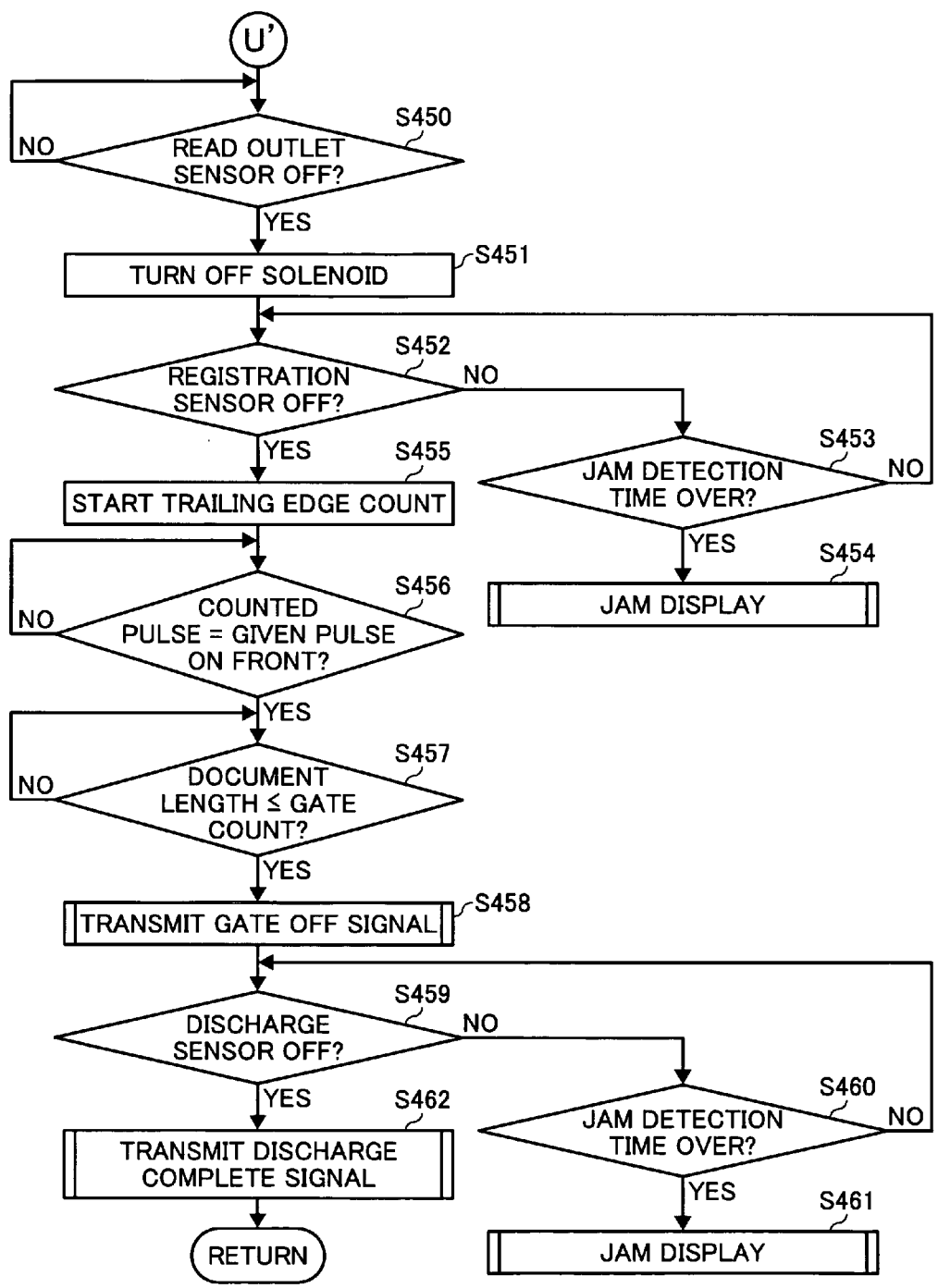
FIG. 29 is a flowchart of the transfer control continued from FIG. 28.

When it is determined that the currently displayed page is the last page, the result of step S447 is YES, and the process jumps to process U', where process U' starts at step S450 in FIG. 29. Specifically, the ADF controller 100 makes the determination whether the page switching unit 801 has received a signal indicting the page is the last page.

When it is determined that the currently displayed page is not the last page, the result of step S447 is NO, and the ADF controller 100 turns on the switchback solenoid 105 in step S448, and causes the path switching member 44 to move to the position indicated by a chain double-dashed line in FIG. 21. Accordingly, the electronic paper is conveyed to the reentry path 46a.

After step S448, the ADF controller 100 determines whether the number of counted pulses of the switchback solenoid 105 has reached a reference number of pulses for the front face of the original document in step S449, so as to convey the electronic paper 900.

When it is determined that the number of counted pulses of the switchback solenoid 105 has not reached the reference number of pulses, the result of step S449 is NO, and the ADF controller 100 repeats step S449 until the number of counted pulses of the switchback solenoid 105 reaches the reference number of pulses.

When it is determined that the number of counted pulses of the switchback solenoid 105 has reached the reference number of pulses, the result of step S449 is YES, and the process goes back to process V, where process V starts at step S401 in FIG. 25.

In step S450, the ADF controller 100 determines whether the read outlet sensor 47 has been turned off.

When it is determined that the read outlet sensor 47 has not been turned off, the result of step S450 is NO, and the ADF controller 100 repeats step S450 until the read outlet sensor 47 is turned off.

When it is determined that the read outlet sensor 47 has been turned off, the result of step S450 is YES, and the ADF controller 100 turns off a solenoid, not shown, in step S451, so that the path switching member 124 can move to the position indicated by the solid line shown in FIG. 21, thereby conveying the original document to the scanning position 80 via the reverse path 53.

After step S451, the ADF controller 100 determines whether the registration sensor 41 has been turned off according to the passage of the trailing edge of the electronic paper 900, in step S452, and executes the document transfer control.

Since the procedure of the document transfer control in steps S452 through S462 in the flowchart of FIG. 29 is same as the procedure in steps S47 through S57 in FIG. 13, detailed description thereof is omitted.

As previously described, when it is determined that the page is the first page, the result of step S402 is YES, and the process proceeds to process W, where process W starts at step S463 in the flowchart of FIG. 30.

In step S463 in the flowchart of FIG. 30, when the page switching operation of the page switching unit 801' is conducted (in step S401 in FIG. 25A) and the page currently displayed on the electronic paper is determined to be the first page, the ADF controller 100 drives the switchback motor 104 and the document read motor 103 to rotate in a reverse direction. These reverse rotations of the switchback motor 104 and the document read motor 103 cause the electronic paper 900 to be conveyed by the discharge drive roller 42a, the lower discharge driven roller 42c, and the pair of switchback rollers 45, from the reentry path 46a to the scanning position 80.

After step S463, the ADF controller 100 determines whether the discharge sensor 50 has been turned off at the passage of the trailing edge of the electronic paper, in step S464.

When it is determined that the discharge sensor 50 has not been turned off, the result of step S464 is NO, and the ADF controller 100 repeats step S464 until the discharge sensor 50 is turned off.

When it is determined that the discharge sensor 50 has been turned off, the result of step S464 is YES, the ADF controller 100 determines that the electronic paper has passed the document discharging roller set 42, turns off the switchback solenoid 105, and causes the path switching member 109, 44 to move to the position indicated by the solid line in FIG. 21, in step S465.

After step S465, the ADF controller 100 causes the switchback motor 104 to stop and the document read motor 103 to rotate in a normal direction in step S466. This action causes the discharge drive roller 42a and the lower discharge driven roller 42c to rotate, thereby conveying the electronic paper to the document discharging roller set 42 again.

After step S466, the ADF controller 100 determines, in step S467, whether the discharge sensor 50 has been turned on to detect the leading edge of the electronic paper 900.

When it is determined that the discharge sensor 50 has not been turned on, the result of step S467 is NO, and the ADF controller 100 repeats step S467 until the discharge sensor 50 is turned on.

When it is determined that the discharge sensor 50 has been turned on to detect the leading edge of the electronic paper 900, the result of step S467 is YES, and the ADF controller 100 determines, in step S468, whether the discharge sensor 50 has been turned off at the passage of the trailing edge of the electronic paper 900.

When it is determined that the discharge sensor 50 has not been turned off, the result of step S468 is NO, and the ADF controller 100 determines whether the jam detection time has been over or not in step S469.

When it is determined that the jam detection time has not been over, the result of step S469 is NO, and the process goes back to step S468.

When it is determined that the jam detection time has been over, the result of step S469 is YES, the ADF controller 100 determines that a jam indicating that the original document is not completely discharged has occurred and displays a message on the display panel 48 to inform the occurrence of the jam, in step 470.

When it is determined that the discharge sensor 50 has been turned off, the result of step S468 is YES, and the ADF controller 100 transmits the discharge completion signal to the main body controller 111 in step S471, and completes the procedure to return to the start of the operation for a next original document.

As described above, the copier 21 according to the second example embodiment of the present patent application includes the reverse path 53 connecting the document table 24 and the scanning position 80, the discharge path 57 and the reentry path 46a connecting the scanning position 80 and the pair of switchback rollers 45, and the retreat path 55 connecting the scanning position 80 and the retreat table 810.

The ADF controller 100 causes an electronic paper placed on the document table 24 to be reversed and conveyed via the reverse path 53 to the scanning position 80. After the first page of the electronic paper 900 is read, the ADF controller 100 causes the electronic paper 900 to be conveyed via the discharge path 57 and the reentry paths 46a to the pair of switchback rollers 45. Then, the ADF controller 100 causes the electronic paper 900 to be switched back from the pair of switchback rollers 45 to the scanning position 80 via the discharge path 57 and the re-entry paths 46a. After the second page of the electronic paper 900 is read, the ADF controller 100 causes the electronic paper 900 to be switched back to the retreat table 810 via the retreat path 55. The ADF controller 100 then causes the electronic paper 900 to be conveyed to from the retreat table 810 via the retreat path 55 to the scanning position 80.

In addition, after the first page of the electronic paper 900 is read, the ADF controller 100 controls the page switching unit 801' to perform the page switching operation to cause the electronic paper 900 to switch or change the image for the next page between the document discharge tray 43 and the pair of switchback rollers 45. Then, the ADF controller 100 controls the page switching unit 801 to change images by page at an upstream side of the pair of read inlet rollers 37 along the document travel direction.

Further, the ADF controller 100 communicates with the main body controller 111 to control the scanner 81 to read the images to the last page of the electronic paper 900 according to the page switching operation of the electronic paper 900.

With the above-described configuration, the ADF controller 100 conducts respective page switching operations at the page switching units 801 and 801' while conveying an electronic paper 900 back and forth between the retreat table 810 and the pair of switchback rollers 45. Therefore, an electronic paper 900 having electronic data for multiple pages can effectively be read.

Figure 31:
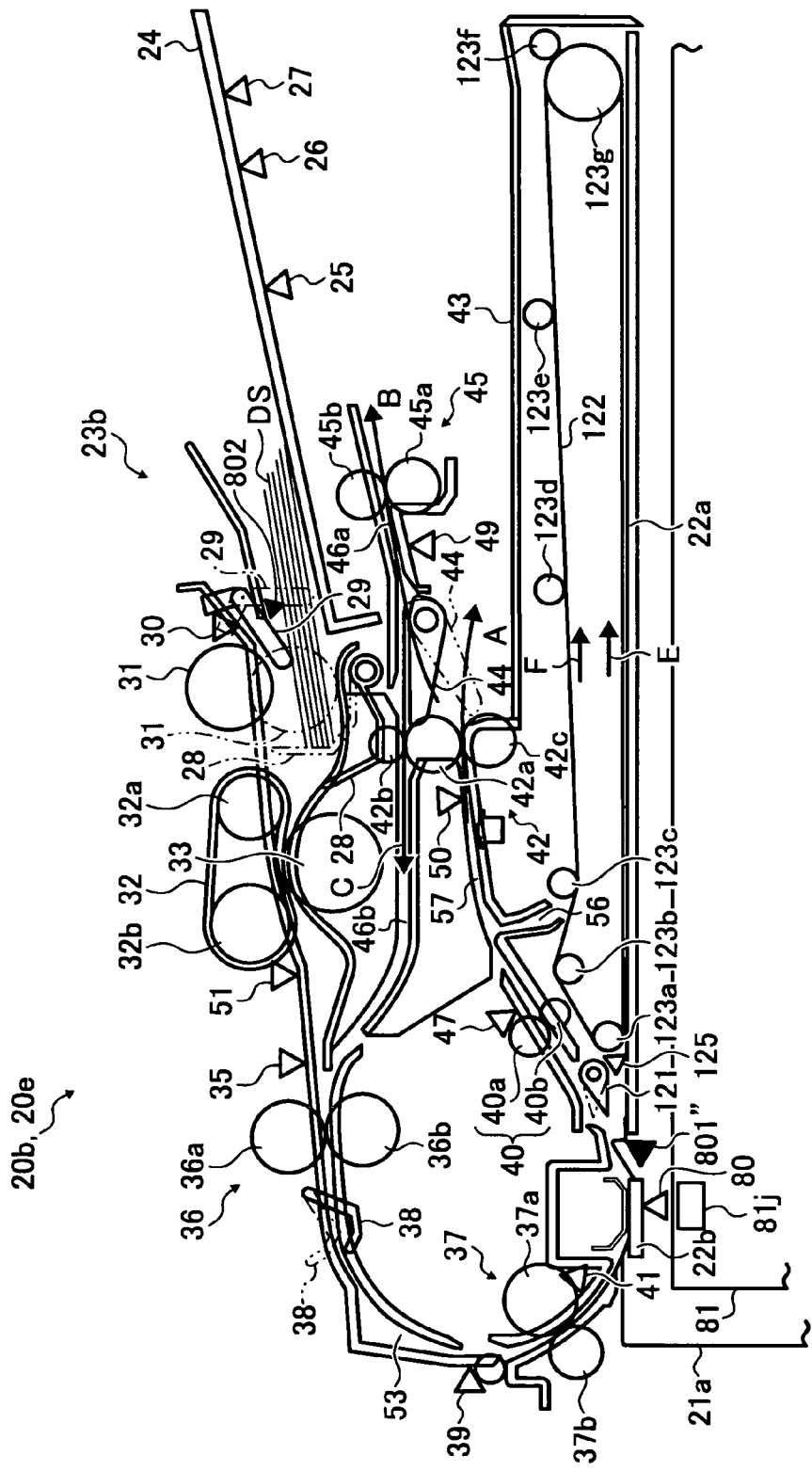
FIG. 31 is a cross-sectional view of a schematic configuration of an image reading system, including a document feeder and an image reader, according to a third example embodiment of the present patent application.
Figure 32:
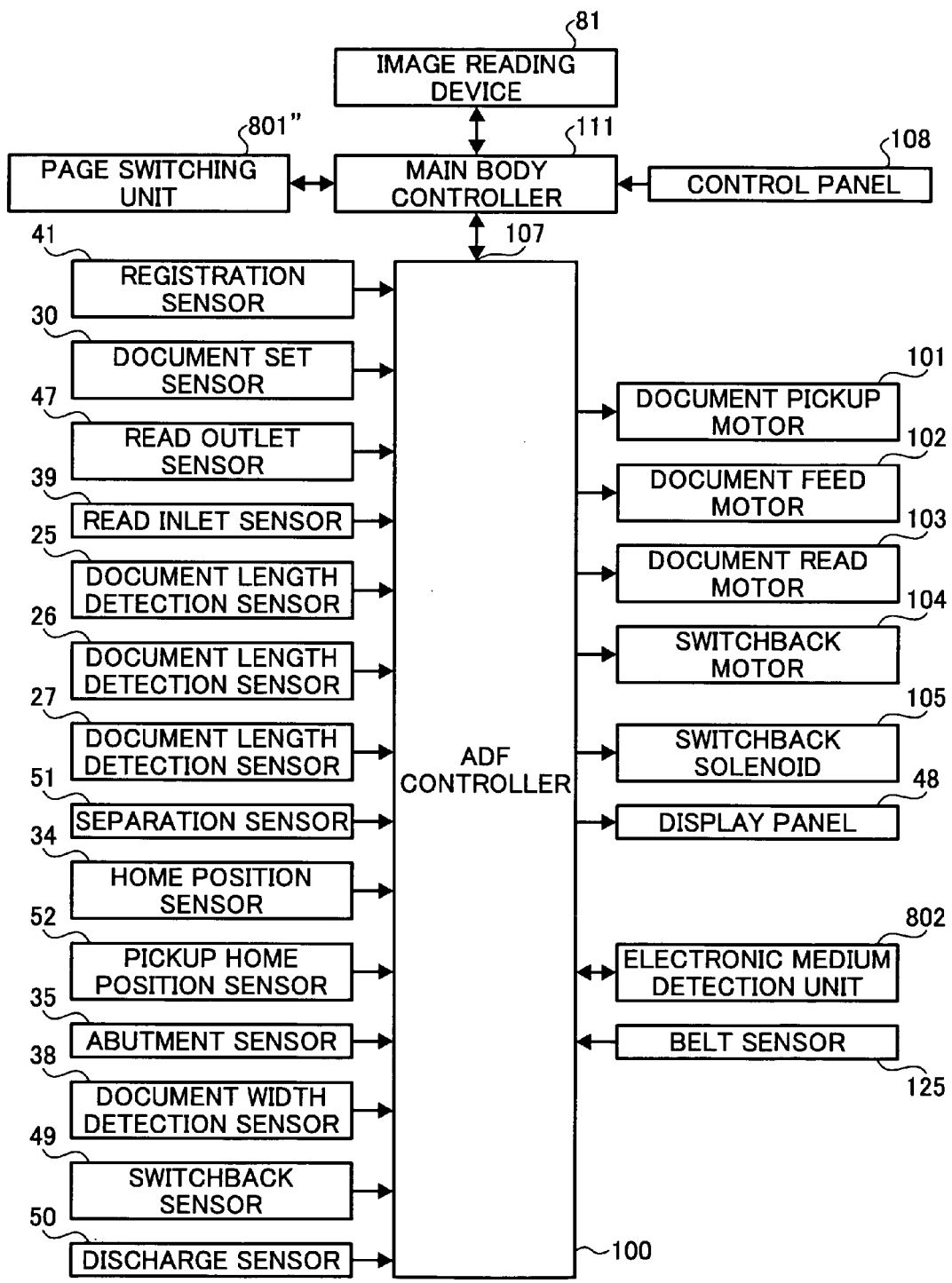
FIG. 32 is a block diagram of a control system of the image reading system of FIG. 31, according to the third example embodiment of the present patent application.

Next, FIGS. 31 and 32 show an image reading system, including an automatic document feeder or ADF and an image reader, according to a third example embodiment of the present patent application, an image forming apparatus including the ADF and the image reader, an electronic paper used in the image forming apparatus, and an image reading method used in the image forming apparatus, according to the third example embodiment of the present patent application. The image forming apparatus according to the third example embodiment of the present patent application corresponds to the copier 21, for example.

A configuration of an image reading system 20b including an ADF 23b and the scanner 81 according to the third example embodiment of the present patent application is similar to the configuration of the image reading system 20 according to the first example embodiment of the present patent application. Except that the ADF 23b further includes a path switching member 121, a solenoid, not shown, a belt sensor 125, a transfer belt 122, and belt roller group 123 or belt rollers 123a through 123g. In addition, the ADF 23b includes a page switching unit 801" instead of the page switching unit 801. According to the above-described addition and replacement of the units, a transfer control for reading an electronic paper 900 may be different from the procedure described in the first example embodiment. Since the other units and mechanisms of the image reading system 20b are identical to the corresponding units and mechanisms of the image reading system 20, the same reference numerals as the corresponding units and mechanisms of the image reading system 20 are used.

Details of the configuration of the image reading system 20b are described in reference to FIGS. 3l and 32.

FIG. 31 is a schematic configuration of the image reading system 20b including the ADF 23b and the scanner 81, and FIG. 22 is a block diagram showing a control system of the image reading system 20b, focusing on the ADF controller 100 of the ADF 23b according to the third example embodiment of the present patent application.

In FIGS. 31 and 32, the page switching unit 801" includes a contact part, which corresponds to the contact part 801a of FIG. 7, at an edge or edges of a document scale contacting the contact glass 22a. The page switching unit 801" includes the same structure and functions as the page switching unit 801 and is connected to the main body controller 111. In the third example embodiment, the contact part 907 of the electronic paper 900 is formed around edges or at an edge thereof so that the page switching unit 801" can transmit an instruction to cause the electronic paper 900, conveyed from the document table 24 to the contact glass 22a, to perform the page switching operation.

The path switching member 121 is disposed in the vicinity of the scanning position 80 and between the document scale and the pair of read outlet rollers 40.

The transfer belt 122 transfers an electronic paper 900 placed on the contact glass 22a in response to rotations of the belt roller group 123 or the belt rollers 123a through 123g driven by the document read motor 103.

An image displayed on the electronic paper 900 may be switched during the page switching operation on the contact glass 22a and be read while the electronic paper 900 is moving and switching back in a horizontal direction. In this case, before the electronic paper 900 that has passed over the scanning position 80 via the reverse path 53 reaches the pair of read outlet rollers 40 (for example, when the electronic paper 900 is conveyed by a reference number of pulsed after the registration sensor 41 has detected the leading edge of the electronic paper 900), the ADF controller 100 drives the solenoid, not shown, to move the path switching member 121 to the position indicated by a chain double-dashed line in FIG. 31. By switching the electronic paper 900 as described above, the electronic paper 900 is directed to the transfer belt 122 to be conveyed on the contact glass 22a.

Further, when the electronic paper 900 is conveyed to the contact glass 22a and the belt sensor 125 turns on upon detection of the leading edge of the electronic paper 900, the ADF controller 100 determines that the electronic paper 900 has reached the transfer belt 122, then turns off the solenoid, and switches the path switching member 121 to the position indicated by the solid line in FIG. 31.

Further, when the transfer belt 122 transfers the electronic paper 900 to the contact glass 22a in a direction indicated by arrow E in FIG. 31 and the belt sensor 125 detects the leading edge of the electronic paper 900, the ADF controller 100 drives the document read motor 103 in a reverse direction by a reference number of pulses, and causes the contact part 907 of the electronic paper 900 to contact with the contact part 801a exposed to the edges of the document scale of the page switching unit 801".

After the image currently displayed on the electronic paper 900 has completely been read, the main body controller 111 causes the scanner 81 to move to the document scale and gives an instruction to the page switching unit 801" to conduct the page switching operation with respect to the electronic paper 900. When the last page of the electronic paper 900 is read, the main body controller 111 transmits a read completion signal to the ADF controller 100. Based on the signal, the ADF controller 100 drives the document read motor 103 to rotate the transfer belt 122 in a direction indicated by arrow E. Consequently, the electronic paper 900 is conveyed to the document discharge tray 43 via the belt switchback path 56.

A description is given of a transfer control of the electronic paper 900, performed by the image reading system 20b for reading the images on the electronic paper 900 in the copier 21.

As described above, when it is determined that the original document is an electronic paper 900 based on the detection results obtained by the electronic medium detection unit 802, the ADF controller 100 drives the document pickup motor 101, the document feed motor 102, and the document read motor 103 sequentially to rotate the document pickup roller 31, the pair of pull-out rollers 36, the pair of read inlet rollers 37, and the pair of read outlet rollers 40, thereby conveying the electronic paper 900 to the scanning position 80. The speeds of the motors for conveying the electronic paper 900 to the scanning position 80 are specified to high speed so as to effectively read the electronic paper 900 on the contact glass 22a.

The ADF controller 100 then determines whether the registration sensor 41 has been driven by a reference number of pulses after the registration sensor 41 has detected the leading edge of the electronic paper 900.

When it is determined that the registration sensor 41 has been driven by the reference number of pulses, the ADF controller 100 drives the solenoid, not shown. By driving the solenoid, the path switching member 121 moves to the position indicated by the chain double-dashed line in FIG. 31. Therefore, the path switching member 121 directs the electronic paper 900 to the transfer belt 122.

Next, the ADF controller 100 determines whether the belt sensor 125 has been turned on upon detection of the leading edge of the electronic paper 900.

When it is determined that the belt sensor 125 has been turned on, the ADF controller 100 turns off the solenoid, not shown, to move the path switching member 121 to the position indicated by the solid line in FIG. 31.

The ADF controller 100 then determines whether the belt sensor 125 has been turned off after the passage of the trailing edge of the electronic paper 900.

When it is determined that the belt sensor 125 has been turned off, the ADF controller 100 drives the document read motor 103 in a reverse direction by a reference number of pulses and drives the transfer belt 122 to rotate in a direction indicated by arrow F. By driving the transfer belt 122 by the reference number of pulses in a reverse direction, the contact part 907 of the electronic paper 900 can contact with the contact part 801a of the page switching unit 801". Then, the ADF controller 100 causes the document read motor 103 to stop driving.

Next, the ADF controller 100 transmits a signal to inform the main body controller 111 that the electronic paper 900 has reached a give position on the contact glass 22a. Based on this signal, the main body controller 111 causes the scanner 81 to read the image currently displayed on the electronic paper 900 while moving the moving mechanism 81j of the scanner 81 to a given position in the right direction in FIG. 31. After the completion of reading of the image, the main body controller 111 causes the moving mechanism 81j of the scanner 81 to move back to the given position in a left direction in FIG. 31, and gives instructions to the page switching unit 801" to change the page of the electronic paper.

Based on the instructions, the page switching unit 801" transmits a given signal to the electronic paper 900 so that the electronic paper 900 can switch or update the page to display thereon.

As previously described, when the updated page is the last page of image data of the electronic paper 900, the electronic paper 900 transmits a given page data signal to the page switching unit 801". Based on the page data obtained from the page switching unit 801", the main body controller 111 can determine whether the last page of the electronic paper 900 has been completely read.

The main body controller 111 causes the moving mechanism 81j of the scanner 81 to move in a horizontal direction in FIG. 31 to read the image of the page currently displayed on the electronic paper 900 and continue to read the images until the last page of the electronic paper 900 is read. After the last page has been read, the main body controller 111 transmits the read completion signal to the ADF controller 100.

Based on the read completion signal, the ADF controller 100 drives the document read motor 103 to rotate the transfer belt 122 in a direction indicated by arrow E in FIG. 31. By rotating the transfer belt 122, the electronic paper 900 is reversed and conveyed via the belt switchback path 56 to the document discharging roller set 42, then discharged to the document discharge tray 43, as indicated by arrow A in FIG. 31.

In the copier 21 according to the third example embodiment of the present patent application, the ADF controller 100 causes the ADF 23b to transfer and support the electronic paper 900 so that the electronic paper 900 can contact the document scale on the contact glass 22a, and read an image displayed on an electronic paper 900 while the moving the moving mechanism 81j of the scanner 81 in a horizontal direction along the lower side of the contact glass 22a. Each time the reading of image per page unit is completed and the moving mechanism 81*j* of the scanner 81 moves reciprocally in a horizontal direction, the ADF controller 100 gives an instruction to the electronic paper 900 to conduct the page switching operation, via the contact part 801*a* of the page switching unit 801 exposed to the document scale, until the last page of the electronic paper 900 is completely read.

With the above-described configuration, the electronic paper 900 can be read without passing a conveying path for non-electronic paper or paper sheet. By so doing, the reading time during a transfer of an original document can be reduced and an occurrence of a jam during the transfer can be prevented.

Further, when a next original document following the electronic paper 900 is a non-electronic paper, the current original document or the electronic paper 900 can effectively be read and conveyed without obstructing a pre-feeding of the next original document.

Further, by providing the transfer belt 122, when conveying multiple original documents, the intervals of the multiple original documents can be reduced and the multiple original documents can stably be conveyed.

Figure 33:
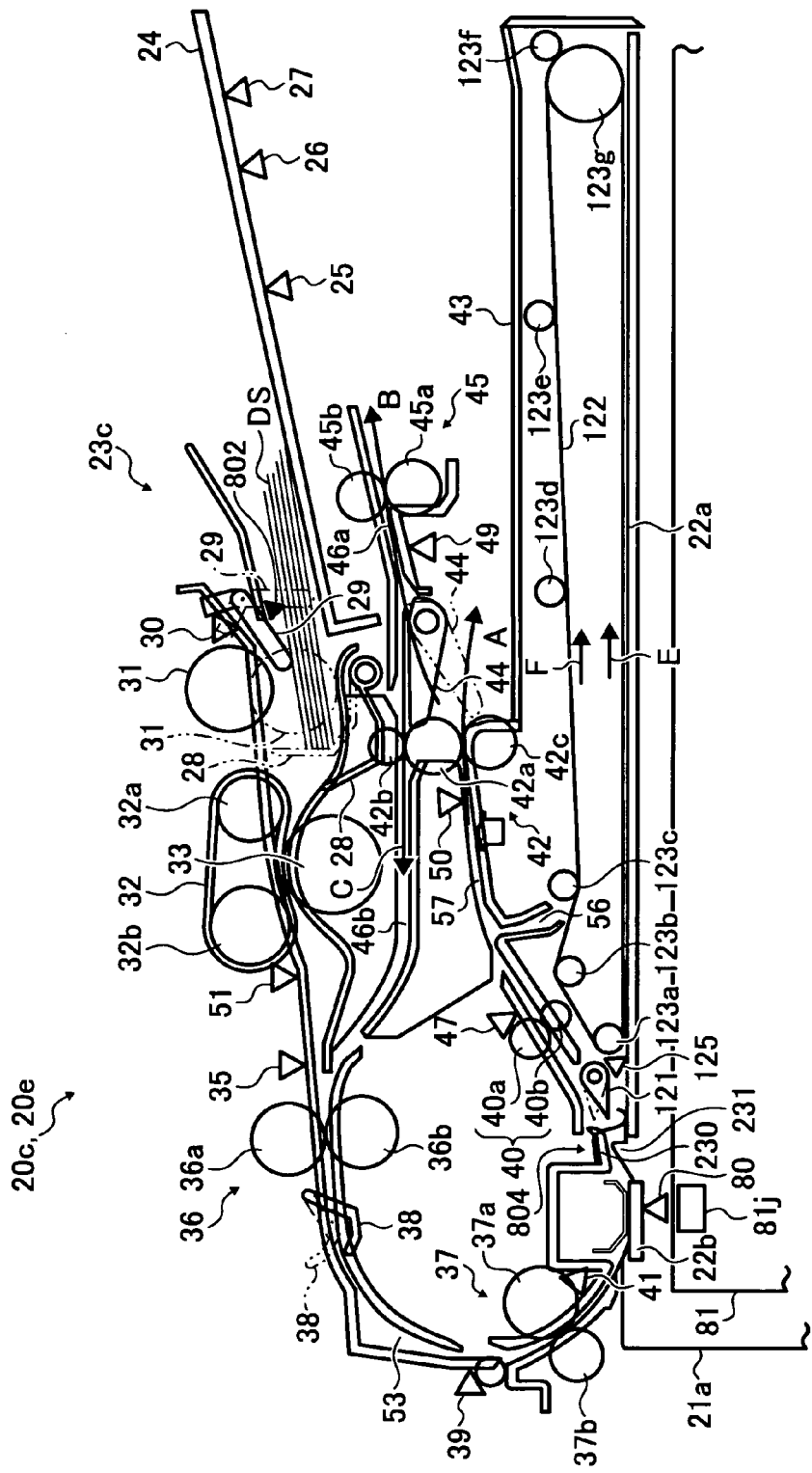
FIG. 33 is a cross-sectional view of a schematic configuration of an image reading system, including a document feeder and an image reader, according to a fourth example embodiment of the present patent application.
Figure 34B:
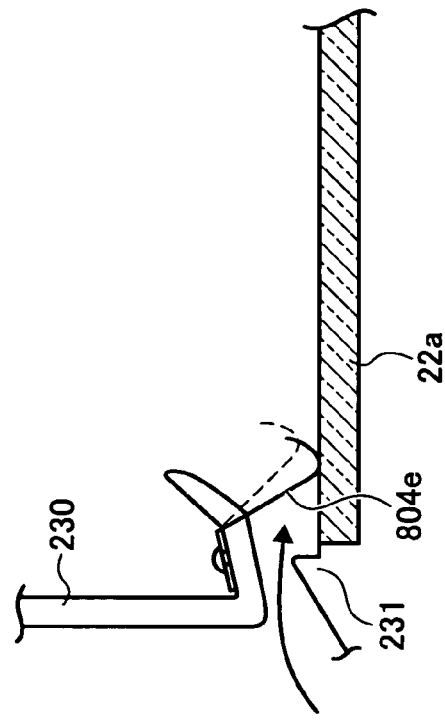
FIG. 34B is a side view of the contact part of FIG. 34A.
Figure 34A:
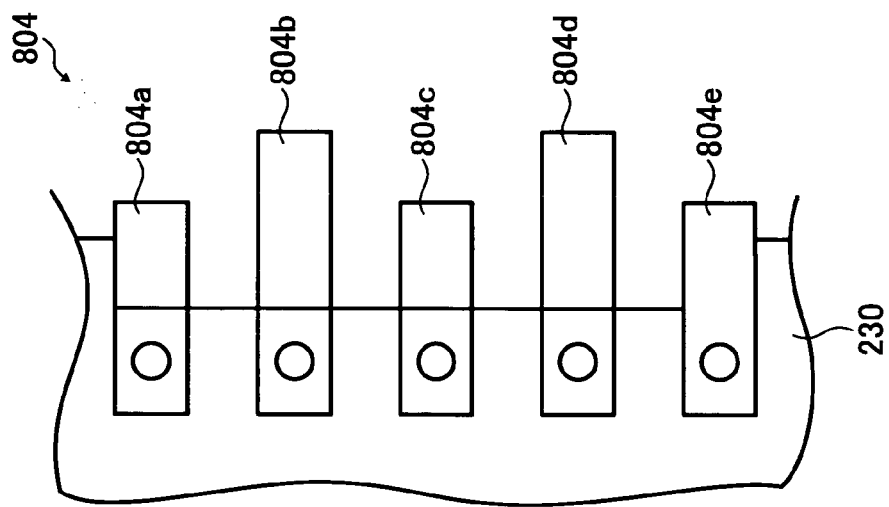
FIG. 34A is a top view of a contact part of a page switching unit according to the fourth example embodiment of the present patent application.

Next, FIGS. 33, 34A, and 34B show an image reading system, including an automatic document feeder or ADF and an image reader, according to a fourth example embodiment of the present patent application, an image forming apparatus including the image reading system, an electronic paper used in the image forming apparatus, and an image reading method used in the image forming apparatus, according to the fourth example embodiment of the present patent application. The image forming apparatus according to the fourth example embodiment of the present patent application corresponds to the copier 21, for example.

A configuration of an image reading system 20*c* including an ADF 23*c* and the scanner 81 according to the fourth example embodiment of the present patent application is similar to the configuration of the image reading system 20*b* according to the third example embodiment. Except that the ADF 23*c* further includes a page switching unit 804 including contact parts 804*a* through 804*e*, each of which being a leaf spring, as a replacement of the page switching unit 801" provided to the ADF 23*b* of the third example embodiment. The contact parts 804*a* through 804*e* are mounted on a frame 230 provided over the slit glass 22*b*, in the vicinity of a document scale 231. In addition, a contact part, which corresponds to the contact part 907, is mounted around edges of the back side of the electronic paper 900. Since the other units and mechanisms of the image reading system 20*c* are identical to the corresponding units and mechanisms of the image reading system 20*b*, the same reference numerals as the corresponding units and mechanisms of the image reading system 20*b* are used.

Figure 35:
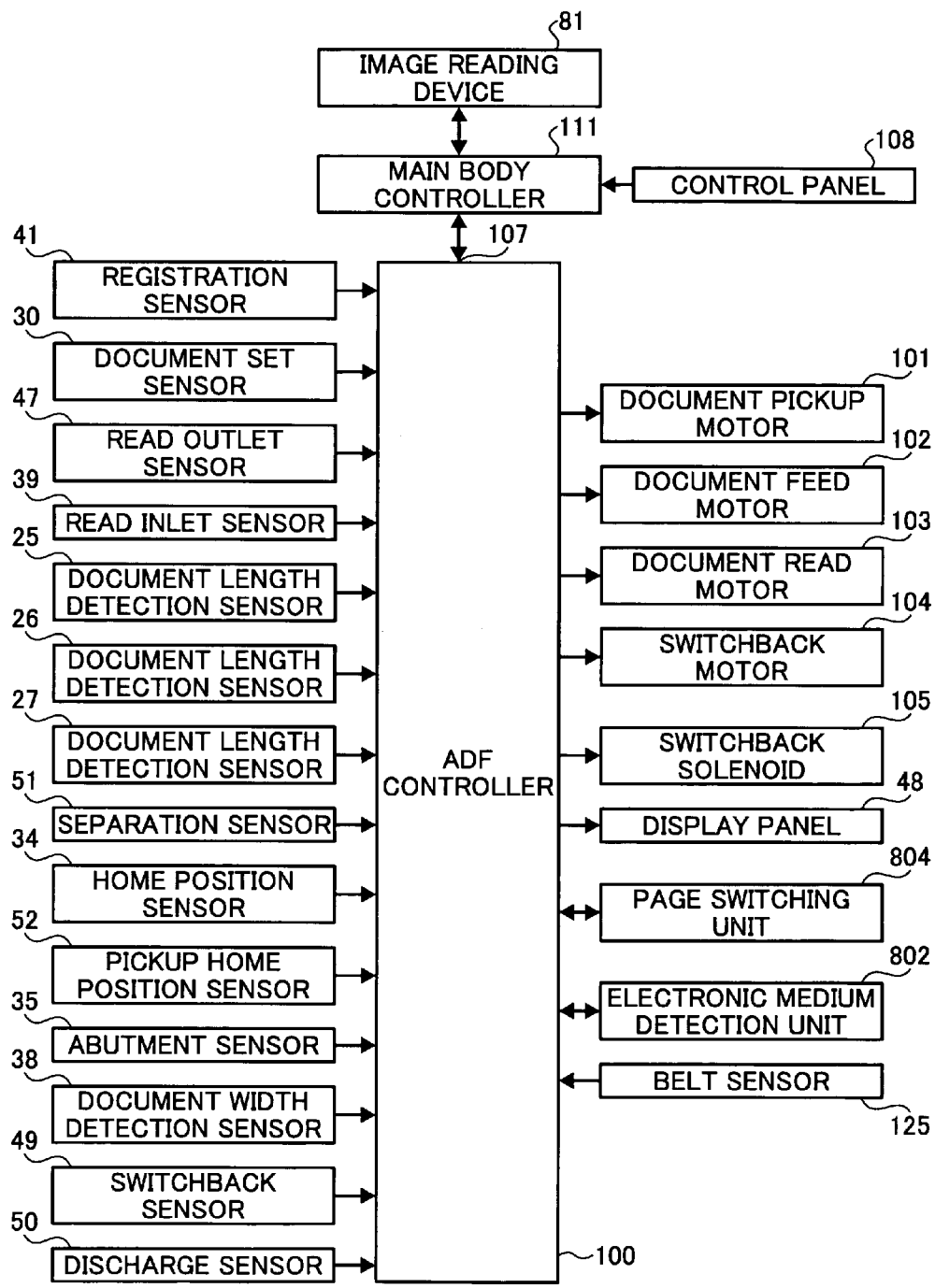
FIG. 35 is a block diagram of a control system of the image reading system of FIG. 33, according to the fourth example embodiment of the present patent application.

Details of the configuration of the image reading system 20*c* are described in reference to FIGS. 33 through 35.

FIG. 33 is a schematic configuration of the image reading system 20*c* including the ADF 23*c* and the scanner 81, FIG. 34A is a plan view showing a configuration of the contact parts 804*a* through 804*e* of the page switching unit 804, FIG. 34B is a cross-sectional view of the contact parts 804*a* through 804*e* of the page switching unit 804, and FIG. 35 is a block diagram showing a control system of an image reading system 20*c*, focusing on the ADF controller 100 of the ADF 23*c* according to the fourth example embodiment of the present patent application.

In FIGS. 33, 34A, and 34B, the page switching unit 804 is disposed on the ADF 23*c* and includes the multiple contact parts 804*a* through 804*e* in a leaf spring shape with different lengths in a document travel direction or in a sub-scanning direction. As previously described, these contact parts 804*a* through 804*e* are attached to the frame 230 provided over the slit glass 22*b* and abut by a given pressure against an upper surface of the contact glass 22*a*, in the vicinity of the document scale 231. The given pressure is a given amount of spring pressure that does not disturb a smooth transfer of the electronic paper 900 when the electronic paper 900 is conveyed from upstream of the document scale 231 in the document travel direction to the contact glass 22*a*. For example, when an instruction of the page switching operation is given to the electronic paper 900, the contact parts 804*a* through 804*e* may remain at the position indicated by a solid line in FIG. 34B. By contrast, when the electronic paper 900 travels over the document scale 231 to the contact glass 22*a*, the contact parts 804*a* through 804*e* may contact the electronic paper 900 and move to the position indicated by a dotted line in FIG. 34B.

The page switching unit 804 has the same structure and functions as the page switching unit 801" and is connected to the ADF 23*c* as shown in FIG. 35. In the fourth example embodiment, the contact part 907 of the electronic paper 900 is formed around edges or at an edge on the front and back surfaces thereof. The contact parts 804*a* through 804 of the page switching unit 804 may contact with the contact part 907 formed on the back surface of the electronic paper 900 when the electronic paper 9*b*0 is placed on the contact glass 22*a* with the display part 904 thereof in a face down manner or is conveyed from the document table 24 to the contact glass 24*a*. At the above described timing, the page switching unit 804 is controlled to give an instruction to the electronic paper 900 to perform the page switching operation.

The ADF controller 100 causes the transfer belt 122 to move the electronic paper 900 placed on the contact glass 22*a* to a direction indicated by arrow E in FIG. 33. When the belt sensor 125 detects the trailing edge of the electronic paper 900, the ADF controller 100 drives the document read motor 103 in a reverse direction by a reference number of pulses, and causes the contact part 907 of the back surface of the electronic paper 900 to contact the leaf-spring-shaped contact parts 804*a* through 804*e* of the page switching unit 804.

After the image currently displayed on the electronic paper 900 has been completely read, the main body controller 111 causes the moving mechanism 81*j* of the scanner 81 to move toward the document scale 231 and gives an instruction to the page switching unit 804 to perform the page switching operation with respect to the electronic paper 900. The ADF controller 100 then communicates with the main body controller 111 to cause the scanner 81 to conduct the reading of the electronic paper 900 after the page switching operation. Then, after the last page of the electronic paper 900 has been completely read, the ADF controller 100 drives the document read motor 103 so that the transfer belt 122 can rotate to a direction indicated by arrow E shown in FIG. 33. The electronic paper 900 is conveyed via the belt switchback path 56 to the document discharge tray 43.

A description is given of a transfer control of the electronic paper 900, performed by the image reading system 20*c* for reading the images on the electronic paper 900 in the copier 21.

As described above, when it is determined that the original document is an electronic paper 900 based on the detection results obtained by the electronic medium detection unit 802, the ADF controller 100 drives the document pickup motor 101, the document feed motor 102, and the document read motor 103 sequentially to rotate the document pickup roller 31, the pair of pull-out rollers 36, the pair of read inlet rollers 37, and the pair of read outlet rollers 40, thereby conveying the electronic paper 900 to the scanning position 80. The speeds of the motors for conveying the electronic paper 900 to the scanning position 80 are specified to high speed so as to effectively convey and read the electronic paper 900 on the contact glass 22a.

Next, the ADF controller 100' determines whether the registration sensor 41 has been driven by a reference number of pulses after the detection of the leading edge of the electronic paper 900.

When it is determined that the registration sensor 41 has been driven by the reference number of pulses, the ADF controller 100 drives the solenoid, not shown. By driving the solenoid, the path switching member 121 moves to the position indicated by the chain double-dashed line in FIG. 33. Therefore, the path switching member 121 directs the electronic paper 900 to the transfer belt 122.

Next, the ADF controller 100 determines whether the belt sensor 125 has been turned on upon detection of the leading edge of the electronic paper 900.

When it is determined that the belt sensor 125 has been turned on, the ADF controller 100 turns off the solenoid, not shown, to move the path switching member 121 to the position indicated by the solid line in FIG. 33.

The ADF controller 100 then determines whether the belt sensor 125 has been turned off after the passage of the trailing edge of the electronic paper 900.

When it is determined that the belt sensor 125 has been turned off, the ADF controller 100 drives the document read motor 103 in a reverse direction by a reference number of pulses and drives the transfer belt 122 to rotate in a direction indicated by arrow F shown in FIG. 33. By driving the transfer belt 122 by the reference number of pulses, the contact part 907 formed on the back surface of the electronic paper 900 can contact the contact parts 804a through 804e of the page switching unit 804. Then, the ADF controller 100 causes the document read motor 103 to stop driving.

Next, the ADF controller 100 transmits a signal to inform the main body controller 111 that the electronic paper 900 has reached a given position on the contact glass 22a. Based on this signal, the main body controller 111 causes the scanner 81 to read the image currently displayed on the page of the electronic paper 900 while moving the moving mechanism 81j of the scanner 81 to a given position in the right direction in FIG. 33. After the image on the electronic paper 900 has been completely read, the main body controller 111 moves the moving mechanism 81j of the scanner 81 back to the given position in a left direction in FIG. 33, and gives an instruction to the ADF controller 100 to change the page of the electronic paper 900.

Based on the instruction, the ADF controller 100 causes the page switching unit 804 to transmit a given signal to the electronic paper 900 so that the electronic paper 900 can change or update the page to display the next image on the display part 904 thereof.

As previously described, when the updated page is the last page of the electronic paper 900, the electronic paper 900 transmits a given page data signal to the page switching unit 804. Based on the page data obtained from the page switching unit 804, the ADF controller 100 can determine whether the last page of the electronic paper 900 has been completely read. In addition, the main body controller 111 can determine whether the last page of the electronic paper 900 has been completely read, based on the page data obtained by the page switching unit 804 via the ADF controller 100.

Based on the signal of the given page data transmitted by the ADF controller 100, the main body controller 111 causes the moving mechanism 81j of the scanner 81 to move reciprocally in a horizontal direction in FIG. 33 to read the image of the page currently displayed on the electronic paper 900 and continue to read the images until the last page of the electronic paper 900 is read. After the last page has been read, the main body controller 111 transmits the read completion signal to the ADF controller 100.

Based on the read completion signal, the ADF controller 100 drives the document read motor 103 to rotate the transfer belt 122 in a direction indicated by arrow E in FIG. 33. By rotating the transfer belt 122, the electronic paper 900 is reversed and conveyed via the belt switchback path 56 to the document discharging roller set 42, then discharged to the document discharge tray 43, as indicated by arrow A shown in FIG. 33.

In the copier 21 according to the fourth example embodiment of the present patent application, the ADF controller 100 includes the contact parts 804a through 804e. The contact parts 804a through 804e, each having a leaf spring shape, are disposed on the page switching unit 804 on the ADF 23c side to contact with the upper surface of the contact glass 22a. The contact part, which corresponds to the contact part 907 in FIG. 6, is additionally formed around edges of at edges on the back side of the electronic paper 900 to be read so that the contact part 907 formed on the back surface of the electronic paper 900 can contact with the contact parts 804a through 804e of the page switching unit 804. The ADF controller 100 causes the ADF 23c to transfer and support the electronic paper 900 on the contact glass 22a so that the contact parts 804a through 804e pressed against the top surface of the contact glass 22a can contact with the contact part 907 formed on the back side of the electronic paper 900. The main body controller 111 causes the moving mechanism 81j of the scanner 81 to reciprocally move in a horizontal direction along the lower side of the contact glass 22a so as to read the images displayed on the electronic paper 900. Each time the reading of the images per page unit is completed and the moving mechanism 81j of the scanner 81 reciprocally moves in a horizontal direction, the main body controller 111 gives an instruction to the ADF controller 100 to conduct the page switching operation. Based on the instruction, the ADF controller 100 gives an instruction to the electronic paper 900 to conduct the page switching operation, via the contact parts 804a through 804e of the page switching unit 804. By so doing, the ADF 23c reads the images on the electronic paper 900 while conducting the page switching operation until the last page of the electronic paper 900 is completely read.

With the above-described configuration, the electronic paper 900 can be read without passing a conveying path for non-electronic paper or paper sheet. By so doing, the reading time during a transfer of an original document can be reduced and an occurrence of a jam during the transfer can be prevented.

Further, when a next original document following the electronic paper 900 is a non-electronic paper, the current original document or the electronic paper 900 can effectively be read and conveyed without obstructing a pre-feeding of the next original document.

Further, by providing the transfer belt 122, when conveying multiple original documents, the intervals of the multiple original documents can be reduced and the multiple original documents can stably be conveyed.

Further, the contact parts 804b and 804d aligned along the document travel direction or a sub-scanning direction of the page switching unit 804 have respective lengths longer than the other contact parts 804a, 804c, and 804e. With the above-described structure, even when the electronic paper 900 is conveyed in an oblique manner, the contact part 907 on the back side of the electronic paper 900 can surely contact any one of the contact parts 804a through 804e of the page switching unit 804.

It is noted that the shapes of the contact parts 804a through 804e are not limited to those described in the fourth example embodiment. The present patent specification can apply to a configuration, for example, in which multiple contact parts 804a through 804e are formed in one leaf spring.

Next, FIGS. 36, 37A, 37B, and 38 show an image reading system, including an automatic document feeder or ADF and an image reader, according to a fifth example embodiment of the present patent application, an image forming apparatus including the image reading system, an electronic paper used in the image forming apparatus, and an image reading method used in the image forming apparatus, according to the fifth example embodiment of the present patent application. The image forming apparatus according to the fifth example embodiment of the present patent application corresponds to the copier 21, for example.

A configuration of an image reading system 20d including an ADF 23d and the scanner 81 according to the fifth example embodiment of the present patent application is similar to the configuration of the image reading system 20b according to the third example embodiment. Except that the ADF 23d further includes a belt back end sensor 126 and a page switching unit 805. The belt back end sensor 126 is disposed at the trailing edge or far end of the contact glass 22a on the right side in FIG. 36 below a lower surface of the contact glass 22a. The page switching unit 805 includes contact parts 805a and 805b, each of which being a leaf spring, as a replacement of the page switching unit 801" provided to the ADF 23b of the third example embodiment. The page switching unit 805 is located at the trailing edge or far end side and on a lower surface of the contact glass 22a. According to the above-described addition and replacement of the units, a transfer control executed when reading an electronic paper 900 may be different from the procedure described in the third example embodiment. Since the other units and mechanisms of the image reading system 20d are identical to the corresponding units and mechanisms of the image reading system 20b, the same reference numerals as the corresponding units and mechanisms of the image reading system 20b are used. In addition, the contact part of the electronic paper 900 corresponds to the contact part 907 thereof described in the first and second example embodiments.

Figure 36:
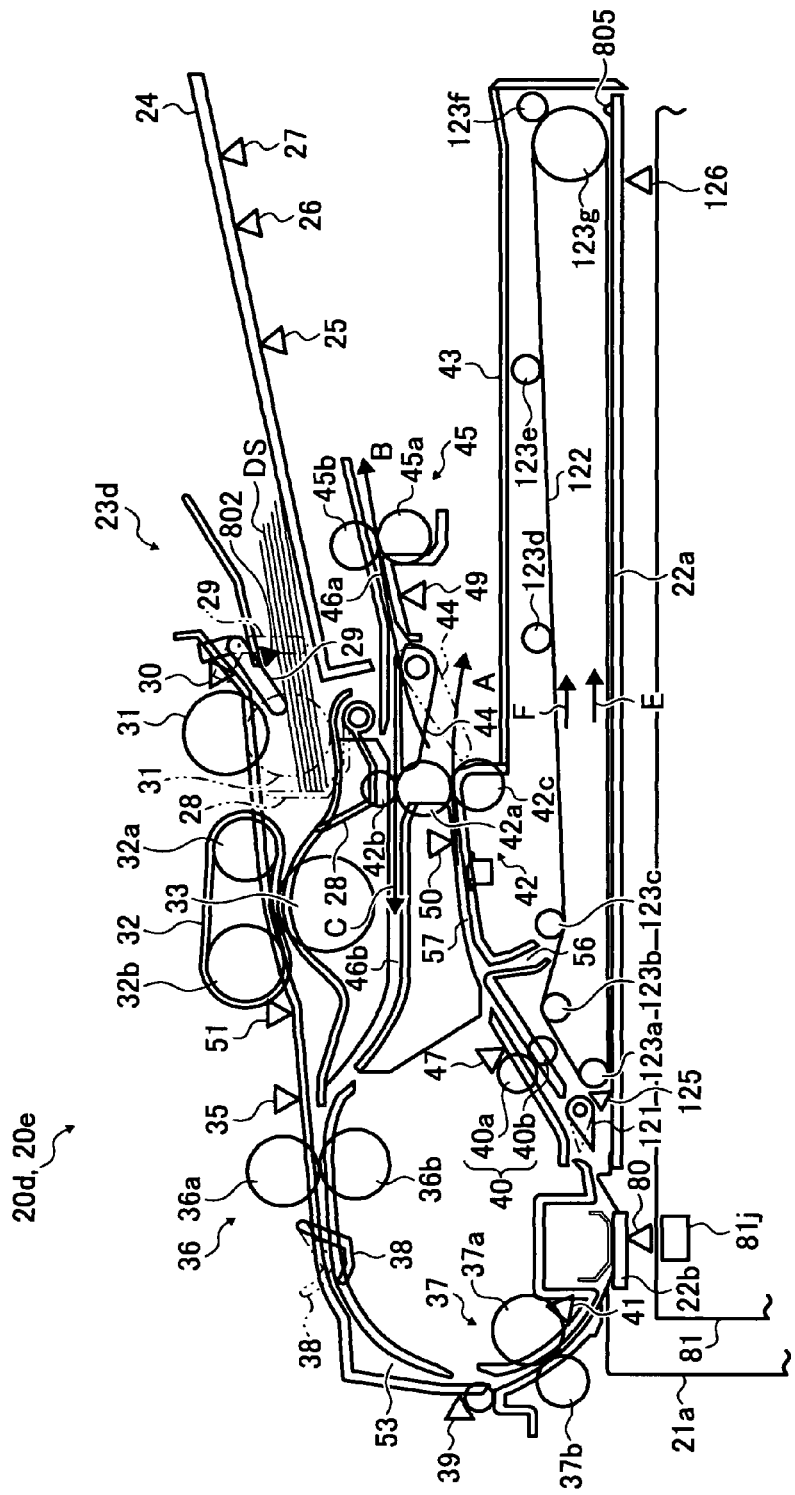
FIG. 36 is a cross-sectional view of a schematic configuration of an image reading system, including a document feeder and an image reader, according to a fifth example embodiment of the present patent application.
Figure 37A:
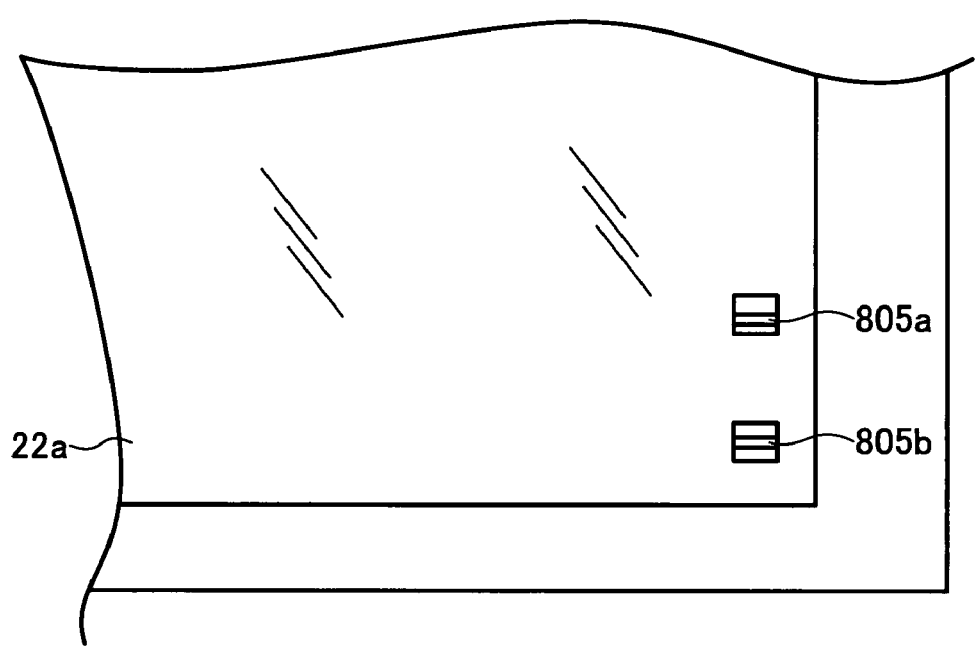
FIG. 37A is a part of a top view of a contact part of a page switching unit according to the fifth example embodiment of the present patent application.
Figure 37B:
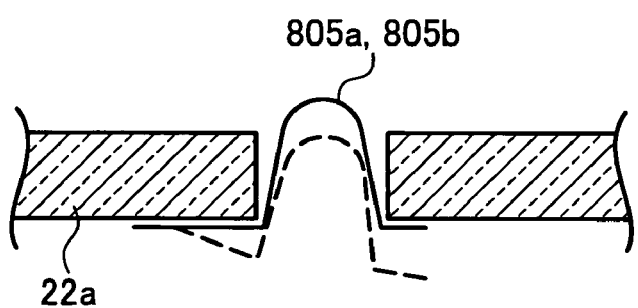
FIG. 37B is a cross-sectional view of the contact part of FIG. 37A.
Figure 38:
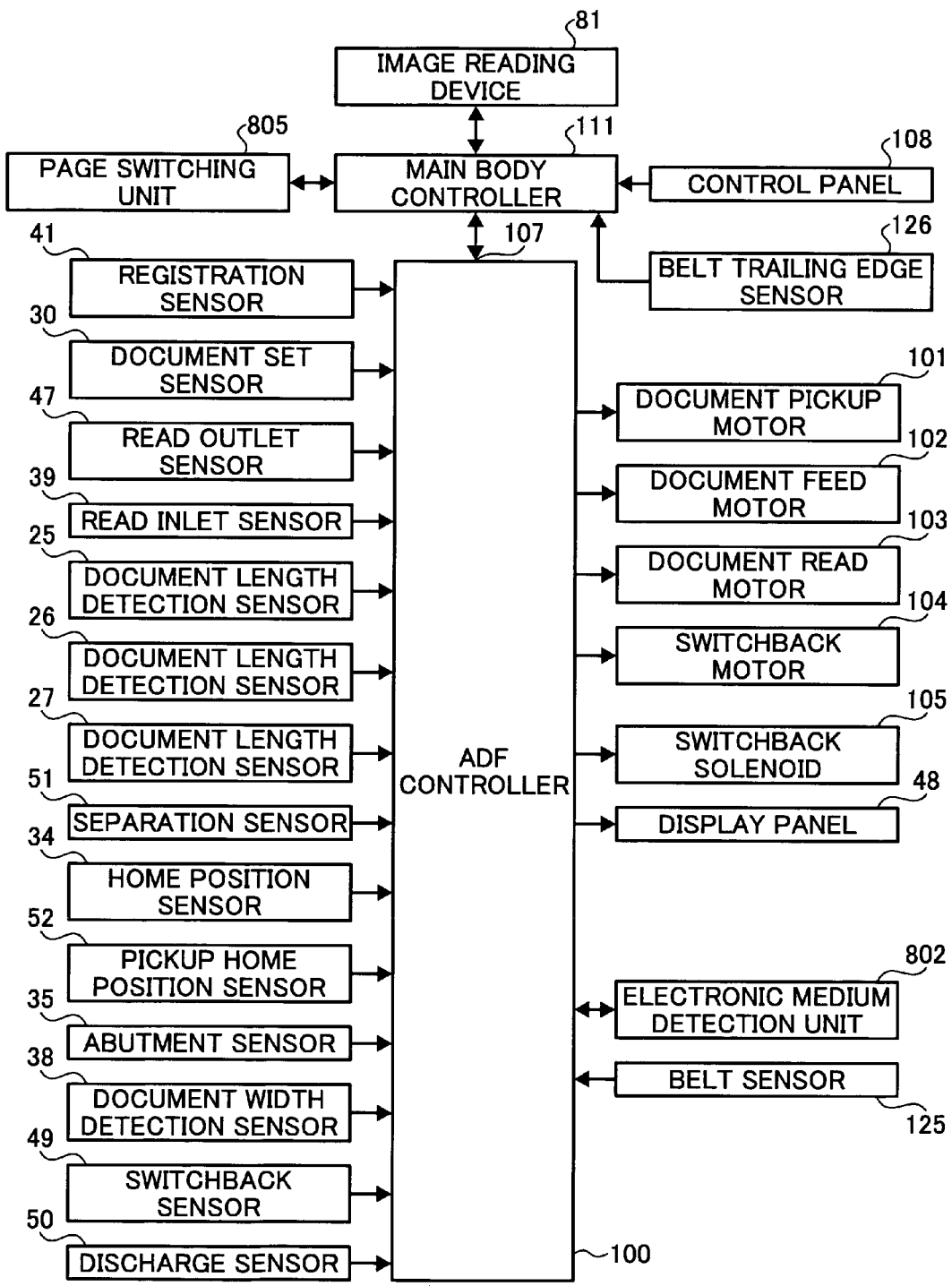
FIG. 38 is a block diagram of a control system of the image reading system of FIG. 36 according to the fifth example embodiment of the present patent application.

Details of the configuration of the image reading system 20d are described in reference to FIGS. 36 through 38.

FIG. 36 is a schematic configuration of the image reading system 20d including the ADF 23d and the scanner 81, FIG. 37A is a plan view showing a configuration of the contact parts 805a and 805b of the page switching unit 805, FIG. 37B is a cross-sectional view of the contact parts 805a and 805b of the page switching unit 804, and FIG. 38 is a block diagram showing a control system of the image reading system 20d, focusing on the ADF controller 100 of the ADF 23d according to the fifth example embodiment of the present patent application.

As shown in FIGS. 36 through 38, the page switching unit 805 is located outside an effective image forming region, at the trailing edge or far end on the lower surface of the contact glass 22a, and includes the contact parts 805a and 805b, each of which being formed in a leaf spring shape. One end of each of the contact parts 805a and 805b is attached with an adhesive to the lower surface of the contact glass 22a, as shown in FIG. 37B. The contact parts 805a and 805b is substantially U-shaped or convex-shaped in its cross section as shown in FIG. 37B, and respective protruding parts of the contact parts 805a and 805b are projected from respective openings formed on an upper surface of the contact glass 22a.

Further, the page switching unit 805 has functions same as the page switching unit 801" and is connected to the main body controller 111.

In the fifth example embodiment of the present patent application, the contact part 907 of the electronic paper 900 is formed around the edges of the electronic paper 900, and through the contact parts 805a and 805b, the page switching unit 805 transmits an instruction of the page switching operation to the electronic paper 900 conveyed from the document table 24 to the contact glass 22a.

The ADF controller 100 causes the transfer belt 122 to move the electronic paper 900 placed on the contact glass 22a to a direction indicated by arrow E in FIG. 36. When the belt sensor 125 detects the trailing edge of the electronic paper 900, the ADF controller 100 drives the document read motor 103 in a reverse direction by a reference number of pulses, and causes the electronic paper 900 to transfer to the scanning position 80 disposed at a downstream side of the document scale.

After the image currently displayed on the electronic paper 900 has been completely read, the ADF controller 100 drives the document read motor 103 to rotate in a normal direction by a reference number of pulses. Then, the main body controller 111 transmits the ADF controller 100 a signal indicating that the belt back end sensor 126 has detected the leading edge of the electronic paper 900. Upon receiving the signal, the ADF controller 100 further drives the document read motor 103 to rotate in a normal direction by a reference number of pulses so that the contact part, which corresponds to the contact part 907 in FIG. 6, of the electronic paper 900 can contact the protruding parts of the contact parts 805a and 805b of the page switching unit 805.

After the image currently displayed on the electronic paper 900 has completely been read, the main body controller 111 causes the moving mechanism 81j of the scanner 81 to move toward the document scale. Then, the ADF controller 100 transmits a signal indicating that the electronic paper 900 has been transferred to a position at which the contact part 907 of the electronic paper 900 contacts the contact parts 805a and 805b of the page switching unit 805 to each other. Upon receiving the signal, the main body controller 111 gives an instruction of the page switching operation to the electronic paper 900. The main body controller 111 further causes the scanner 81 to read the updated image on the electronic paper 900 after the page switching operation. When the last page of the electronic paper 900 has completely been read, the main body controller 111 transmits the read completion signal to the ADF controller 100.

Based on the read completion signal, the ADF controller 100 drives the document read motor 103 to rotate the transfer belt 122 in a direction indicated by arrow E in FIG. 36. By rotating the transfer belt 122, the electronic paper 900 is conveyed via the belt switchback path 56 to the document discharge tray 43.

A description is given of a transfer control of the electronic paper 900, performed by the image reading system 20d for reading the images on the electronic paper 900 in the copier 21.

As previously described, when it is determined that the original document is an electronic paper based on the detection results obtained by the electronic medium detection unit 802, the ADF controller 100 drives the document pickup motor 101, the document feed motor 102, and the document read motor 103 sequentially to rotate the document pickup roller 31, the pair of pull-out rollers 36, the pair of read inlet rollers 37, and the pair of read outlet rollers 40, thereby conveying the electronic paper 900 to the scanning position 80. The speeds of the motors for conveying the electronic paper to the scanning position 80 are specified to high speed so as to effectively read the electronic paper 900 on the contact glass 22a.

Next, the ADF controller 100 determines whether the registration sensor 41 has been driven by a reference number of pulses after the registration sensor 41 has detected the leading edge of the electronic paper 900.

When it is determined that the registration sensor 41 has been driven by the reference number of pulses, the ADF controller 100 drives the solenoid, not shown. By driving the solenoid, the path switching member 121 moves to the position indicated by the chain double-dashed line in FIG. 36. Therefore, the electronic paper 900 may be directed by the path switching member 121 to the transfer belt 122.

Next, the ADF controller 100 determines whether the belt sensor 125 has been turned on upon detection of the leading edge of the electronic paper 900.

When it is determined that the belt sensor 125 has been turned on, the ADF controller 100 turns off the solenoid, not shown, to move the path switching member 121 to the position indicated by a solid line in FIG. 36.

The ADF controller 100 then determines whether the belt sensor 125 has been turned off after the passage of the trailing edge of the electronic paper 900.

When it is determined that the belt sensor 125 has been turned off, the ADF controller 100 drives the document read motor 103 in a reverse direction by a reference number of pulses and drives the transfer belt 122 to rotate in a direction indicated by arrow F in FIG. 36. By driving the transfer belt 122 by the reference number of pulses, the electronic paper 900 may be conveyed to a given scanning position located downstream of the document scale. Then, the ADF controller 100 causes the document read motor 103 to stop driving.

Next, the ADF controller 100 transmits a signal to inform the main body controller 111 that the electronic paper 900 has reached the given position on the contact glass 22a. Based on this signal, the main body controller 111 causes the scanner 81 to read the image currently displayed on the page of the electronic paper 900 while moving the moving mechanism 81j of the scanner 81 to a given position in the right direction in FIG. 36. After the image on the electronic paper 900 has been completely read, the main body controller 111 moves the moving mechanism 81j of the scanner 81 back to the given position in a left direction in FIG. 36, and gives an instruction to the ADF controller 100 to change the page of the electronic paper 900.

Based on the instruction, the ADF controller 100 causes the document read motor 103 to drive in a normal direction to rotate the transfer belt 122 in a direction indicated by arrow E in FIG. 36. By driving the document read motor 103, the electronic paper 900 is conveyed toward a downstream side of the contact glass 22a. When the belt back end sensor 126 detects the leading edge of the electronic paper 900 conveyed toward the downstream side, the main body controller 111 transmits a signal indicating the detection results of the belt back end sensor 126 to the ADF controller 100. Based on this signal, the ADF controller 111 further drives the document read motor 103 in a normal direction by a reference number of pulses, so that the transfer belt 122 can convey the electronic paper 900 to a position at which the contact part 907 of the electronic paper 900 contacts the contact parts 805a and 805b of the page switching unit 805 to each other. Then, the ADF controller 100 transmits, to the main body controller 111, a signal indicating that the electronic paper 900 has been conveyed to the above-described contact position.

Based on the signal, the main body controller 111 transmits an instruction to the page switching unit 805 to conduct the page switching operation of the electronic paper 900. The page switching unit 805 transmits a given signal to the electronic paper 900 so that the electronic paper 900 can change or update the page to display on the display part 904 thereof.

As previously described, when the updated page is the last page of the electronic paper 900, the electronic paper 900 transmits a given page data signal to the page switching unit 805. Based on the page data obtained from the page switching unit 805, the main body controller 111 can determine whether the last page of the electronic paper 900 has been completely read.

When it is determined that the reading of the last page has not been completed, the main body controller 111 transmits an instruction to the ADF controller 100 to convey the electronic paper 900 to be read. Based on the instruction, the ADF controller 100 drives the document read motor 103 in a reverse direction to rotate the transfer belt 122 in a direction indicated by arrow F in FIG. 36. By rotating the transfer belt 122, the electronic paper 900 is conveyed toward an upstream side of the contact glass 22a. When the belt sensor 125 detects the leading edge of the electronic paper 900 conveyed toward the upstream side of the contact glass 22a, the ADF controller 100 further drives the document read motor 103 in a reverse direction, thereby conveying the electronic paper to a given scanning position at a downstream side of the document scale. The ADF controller 100 stops driving the document read motor 103 and transmits a signal indicating that the electronic paper 900 has reached the given scanning position on the contact glass 22a, to the main body controller 111.

Based on the signal, the main body controller 111 causes the moving mechanism 81j of the scanner 81 to move reciprocally in a horizontal direction in FIG. 36 to read the image of the page currently displayed on the electronic paper 900 and continue to read the images until the last page of the electronic paper 900 is read. After the last page has been read, the main body controller 111 transmits the read completion signal to the ADF controller 100.

Based on the read completion signal, the ADF controller 100 drives the document read motor 103 to rotate the transfer belt 122 in a direction indicated by arrow E in FIG. 36. By rotating the transfer belt 122, the electronic paper 900 is reversed and conveyed via the belt switchback path 56 to the document discharging roller set 42, then discharged to the document discharge tray 43, as indicated by arrow A in FIG. 36.

In the copier 21 according to the fifth example embodiment of the present patent application, the ADF controller 100 causes the ADF 23d to transfer and hold the electronic paper 900 to the given scanning position in the vicinity of the document scale on the contact glass 22a. The main body controller 111 causes the moving mechanism 81j of the scanner 81 to reciprocally move in a horizontal direction at the far end of the contact glass 22a so as to read images displayed on the electronic paper 900. Each time the reading of the images per page unit is completed and the moving mechanism 81j of the scanner 81 reciprocally moves in a horizontal direction, the ADF controller 100 causes the ADF 23d to transfer the electronic paper 900 from the given scanning position to the page switching unit 805 on the contact glass 22a and the main body controller 111 given an instruction to the page switching unit 805 disposed at the far end of the contact glass 22a to conduct the page switching operation. By instructing the page switching operation to the electronic paper 900, the page switching unit 805 reads the images of the electronic paper 900 while conducting the page switching operation, until the last page of the electronic paper 900 is completely read.

With the above-described configuration, the electronic paper 900 can be read without passing a conveying path for non-electronic paper or paper sheet. By so doing, the reading time during a transfer of an original document can be reduced and an occurrence of a jam during the transfer can be prevented.

Further, when a next original document following the electronic paper is a non-electronic paper, the current original document or the electronic paper 900 can effectively be read and conveyed without obstructing a pre-feeding of the next original document.

Further, by providing the transfer belt 122, when conveying multiple original documents, the intervals of the multiple original documents can be reduced and the multiple original document can stably be conveyed.

Further, the contact parts 805a and 805b are disposed outside the effective image forming region on the contact glass 22a. Therefore, the contact parts 805a and 805b may not be obstacles to the transfer of original documents and image reading operation, and can be expected to surely contact the contact part 907 of the electronic paper 900.

In addition, the contact parts 805a and 805b can contact the contact part 907 formed on the front surface of the electronic paper 900. Therefore, no contact part is required on the back surface or around the edges of the electronic paper 900.

Next, FIG. 39 shows an image reading system including an automatic document feeder or ADF and an image reader according to a sixth example embodiment of the present patent application, an image forming apparatus including the image reading system, an electronic paper used in the image forming apparatus, and an image reading method used in the image forming apparatus, according to the sixth example embodiment of the present patent application. The image forming apparatus according to the sixth example embodiment of the present patent application corresponds to the copier 21, for example.

A configuration of an image reading system 20e according to the sixth example embodiment of the present patent application is similar to the configurations of the image reading system 20b through 20d according to the third through fifth example embodiments. Except that the ADF controller 100 or the main body controller 111 causes any one of the page switching unit 801" of the third example embodiment, the page switching unit 804 of the fourth example embodiment, and the page switching unit 805 of the fifth example embodiment to contact with the contact part 907 of the electronic paper 900 so as to determine whether the original document placed on the contact glass 22a is an electronic paper 900. By so doing, the page switching operation of the electronic paper 900 placed on the contact glass 22a is performed while the ADF controller 100 or the main body controller 111 causes the moving mechanism 81j of the scanner 81 to move in a horizontal direction to read images on the electronic paper 900 to read the images displayed on the electronic paper 900. In addition, when the ADF 23b, 23c, or 23d is left open or unclosed, a user manually proceeds the document transfer operation along the guidance provided through a display on the control panel 108.

Since the other units and mechanisms of the image reading system 20e are identical to the corresponding units and mechanisms of the image reading systems 20b through 20d, the same reference numerals as the corresponding units and mechanisms of the image reading system 20b are used. In addition, the contact part 907 of the electronic paper 900 corresponds to any one of the contact parts 907 thereof described in the third through fifth example embodiments. For example, the contact part 907 in the sixth example embodiment corresponds to that of the sixth example embodiment.

In the sixth example embodiment, the main body controller 111 causes the contact part 801" a of the page switching unit 801" to contact with the contact part 907 disposed at the edge of the electronic paper 900 to determine whether the original document placed on the contact glass 22a is an electronic paper 900 or not. Specifically, the page switching unit 801" transmits a given signal, for example, a signal requesting a type of recording medium, to the original document.

When the original document responds a signal informing that the recording medium is an electronic paper 900, to the page switching unit 801", it is determined that the original document is an electronic paper 900.

By contrast, when the original document does not respond any signal to the page switching unit 801", it is determined that the original document is a non-electronic paper.

Alternatively, the page switching unit 801" may include the functions same as the electronic medium detection unit 802. By applying electric current to the original document, it can be determined whether the original document is an electronic paper 900 or not.

As a result, when electric current is applied and conduction is permitted, it is determined that the original document is an electronic paper 900. By contrast, even when electric current is applied and conduction is not permitted, it is determined that the original document is a non-electronic paper such as a paper sheet.

When it is determined that the original document is an electronic paper 900, the main body controller 111 causes the moving mechanism 81j of the scanner 81 to reciprocally move in a horizontal direction while causing the page switching unit 801" to conduct the page switching operation of the electronic paper 900 placed on the contact glass 22a.

After the image currently displayed on the electronic paper 900 has completely been read, the ADF controller 100 drives the document read motor 103 to rotate the transfer belt 122 in a direction indicated by arrow E in FIG. 31. By rotating the transfer belt 122, the electronic paper 900 is reversed and conveyed via the belt switchback path 56 to the document discharging roller set 42, then discharged to the document discharge tray 43, as indicated by arrow A in FIG. 31.

Further, in the sixth example embodiment, an operator manually opens and closes the ADF 23b, 23c, or 23d. Therefore, the operator may leave the ADF 23b, 23c, or 23d open a panel cover, not shown, of the contact glass 22a to expose the contact glass 22a, place the electronic paper 900 at a position at which the contact part 801" a of the page switching unit 801" does not contact the contact part 907 provided on or around the edges of the electronic paper 900 on the contact glass 22a, and input instructions to start reading the electronic paper 900 while leaving the panel cover of the contact glass 22a open.

In this case, the main body controller 111 causes a liquid crystal display or LCD, not shown, of the control panel 108 to display appropriate messages on a guide screen thereof, as shown in FIG. 39.

"Message 1" shown in FIG. 39 is displayed on the guide screen when the document length detection sensors 25, 26, and 27 do not detect the original document and the page switching unit 801" does not detect the electronic paper 900 even after a given period of time has elapsed since the opening status of the panel cover of the contact glass 22a is detected by a cover sensor, not shown. Since the page switching unit 801"

has not determined whether the original document is an electronic paper 900 or a non-electronic paper, Message 1, which is "DOCUMENT SIZE NOT DETECTED.", is displayed.

"Message 2", which is "DOCUMENT PAPER IS E-PAPER?", shown in FIG. 39 is displayed on the guide screen to determine whether the original document is an electronic paper or a non-electronic paper after the document size has been detected. Based on a response, "YES" or "NO", inputted by the user through the guide screen, the main body controller 111 and the ADF controller 100 can determine the type of the original document. Based on the determination results, the transfer control and read control can be executed.

"Message 3", which is "SET DOCUMENT TO REGISTRATION SCALE.", shown in FIG. 39 is displayed on the guide screen to set the original document on the effective image forming region on the contact glass 22a after obtaining the response of Message 2.

When it is determined that the original document is an electronic paper 900, the original document may be set to the position at which the contact part 801″a of the page switching unit 801″ contacts the contact part 907 of the electronic paper 900. This can cause the main body controller 111 to give an instruction of the page switching operation to the page switching unit 801″.

"Message 4", which is "CLOSE THE PANEL.", is displayed on the guide screen shown in FIG. 39 after the detection results of the original document have been obtained and the proper setting or registration of the original document on the contact glass 22a has been conducted. By closing the panel cover of the contact glass 22a or the ADF 23b, 23c, or 23d, the original document is fixedly placed on a proper position, thereby accurately reading the image displayed or formed on the original document.

Further, when the original document is an electronic paper 900, the electronic paper 900 can be conveyed by the transfer belt 122 and discharged after the page switching operation and the read operation.

In the example embodiments described above, the electronic medium detection unit 802 applies electrical current to determine whether the original document is an electronic paper or not, based on the permission of conduction to the original document. However, the present patent application is applicable to a different configuration in which an optical sensor previously located in any of the image reading systems 20 through 20e, i.e., the separation sensor 51, can determine whether the original document is an electronic paper or a non-electronic paper, based on a difference in reflectivity of a paper sheet and a polymer film that is used for the electronic paper 900. With the above-described configuration, the image reading systems 20 through 20e can detect the type of an original document without adding a new unit or component.

Further, in the above-described example embodiments, when the page switching operation has been conducted and the last page of the electronic paper 900 has completely been read, the electronic paper 900 may be discharged with the last page thereof displayed. Alternatively, the present patent application is applicable to an operation in which the electronic paper 900 can be discharged with the first page thereof displayed after the page switching operation has been conducted and the last page of the electronic paper 900 has completely been read.

In the second example embodiment of the present patent application, the electronic paper 900 is moved reciprocally in a horizontal direction between the retreat table 810 and the pair of switchback rollers 45.

However, the movement of the electronic paper 900 is not limited to the above-described movement. For example, the present patent application is applicable to a movement of the electronic paper 900 in which the electronic paper 900 is moved reciprocally in a horizontal direction between the retreat table 810 and the document discharge tray 43. In this case, it is preferable that the ADF 23a of the second example embodiment of the present patent application includes the page switching units 801 and 801', the reverse path 53 connecting the document table 24 and the scanning position 80, the discharge path 57 connecting the scanning position 80 and the document discharge tray 43, and the retreat path 55 connecting the scanning position 80 and the retreat table 810. It is also preferable that the page switching unit 801 is disposed in the vicinity of the pair of read inlet rollers 37 at a downstream side in the document travel direction, that the page switching unit 801' is disposed in the vicinity of the document discharging roller set 42 at an upstream side in the document travel direction.

The ADF controller 100 may cause an electronic paper 900 placed on the document table 24 to be reversed and conveyed via the reverse path 53 to the scanning position 80. After the first page of the electronic paper 900 is read, the ADF controller 100 causes the electronic paper 900 to be conveyed via the discharge path 57 to the position in the vicinity of the document discharge tray 43. Then, the ADF controller 100 causes the electronic paper 900 to be switched back from the position in the vicinity of the document discharge tray 43 to the scanning position 80 via the discharge path 57. After the second page of the electronic paper 900 is read, the ADF controller 100 causes the electronic paper to be switched back via the retreat path 55 to the retreat table 810, then to the scanning position 80.

In addition, after the first page of the electronic paper 900 is read, the ADF controller 100 controls the page switching unit 801' to perform the page switching operation in the vicinity of the document discharge tray 43 to cause the electronic paper 900 to change the images per page unit. Then, the ADF controller 100 controls the page switching unit 801 to change the images per page unit at an upstream side of the pair of read inlet rollers 37 along the document travel direction.

Further, the ADF controller 100 controls the scanner 81 to read the images to a specific page or the last page of the electronic paper 900 according to the page switching operation of the electronic paper 900.

With the above-described configuration, the ADF controller 100 conducts respective page switching operations at the page switching units 801 and 801' while conveying an electronic paper 900 back and forth between the retreat table 810 and the document discharge tray 43. Therefore, an electronic paper 900 having electronic data for multiple pages can effectively be read.

Further, when the electronic paper 900 is moved reciprocally between the retreat table 810 and the document discharge tray 43, respective positional relations of the pair of read inlet rollers 37 and the document discharging roller set 42, where a holding operation and a switchback operation are performed, and the page switching units 801 and 801' are determined according to location and size of contact part(s) mounted on an electronic paper 900 and the location of a transfer unit for non-electronic papers, such as the pair of read inlet rollers 37 and/or the document discharging roller set 42.

For example, other than the above-described combination of the "position in the vicinity of the pair of read inlet rollers 37 at the downstream side in the document travel direction" and the "position in the vicinity of the document discharging roller set 42 at the upstream side in the document travel direction", different combinations can be applied, for example, a combination of a "position in the vicinity of the pair of read inlet rollers 37 at an upstream side in the document travel direction" and a "position in the vicinity of the document discharging roller set 42 at a downstream side in the document travel direction", a combination of a "position in the vicinity of the pair of read inlet rollers 37 at a downstream side in the document travel direction" and a "position in the vicinity of the document discharging roller set 42 at a downstream side in the document travel direction", a combination of a "position in the vicinity of the pair of read inlet rollers 37 at an upstream side in the document travel direction" and a "position in the vicinity of the document discharging roller set 42 at an upstream side in the document travel direction", and so forth. For selecting any combination, it is imperative that the contact part 907 of an electronic paper 900 surely contacts the contact part of a page switching unit or part during a document holding or sandwiching operation.

Further, in the above-described example embodiments, the ADF controller 100 determines whether electronic data for multiple pages is stored in an electronic paper 900, based on the signal of page data transmitted from the electronic paper 900. However, an operation of such determination is not limited to the above-described operation.

For example, the present patent application is applicable to an operation in which the ADF controller 100 reads a current page and a total page number displayed on the page display region 908 on the electronic paper 900 and determines whether electronic data is stored, based on the current page and the total page number. This operation can achieve an effect same as the above-described operations. In this case, the current page and the total page number as page data are displayed on the page display region 908 of the display part 904, and the ADF controller 100 determines, based on the current page and the total page number obtained from the scanner 81 via the main body controller 111, whether electronic data for multiple pages is stored in the IC chip 902 or the electronic paper memory 903.

Further, in the above-described example embodiments, the ADF controller 100 determines whether the electronic paper 900 has completely been read, based on the signal of page data transmitted from the electronic paper 900. However, an operation of such determination is not limited to the above-described operation.

For example, the present patent application is applicable to an operation in which the ADF controller 100 determines the completion of reading the images displayed on the electronic paper 900 based on a given or reference image displayed on the electronic paper. This operation can achieve an effect same as the above-described operations. In this case, according to a signal instructing the page switching operation from the page switching unit 801, 801', 801", 804, or 805, the electronic paper 900 displays a given image indicating that the last page has already been displayed (for example, a blank image, a specific image specifying or suggesting the completion of reading the images, during the page switching operation).

Further, the ADF controller 100 may determine the completion of reading the images on the electronic paper 900, based on data indicating that a given image obtained from the scanner 81 via the main body controller 111 is displayed on the display part 904 of the electronic paper 900.

Further, in addition to the above-described operation displaying a given image indicating the completion of reading the images of an electronic paper 900, the ADF controller 100 may determine the completion of reading the images on the electronic paper 900, based on match or mismatch between a previously read image, for example, the image on the first page, and a currently read image.

Alternatively, the electronic paper 900 may be controlled not to change the selected images after the last page has been displayed. In this case, the ADF controller 100 can cancel a stop of page switching under given conditions.

Further, in the above-described example embodiments, the ADF controller 100 causes communications between the page switching unit 801 and the electronic paper 900 to be performed via the contact part of the page switching unit 801, 801', 801", 804, or 805 and the contact part 907 of the electronic paper 900. However, communications between the page switching unit 801, 801', 801", 804, or 805 and the electronic paper 900 are not limited to the above-described way.

For example, the present patent application is applicable to radio communications, and the radio communication can achieve the same effect as the above-described communications. In this case, the page switching unit 801, 801', 801", 804, or 805 and the electronic paper 900 respectively include antenna coils, for example. When the electronic paper 900 and the page switching unit 801, 801', 801", 804, or 805 come close to each other, respective antenna parts thereof may electromagnetically be coupled, and an induced electromotive force may be generated at the antenna coil of the electronic paper 900. The induced electromotive force may be rectified to obtain electrical power. The electrical power may be supplied to the IC chip 902 to use for starting up the electronic paper 900, updating various data, and so forth.

Through the above-described radio communications, the page switching unit 801, 801', 801", 804, or 805 can obtain an instruction of the page switching operation, page data such as data indicating the first or last page is displayed during the page switching operation and so forth can be obtained for a short period of time.

Further, in the third through fifth example embodiments, the ADFs 23*b*, 23*c*, and 23*d* attached to or serving as the panel cover of the contact glass 22*a* can open and close with respect to the contact glass 22*a*. However, the configurations of the ADFs 23*b*, 23*c*, and 23*d* are not limited to the above-described structure.

For example, the present patent application is applicable to a configuration in which the copier 21 with a pressure plate includes the above-described electronic medium detection unit 802, and the page switching units 801", 804, and 805, and this configuration can achieve the same effect as the above-described configurations.

The above-described example embodiments are illustrative, and numerous additional modifications and variations are possible in light of the above teachings. For example, elements and/or features of different illustrative and example embodiments herein may be combined with each other and/or substituted for each other within the scope of this disclosure and appended claims. It is therefore to be understood that within the scope of the appended claims, the disclosure of this patent specification may be practiced otherwise than as specifically described herein.

Example embodiments being thus described, it will be obvious that the same may be varied in many ways. Such variations are not to be regarded as a departure from the spirit and scope of the present patent application, and all such modifications as would be obvious to one skilled in the art are intended to be included within the scope of the following claims.

What is claimed is:

1. An image reading system, comprising:
a document feeder to feed and transfer an original document including at least one of a non-electronic medium and an electronic paper to a scanning position, the electronic paper including:
a memory to store electronic data in a page unit;
a display unit to convert the electronic data to images per page and switch and display the images thereon; and
a conductive member exposed thereon;
a media determination unit to determine whether the original document is the non-electronic medium or the electronic paper;
a transfer controller to control a transfer operation performed by the document feeder, based on results obtained by the media determination unit;
an image reader to optically read either an image formed on the non-electronic medium or an image displayed on the display unit of the electronic paper at the scanning position;
a read controller to control a reading operation performed by the image reader;
a page switcher to switch the image displayed on the display unit of the electronic paper to a next image when electronic data of images for multiple pages is stored in the memory of the electronic paper, wherein
the read controller causing the image reader to read the images per page switched by the page switcher.

2. The image reading system according to claim 1, further comprising:
a first reverse path between a document setting member to set the original document and the scanning position;
a switchback path between the scanning position and a document sandwiching unit to sandwich a trailing edge in a document transfer direction of the original document; and
a second reverse path between the document sandwiching unit and the scanning position,
the transfer controller causing the document feeder (1) to convey the electronic paper from the document setting member to the scanning position via the first reverse path, as a first transfer, (2) to convey the electronic paper from the scanning position via the switchback path and the second reverse path to the scanning position, as a second transfer, and (3) to convey the electronic paper from the scanning position via the switchback path and the second reverse path to the scanning position, as a third transfer,
the page switcher switching the image displayed on the electronic paper to the next image during the third transfer, at an upstream side from the scanning position along the document transfer direction,
the read controller causing the image reader to read the images of the electronic paper per page at the scanning position during the first transfer and the third transfer.

3. The image reading system according to claim 1, further comprising:
a reverse path between a document setting member to set the original document, and the scanning position;
a discharge path between the scanning position and a document discharging member to discharge and hold the original document thereon; and
a retreat path between the scanning position and a document retreating member disposed upstream of the scanning position in the document transfer direction,
the transfer controller causing the document feeder (1) to convey the electronic paper from the document setting member to the scanning position via the reverse path to read a first page of the electronic paper, (2) to convey the electronic paper from the scanning position to a given position in the vicinity of the document discharging member via the discharge path, (3) to switch back the electronic paper from the given position in the vicinity of the document discharging member to the scanning position via the discharge path to read a second page of the electronic paper, (4) to convey the electronic paper from the scanning position to the document retreating member via the retreat path, and (5) to switch back the electronic paper from the document retreating member to the scanning position via the retreat path,
the page switcher switching the images displayed on the electronic paper to the next page at an upstream side from the scanning position along the document transfer direction and at the position in the vicinity of the document discharging member,
the read controller causing the image reader to read the images of the electronic paper per page at the scanning position up to a given page number.

4. The image reading system according to claim 1, wherein the image reader comprises a moving mechanism, with image reading components mounted thereon, to move reciprocally along a horizontal direction along a lower side of a contact glass,
the page switcher switching the images displayed on the electronic paper placed on the contact glass each time the moving mechanism reciprocally moves along the lower side of the contact glass,
the read controller causing the image reader to read the images of the electronic paper up to a given page number while the moving mechanism reciprocally moves along the lower side of the contact glass.

5. The image reading system according to claim 1, wherein the display unit displays a total number of pages of the electronic paper and the read controller determines, based on the total number of pages displayed on the display unit, whether electronic data of images for multiple pages is stored in the memory of the electronic paper.

6. The image reading system according to claim 1, wherein the media determination unit is disposed upstream from the scanning position along a path in a document travel direction.

7. The image reading system according to claim 1, wherein the read controller determines completion of reading of the images of the electronic paper, based on whether a given image is displayed on the display unit of the electronic paper.

8. The image reading system according to claim 1, wherein the electronic paper further comprises a first communication unit to communicate with the page switcher via the conductive member thereof, and the page switcher includes a second communication unit to contact with the conductive member to communicate with the electronic paper,
the read controller determining whether electronic data of images for multiple pages is stored in the memory of the electronic paper and whether an image currently displayed on the electronic paper is the last page or not, based on a signal of page data, including a total number of pages of the electronic paper, transmitted from the first communication unit to the second communication unit.

* * * * *